United States Patent [19]

Kalthoff et al.

[11] 4,308,960
[45] Jan. 5, 1982

[54] DOCUMENT RETRIEVAL SYSTEM AND COMPONENTS THEREOF

[76] Inventors: Robert J. Kalthoff, 2560 Grandin Rd., Cincinnati, Ohio 45208; Paul J. Neumeier, 315 Miami Valley Dr., Loveland, Ohio 45140

[21] Appl. No.: 142,854

[22] Filed: Apr. 21, 1980

[51] Int. Cl.³ .............................................. B07C 5/36
[52] U.S. Cl. ......................................... 209/612
[58] Field of Search ................ 209/608, 609, 610, 611, 209/612; 414/134, 135, 136

[56] References Cited

U.S. PATENT DOCUMENTS 3,536,194 10/1970 Novak .................................. 209/610
3,786,916 1/1974 O'Brien ............................... 209/609

Primary Examiner—Allen N. Knowles
Attorney, Agent, or Firm—Wood, Herron & Evans

[57] ABSTRACT

Apparatus for automatic closed loop retrieval and return of a document, bearing coded document-identifying edge notching, from a mass document store. The mass document store contains plural, selectively retrievable cartridges normally stored at addressable locations, with each cartridge containing plural minicartridges at addressable locations within the cartridge. The documents, randomly stored in the minicartridges, are each coded with an identifying number which distinguishes each document from others in the same minicartridge. A cartridge retriever transfers a cartridge containing a desired document from its addressable storage location to a remote document selector whereat only the minicartridge containing the desired document is selected and released from the cartridge for operative cooperation with document selector to facilitate selection of the desired document therein. A selected document removal/return transport indexable to the selected minicartridge removes the selected document and transfers it to an aligned storage compartment of an intermediate buffer store containing plural document storage compartments. The intermediate buffer store, as well as the document removal/return transport, are addressable to the particular minicartridge of the retrieved cartridge at the document selector which contains the desired document.

Also included is a remote buffer store and an associated document transport for transferring documents between aligned document storage compartments of the intermediate buffer store and the remote buffer store. Finally, a document conveyor having an inlet proximate the intermediate buffer store and an outlet proximate the remote buffer store is provided.

90 Claims, 21 Drawing Figures

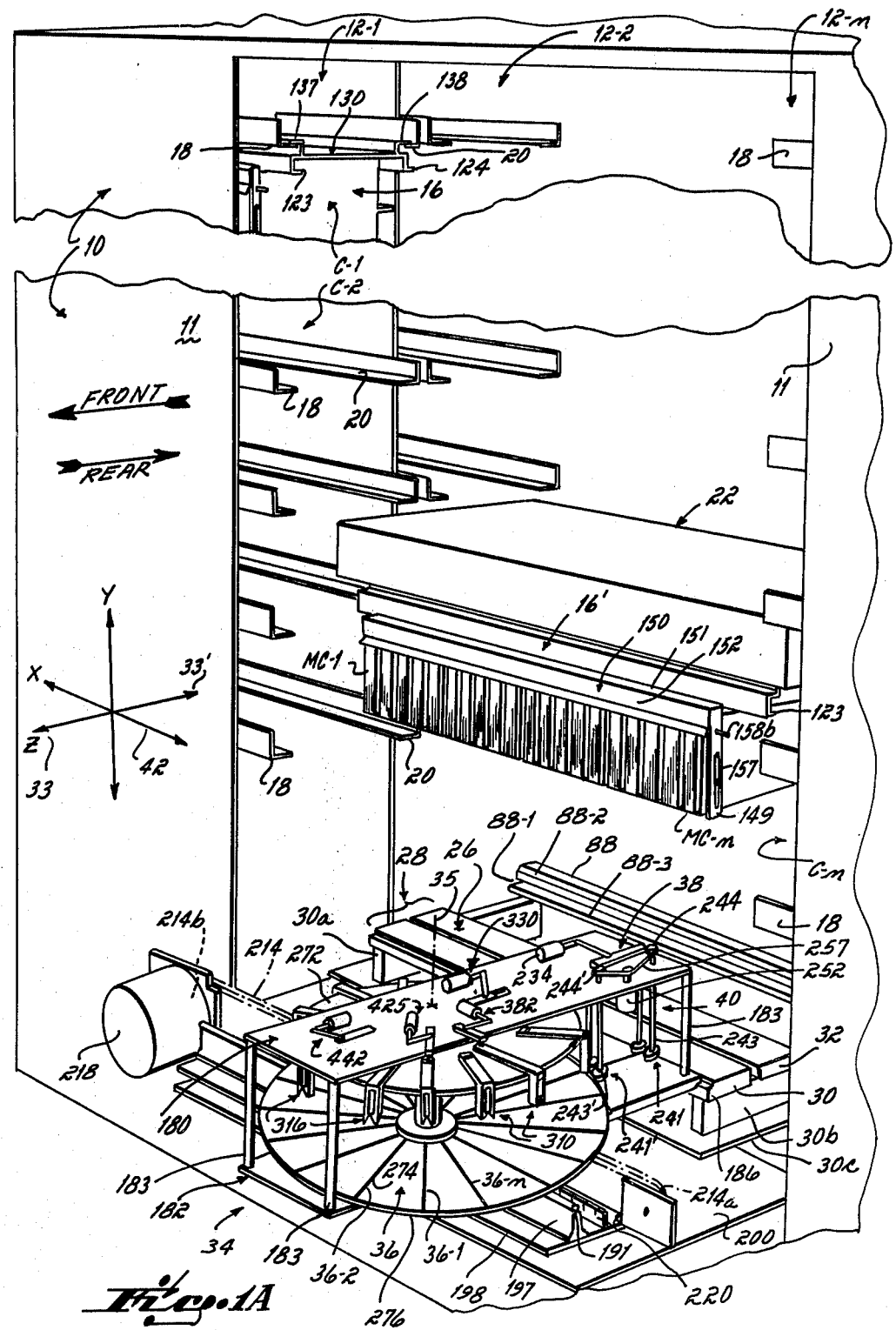

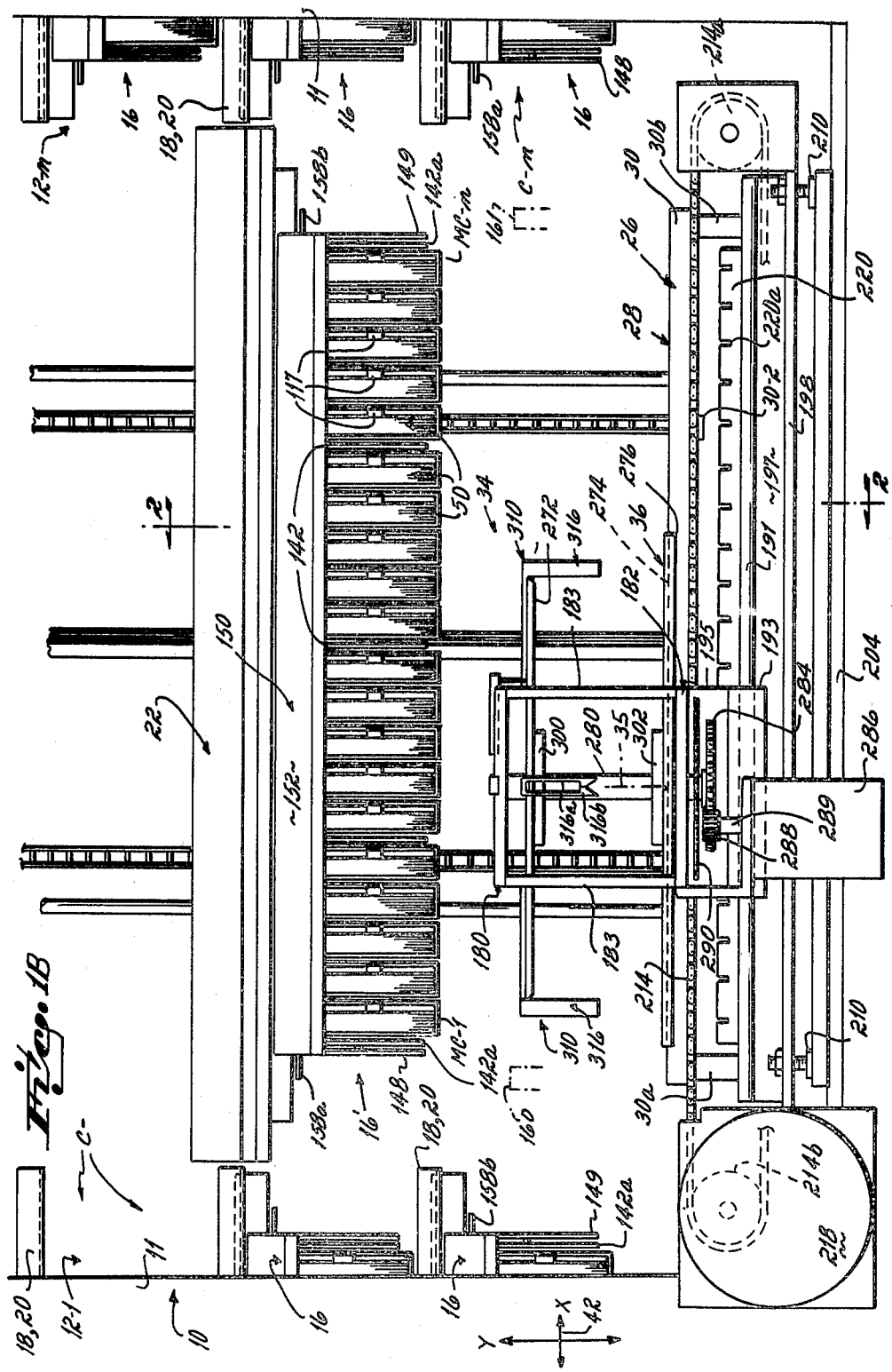

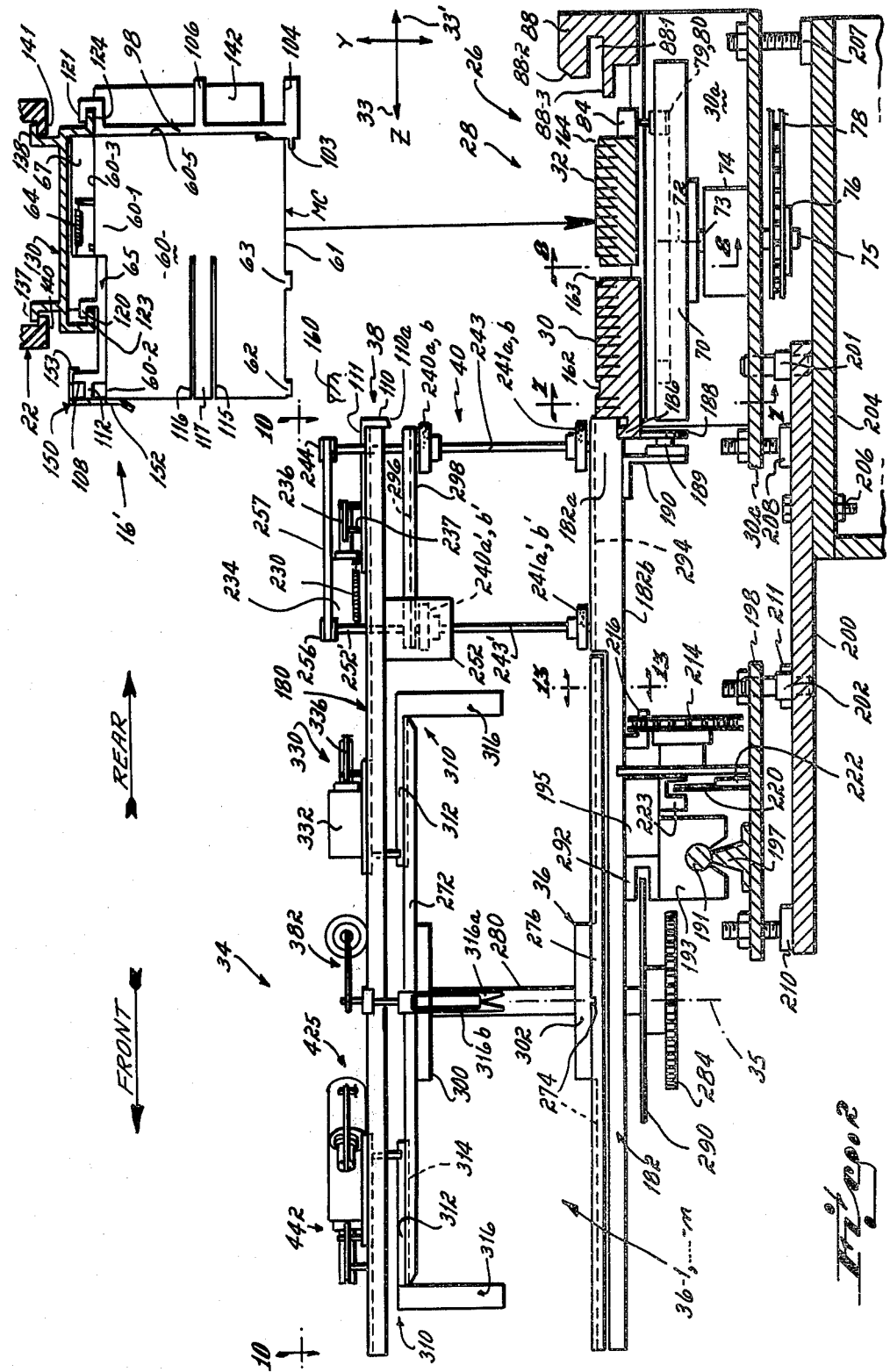

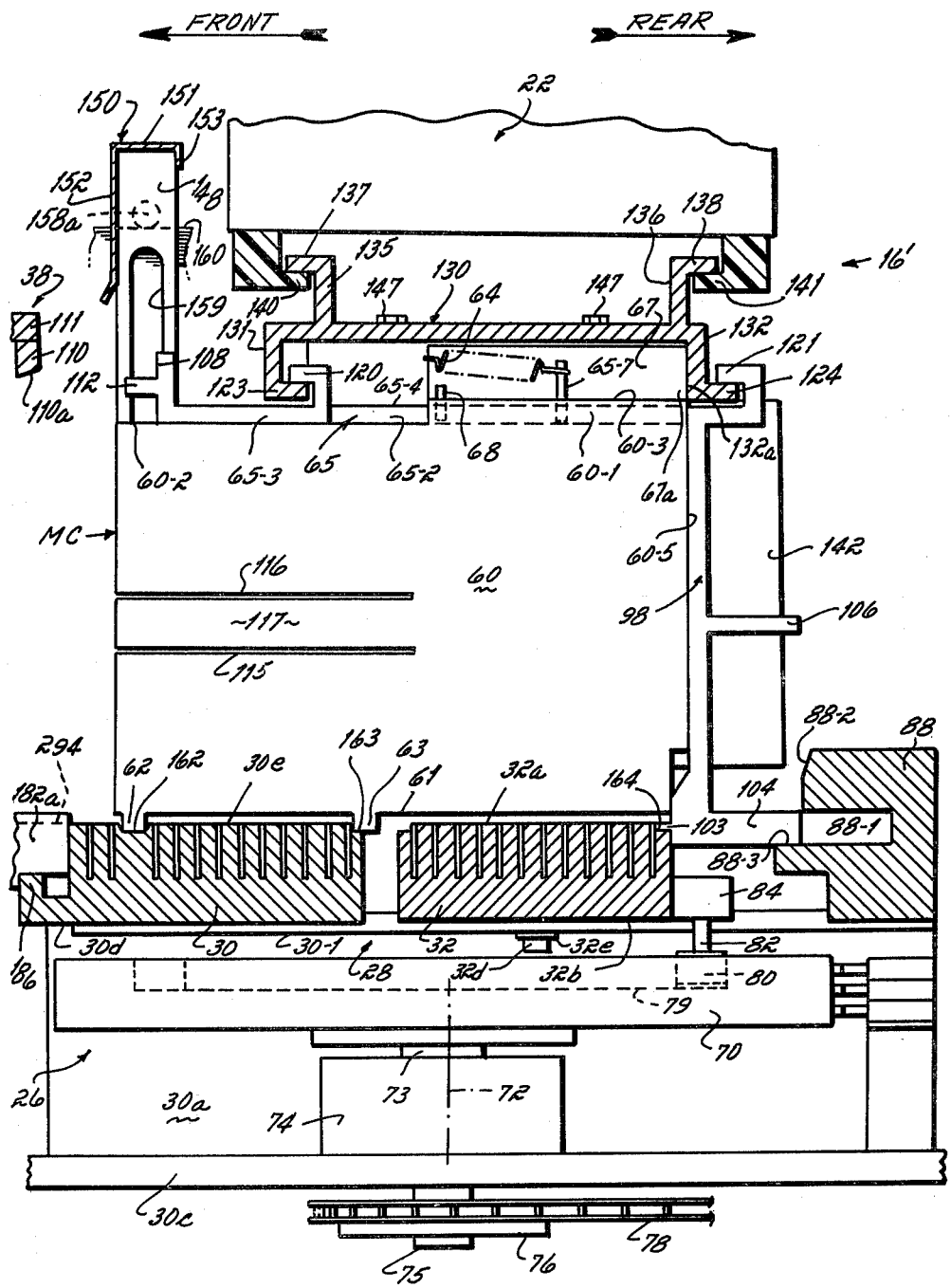

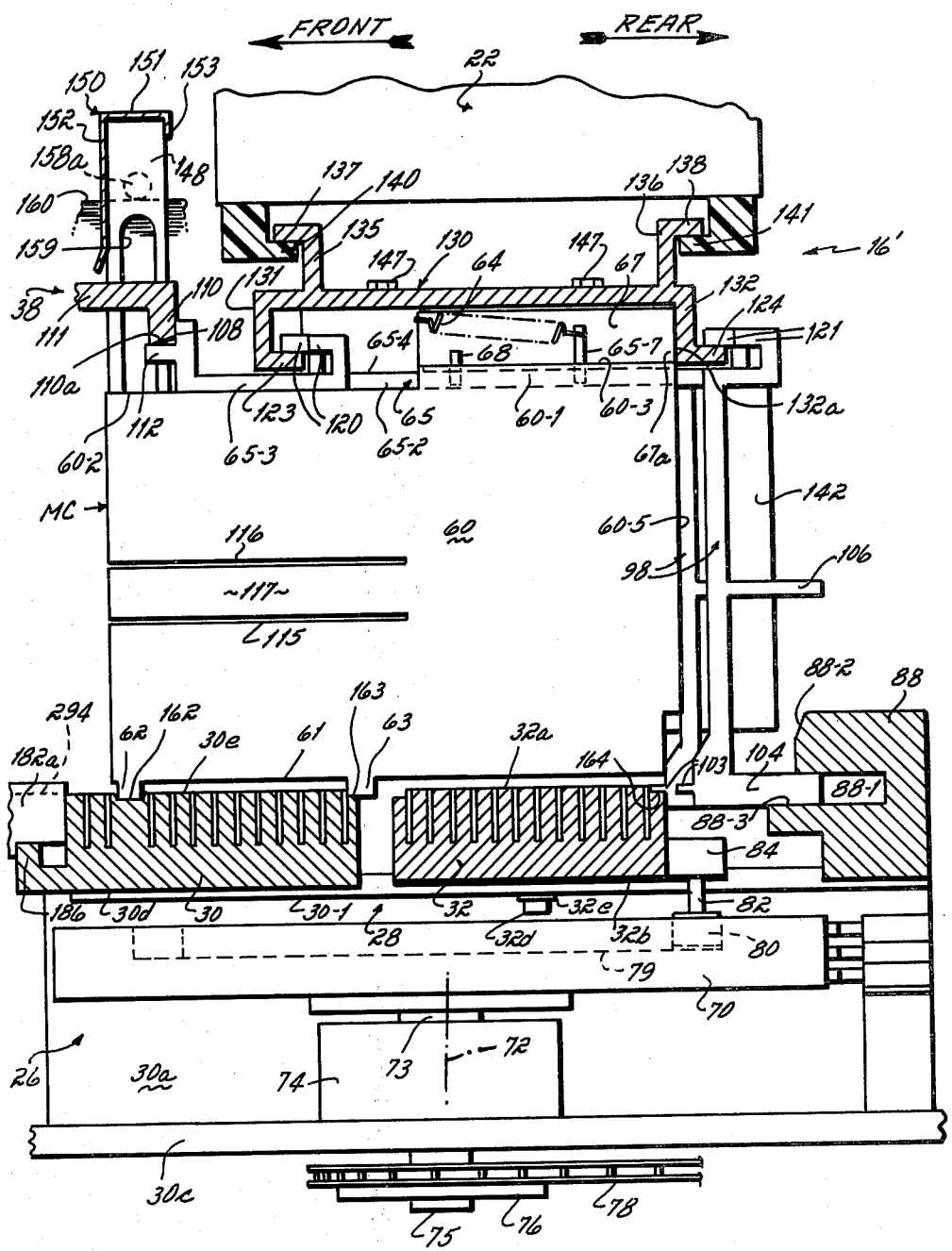

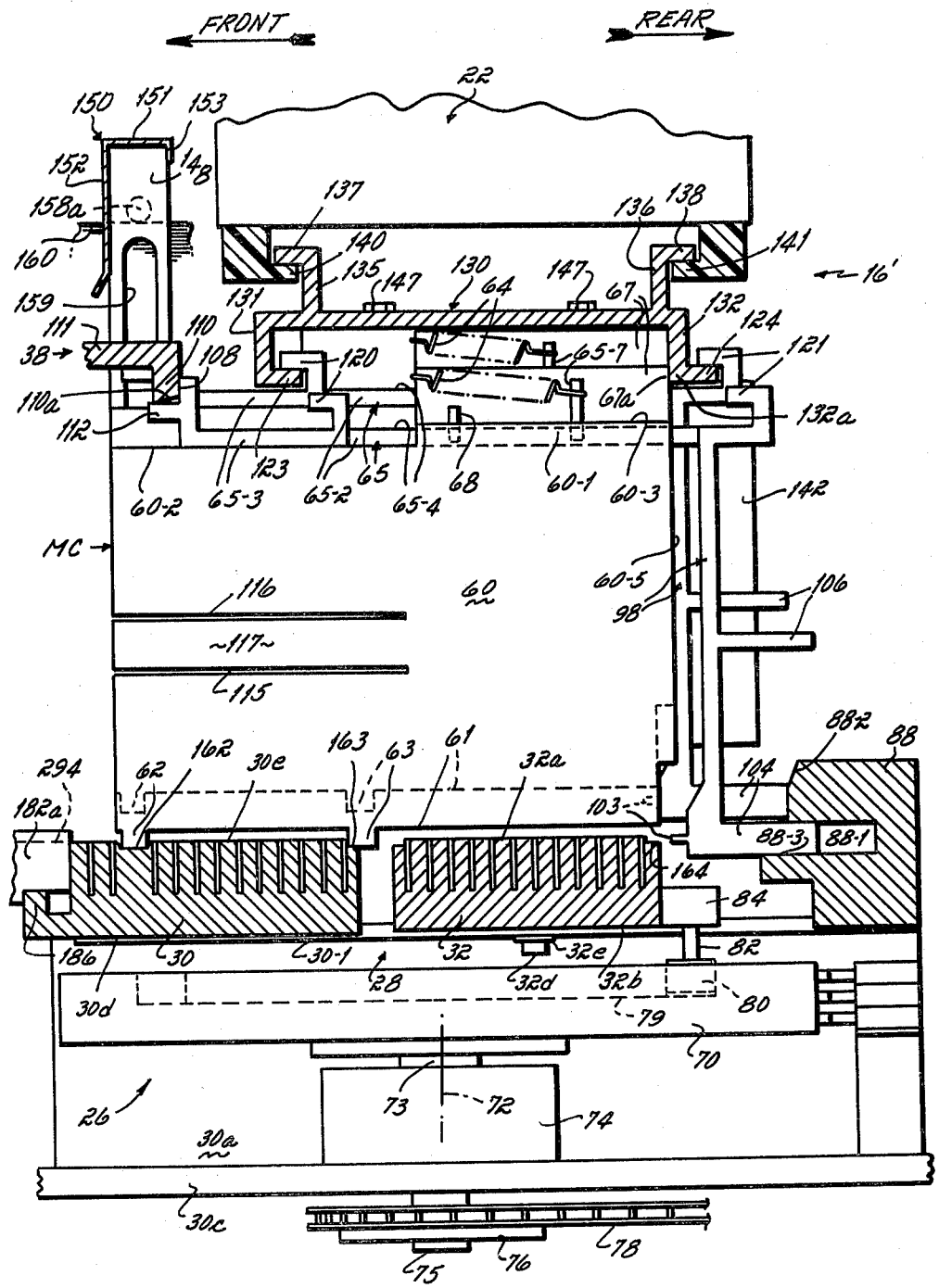

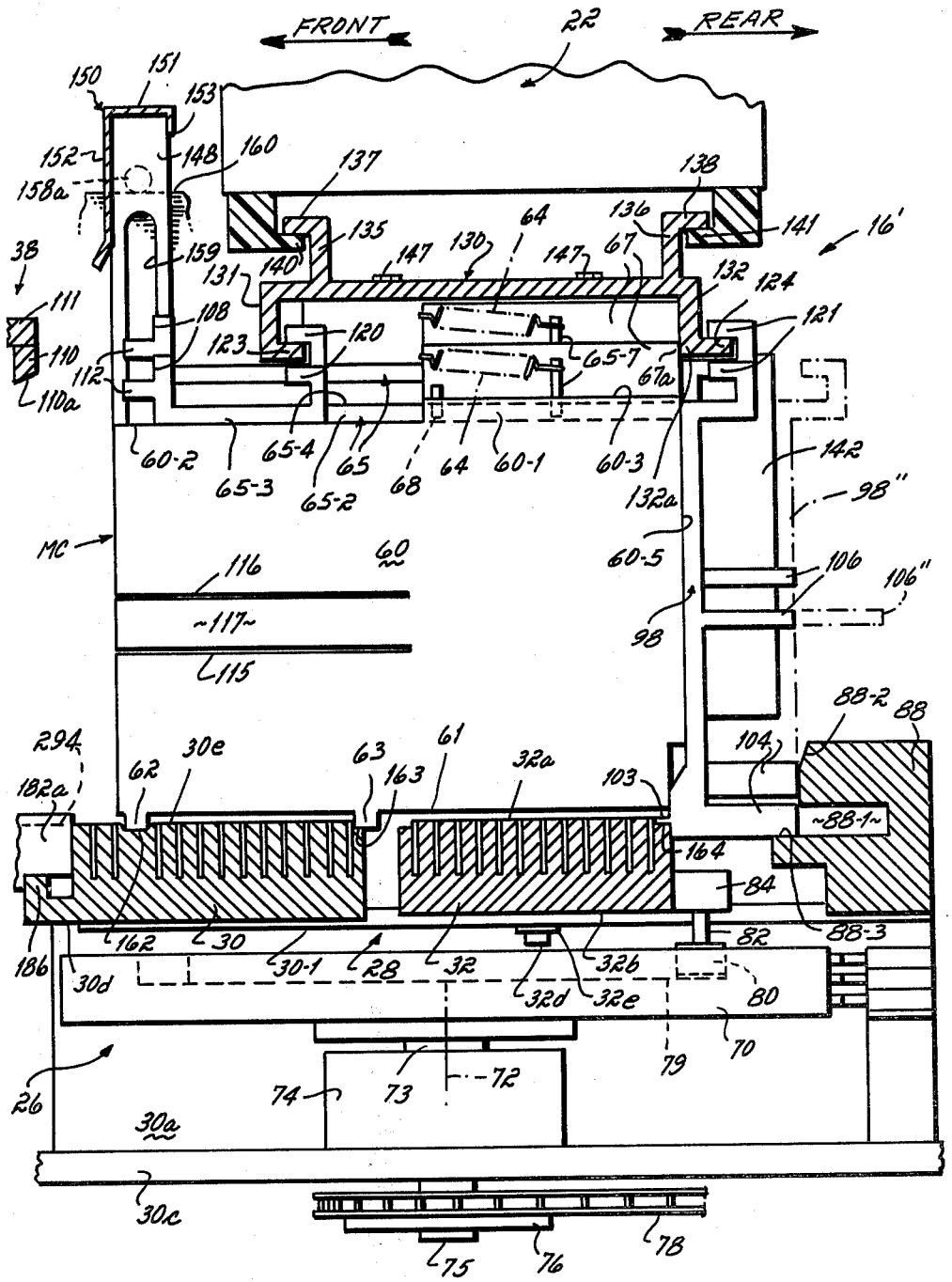

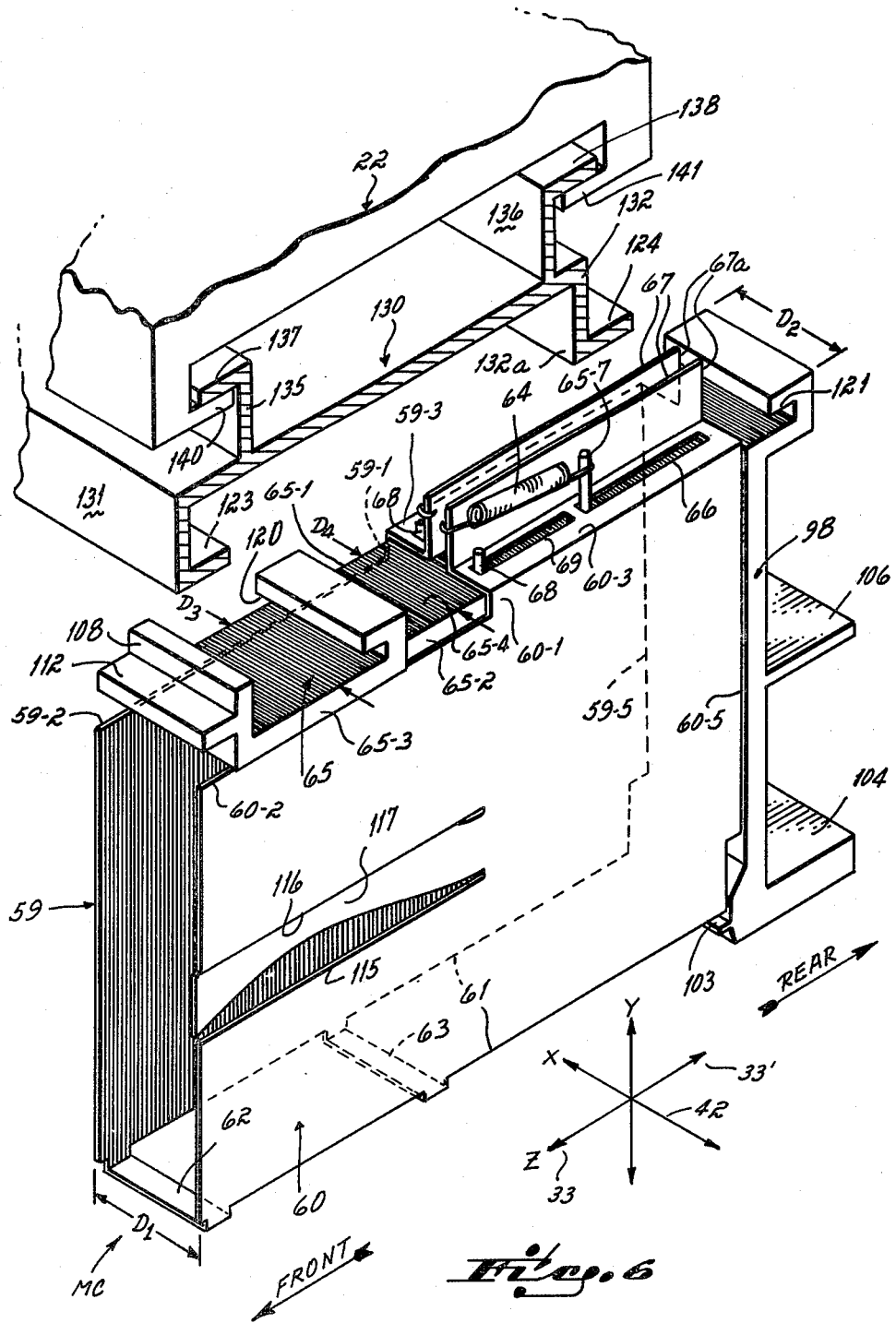

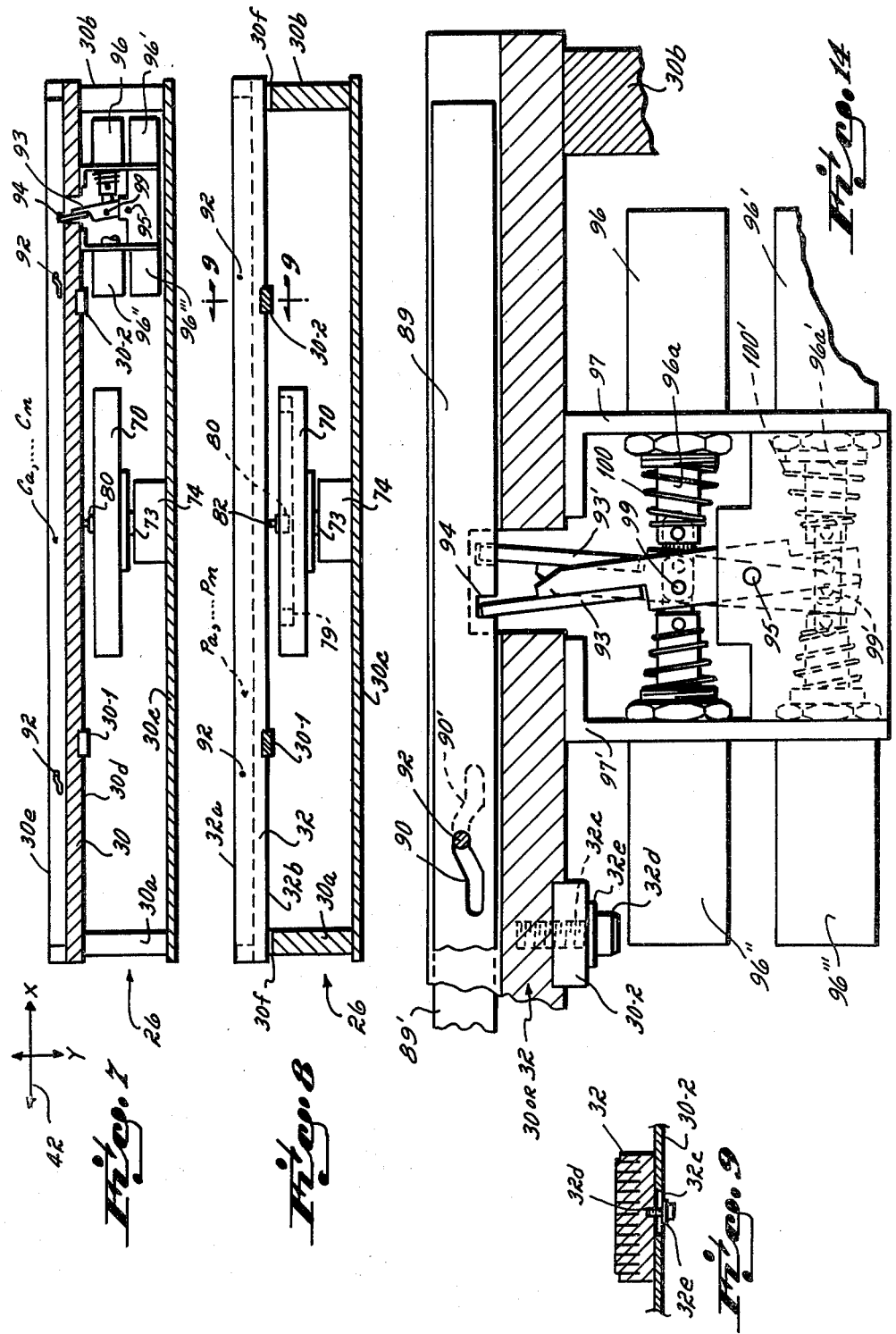

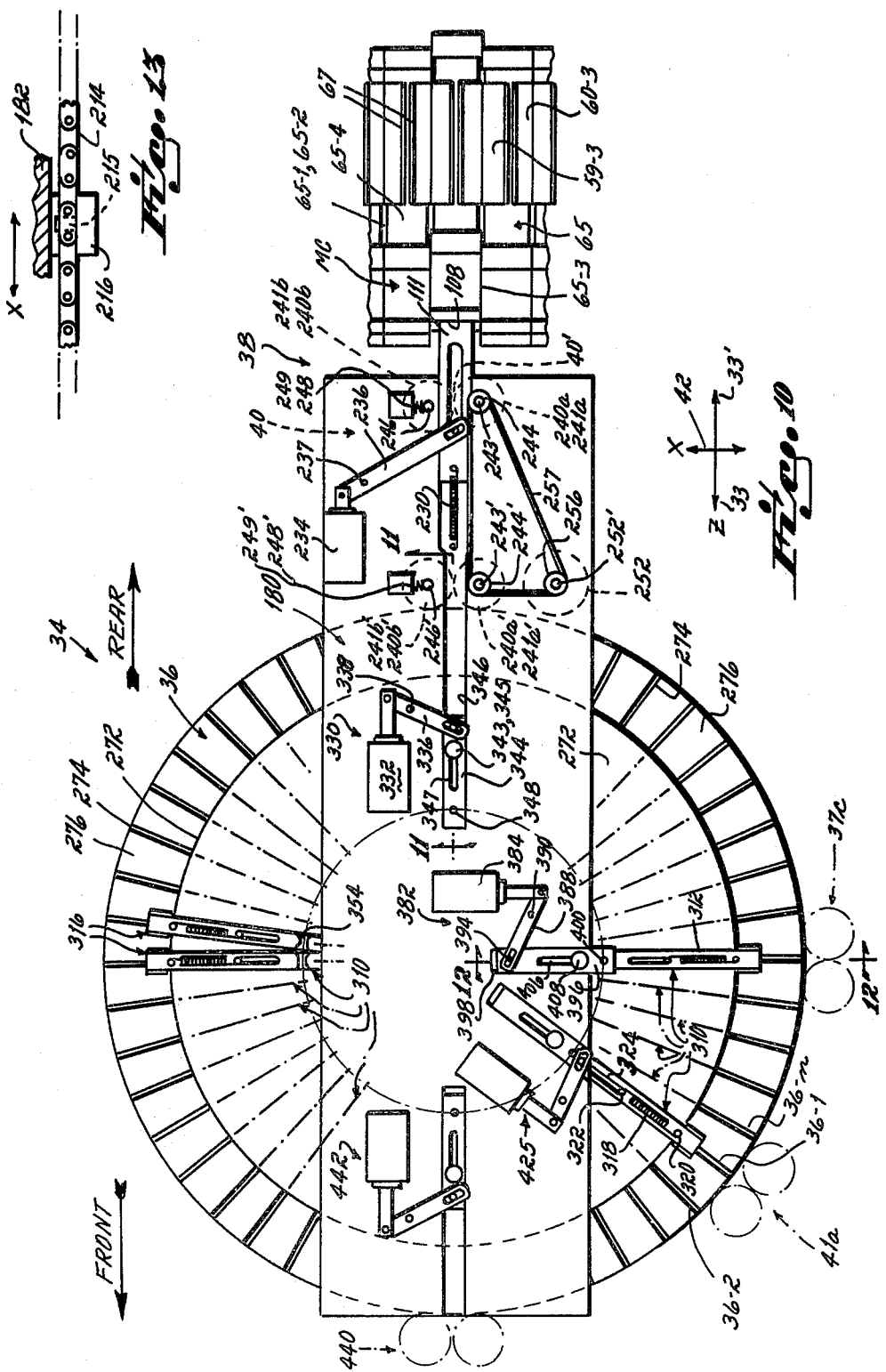

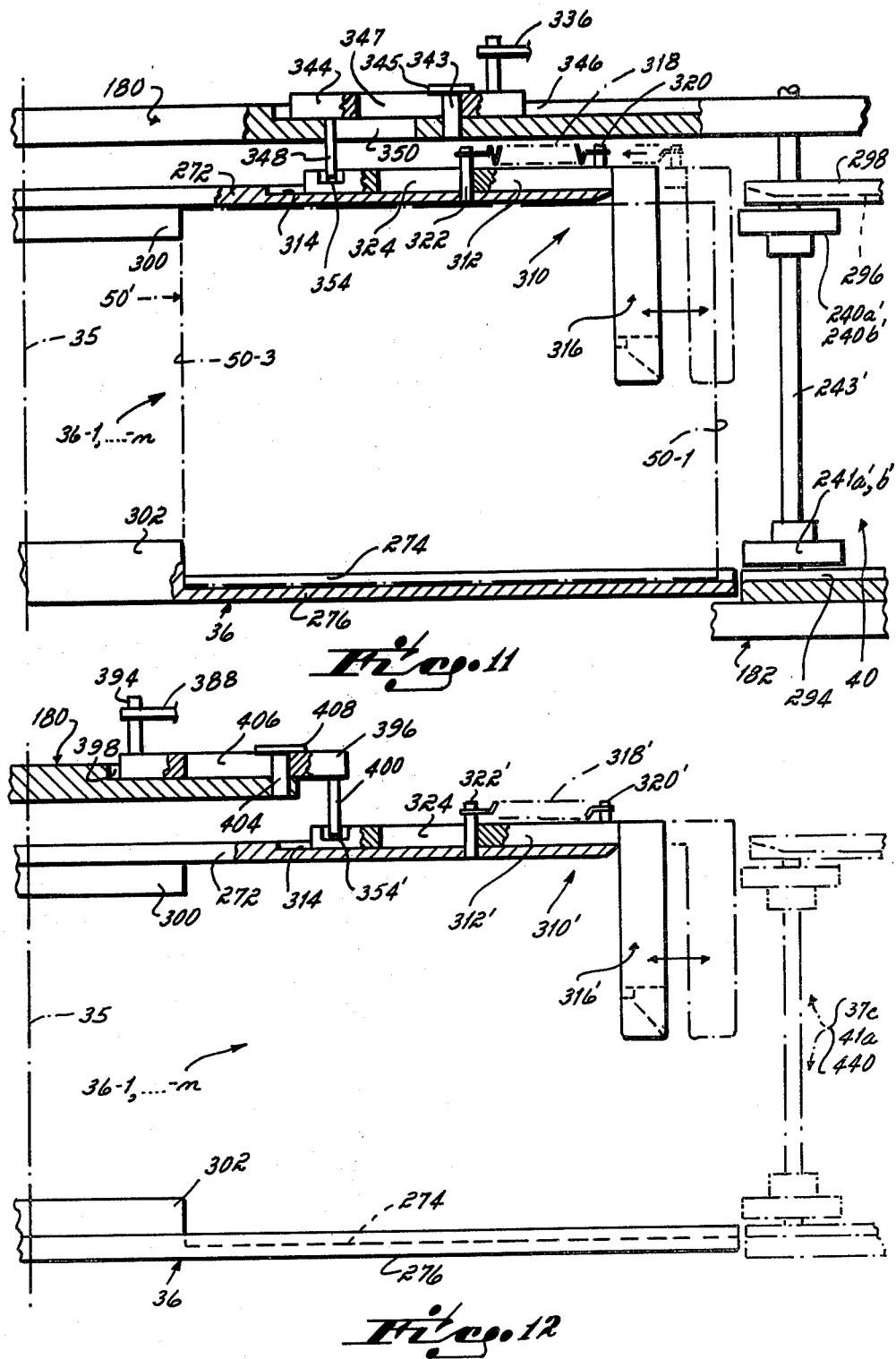

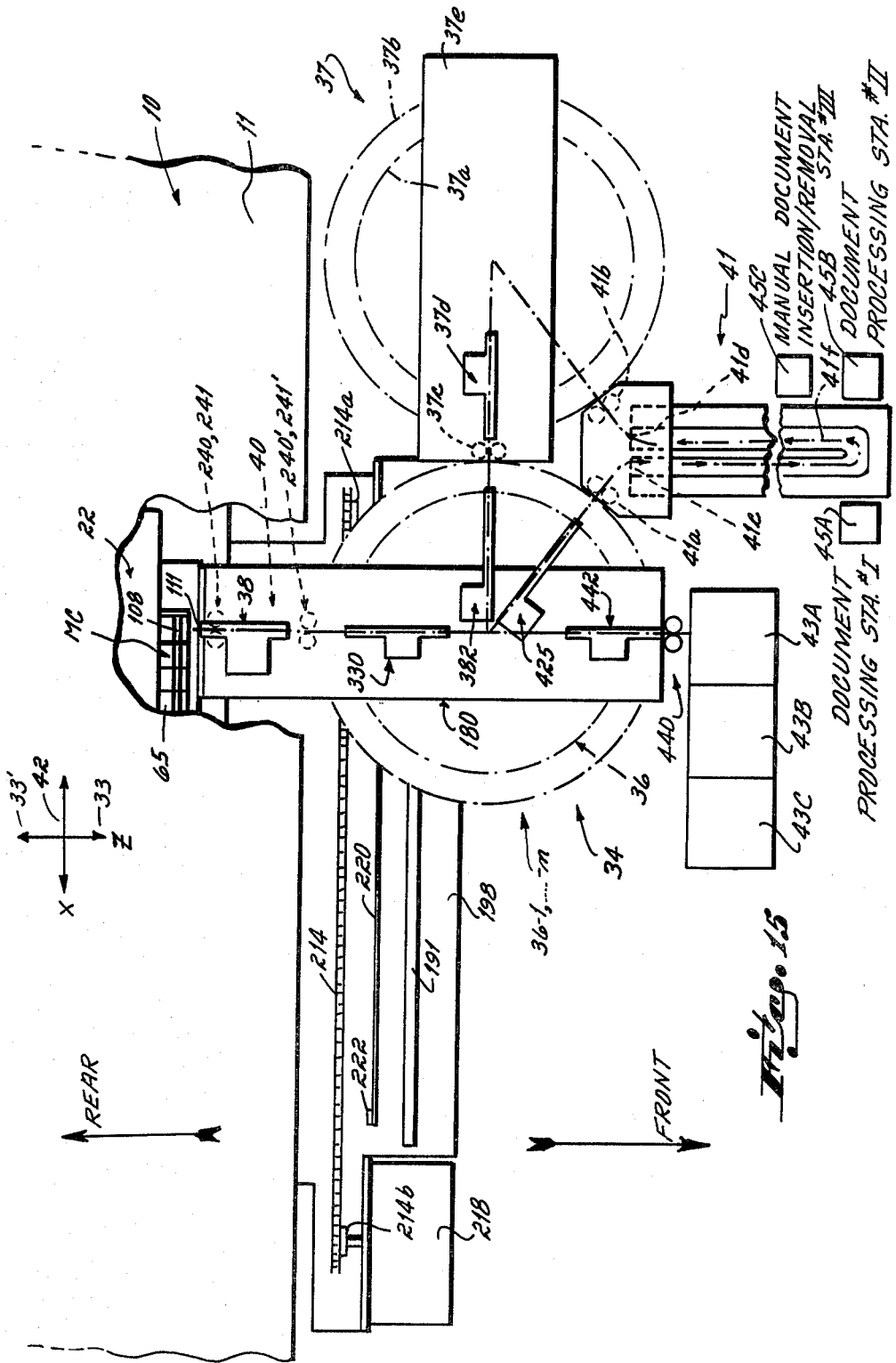

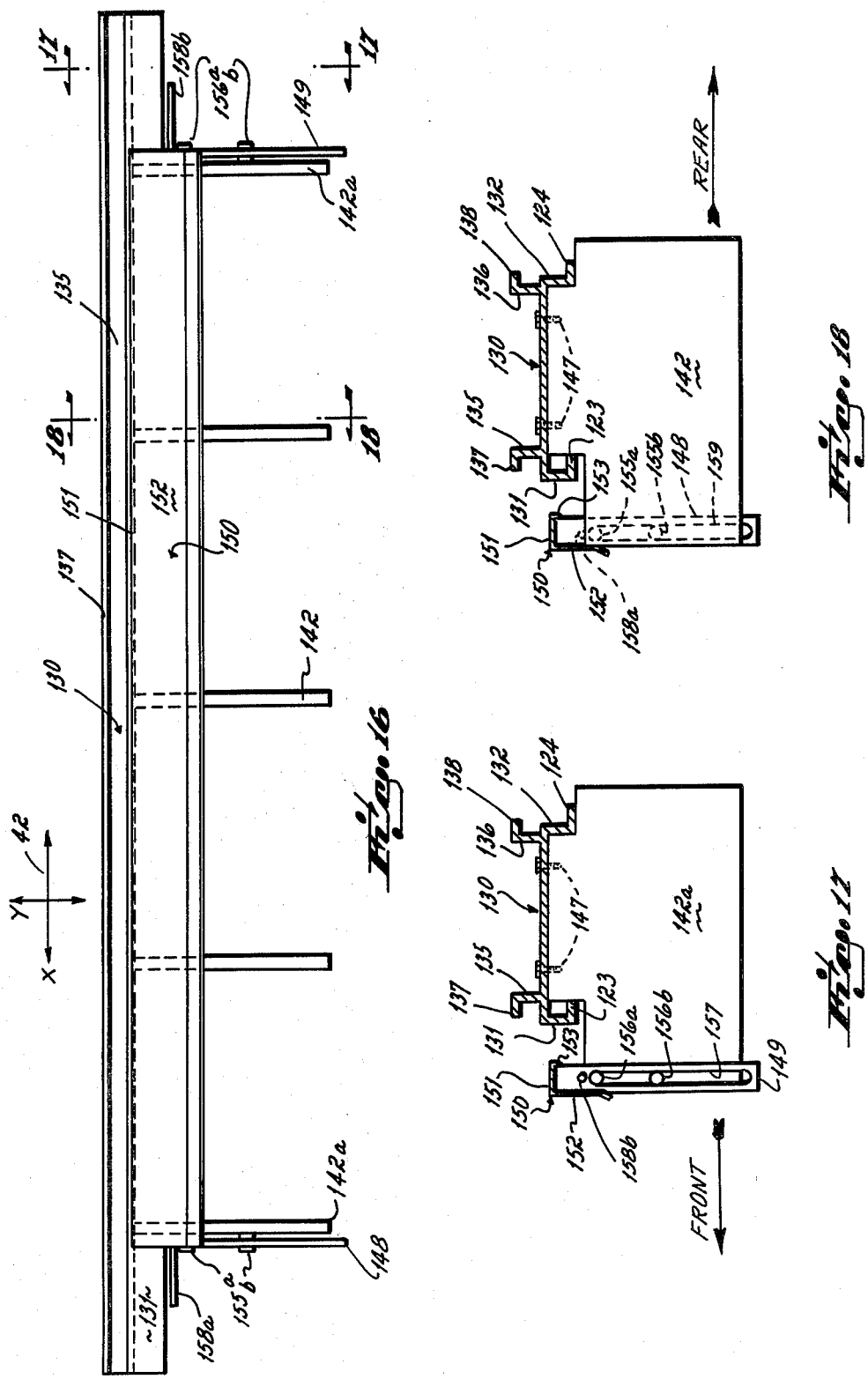

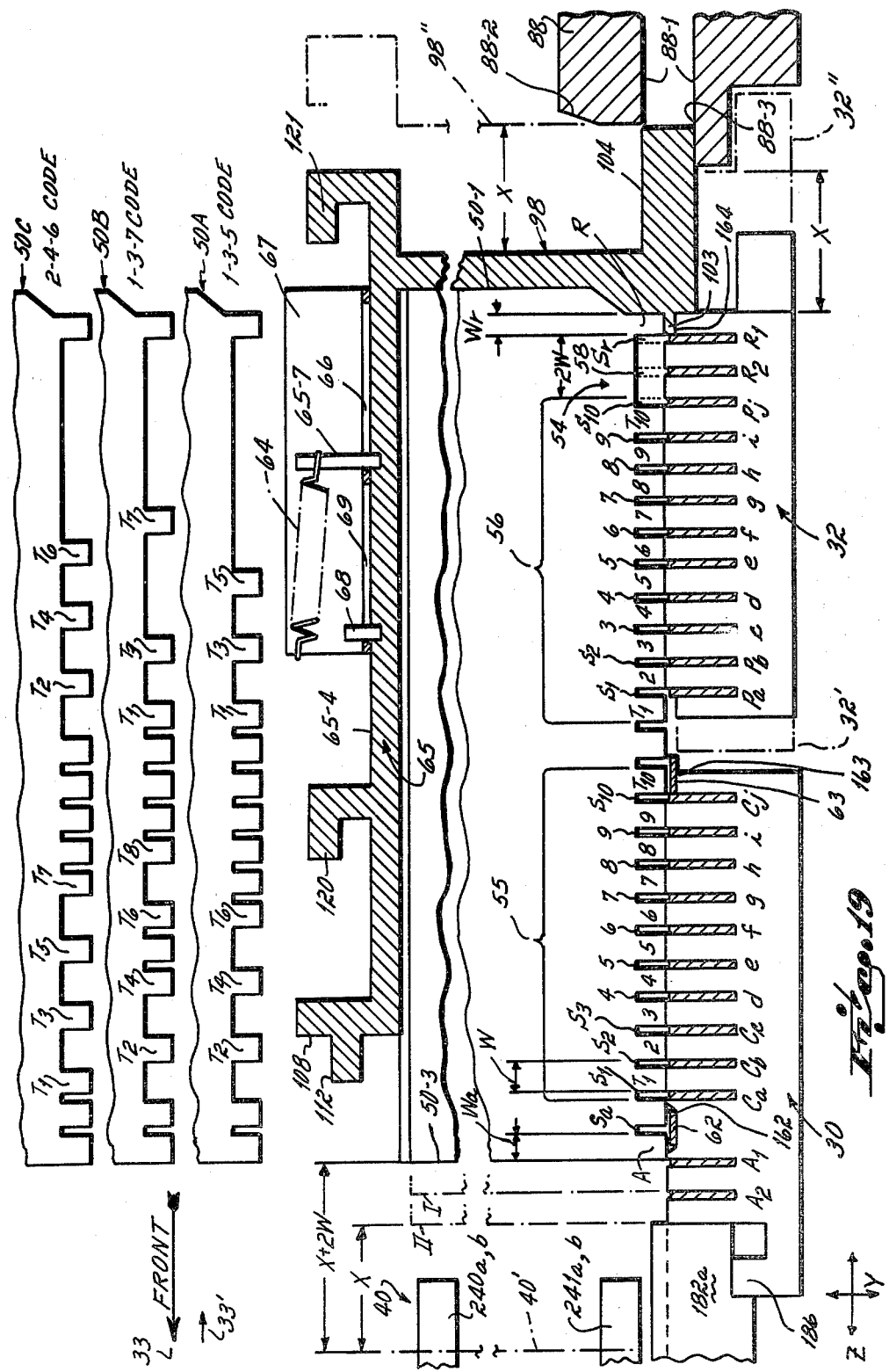

DOCUMENT RETRIEVAL SYSTEM AND COMPONENTS THEREOF

This invention relates to document retrieval, and more particularly to apparatus for retrieving a selected document from a mass document store, temporarily storing and/or processing the retrieved document, and thereafter returning the retrieved document to the mass document store.

Large scale document retrieval systems typically contain 100,000 or more documents, each of which is encoded with a machine readable document-identifying number. The documents are randomly stored in containers of one form or another holding anywhere from 50–2,000 or more documents depending upon the particular system. Each container is normally stored at a different addressable location of a mass document store. When a particular document is desired, the container in which that document is stored is retrieved from its normal location in the mass document store by a movable container transfer mechanism. The container transfer mechanism shuttles between the container locations and a remotely located document selector which has the capability of selecting from a retrieved document container deposited thereat the desired document randomly stored in that container.

In one prior art system, disclosed in O'Brien U.S. Pat. No. 3,786,916, the retrievable document containers hold approximately 2,000 documents, each document in a particular container being stored therein on a random basis. The document selector to which the retrieved container is delivered in the O'Brien system simultaneously searches all 2,000 documents for the desired document. When located, the desired document is partially ejected from the container for manual removal by the operator. After suitably processing the document, the operator manually inserts the document back into the container at the document selector and the container, assuming another document in that container is not desired, is returned to its addressable storage location in the mass document store by the container retrieval mechanism. If other documents in the retrieved container are desired, the container is returned only after these documents are located by the document selector, manually removed, processed, etc.

In accordance with another prior art system, disclosed in Novak U.S. Pat. No. 3,536,194, the documents are stored in containers which hold approximately 50–100 randomly-stored documents. The containers, in turn, are stored at addressable locations in a mass document store. When a desired document is needed, the container in which it is located is retrieved by a suitable container retrieval mechanism and brought to a document selector where the desired document is ejected from the container and automatically transported to a utilization station where, for example, the document is viewed by a video camera and an image of the document transmitted to a remote video monitor for viewing. When the document is no longer needed, it is automatically returned from the utilization station to its container located at the document selector, and the container returned to its addressable storage location in the mass document store by the container retrieval mechanism.

Each of the foregoing prior art systems has certain inherent disadvantages. For example, in the O'Brien system of U.S. Pat. No. 3,786,916, removal of a selected document from a retrieved container, as well as refiling of a document back to the container, is done manually. Manual handling of documents is not only relatively slow and expensive, but introduces human errors, such as inserting the document backwards into its container, that is, with its trailing edge forward and its leading edge rearward, which results in the inability to select the document in a subsequent document selection operation. Additionally, in the O'Brien system, since 2,000 documents are being searched simultaneously, the document coding system must be capable of distinguishing 2,000 different documents from each other, increasing the complexity of the coding scheme.

The Novak system of U.S. Pat. No. 3,536,194, while it does not have the disadvantages enumerated above found in the O'Brien system, nevertheless has shortcomings of its own which impose limitations on the capability of the system. For example, because the Novak containers hold a maximum of approximately 100 documents, the Novak mass document store requires approximately 20 times as many retrievable containers as an O'Brien system of comparable document capacity in which each container holds approximately 2,000 documents. The large number of containers needed in the Novak system imposes stringent positioning requirements on the container retrieving mechanism since it must be capable of addressing, in a 200,000 document system, 2,000 different containers rather than the 100 different containers of the O'Brien system.

Additionally, since a retrieved container of the Novak system contains a maximum of 100 documents, in contrast to 2,000 documents for the O'Brien system, the probability that two successive documents desired by an operator would be contained in the same container, thereby avoiding the necessity of retrieving a second container, is a mere fraction, namely, 5%, of that of the O'Brien system. Stated differently, with the O'Brien system wherein 2,000 documents are in the document selector at any given time as a result of retrieving a container, the chances are much greater than in the Novak system that the next document desired by the operator is also located in the container at the document selector, obviating the need for returning the container at the selector to its storage location in the mass document store and retrieving another container containing the second document desired. Because of the greater probability that two successive documents will reside in the same container in the O'Brien system vis-a-vis the Novak system, the average cycle time for selecting a document is reduced.

Another shortcoming of the Novak system is that no automatic buffer storage capability exists for plural documents retrieved from a single container. Thus, documents cannot be selected from the retrieved container any faster than they can be processed at the utilization station, such as, the remote viewing station.

It has been an objective of this invention to develop a large scale document retrieval system which overcomes the various disadvantages of prior art systems of the general type described, and yet retains many of the advantages individually present in one system or the other. This objective has been accomplished in accordance with certain of the principles of this invention by providing a system in which the documents are randomly stored in minicartridges containing approximately 100 documents, which minicartridges are in turn stored at addressable locations of retrievable cartridges normally stored at addressable locations of the mass document store. Additionally, a document selector remote from the mass document store is provided which has document selecting elements coextensive with an entire retrieved cartridge, but which is provided with minicartridge selecting means for selecting for search purposes at the document selector only that minicartridge of a retrieved cartridge containing the desired document.

An advantage of the system of this invention is that since the desired document is located within a minicartridge whose location in the retrieved cartridge at the selector is known, the time required for removing the desired document from the cartridge for transport to a utilization device can be reduced. This is possible because the selected document removal device can be indexed to the address of the minicartridge containing the desired document while the cartridge containing the minicartridge with the desired document is being retrieved from the mass document store and transported to the document selector. Thus, once the container is retrieved and deposited at the document selector, the minicartridge containing the desired document selected, and the desired document partially ejected from the selected minicartridge, the partially ejected document can be immediately removed from the selected minicartridge and transported to the utilization device since the selected document removal device is already positioned at the minicartridge containing the desired document. Whereas, and by way of contrast, in systems of the O'Brien type in which 2,000 randomly-stored documents are simultaneously searched, it is impossible to predict where the desired document is located within the cartridge and hence where it will be ejected. Thus, in such systems it is necessary to scan the entire length of the cartridge with the document removal mechanism. Such scanning takes a finite amount of time, and since it can only be done after the desired document is selected, the average cycle time for retrieval of a desired document is increased.

Another advantage of the system of this invention is that the selected document removal device can be utilized to return a previously selected document to its assigned minicartridge. As a consequence, not only is the cycle time reduced by reason of being able to eliminate relatively slow manual refiling, but refiling errors, such as insertion of a document backwards, are eliminated.

A still further advantage of the system of this invention is that since only 100 documents are searched, at any given time, the coding scheme can be simplified.

In accordance with another aspect of the invention, an intermediate buffer store is provided containing plural document storage locations selectively indexable with respect to the selected document removable device. Preferably, the intermediate buffer store is a rotary carrousel in which the document storage locations are circularly arranged. The intermediate buffer store, as well as the selected document removal device, move in unison with the minicartridge selector such that no time is lost, once a minicartridge is selected and the desired document partially ejected therefrom, in removing the selected document and storing it in a particular document storage location of the intermediate buffer store.

The intermediate buffer store provides the important capability of buffer storage between the document selector and document utilization means for documents retrieved from one or more minicartridges of a retrieved cartridge or cartridges.

In a preferred form of the invention, the intermediate buffer store carrousel includes upper and lower circular discs which on their confronting surfaces are provided with circularly arranged arrays of radial slots for guidingly slidingly receiving the upper and lower edges of a selected document inserted therein by the selected document removal device. To limit inward travel of documents in the document locations of the buffer, upper and lower hubs are provided on the confronting surfaces of the upper and lower discs. The circular peripheries of the hubs constitute upper and lower inner locating surfaces for the leading edges of documents inserted into the document storage locations of the buffer.

In accordance with a further aspect of the intermediate buffer store, a document gripper, preferably a pair of fingers, is provided for each document storage location of the buffer. The fingers form a slot into which an inserted document passes and is frictionally gripped. The fingers prevent bounce-back of an inserted document. In addition, the fingers, when moved radially outwardly by a suitable document gripper actuator, permit the radially outboard edge of a document in a storage location of the buffer to be inserted into the nip of the selected document removal transport which, assuming the transport is operating in the proper direction, returns the document to its associated minicartridges.

In accordance with a further aspect of the invention, a document conveyor is provided having a fixed path along with one or more document processing stations are located for processing documents conveyed therepast. Also provided is a second, or remote, document buffer store, preferably a rotary carrousel, which does not translate along the retrieved cartridge as the intermediate carrousel buffer store does in the course of operatively positioning itself in alignment with selected minicartridges of a retrieved cartridge at the document selector. The inlet end of the document conveyor is located in operative relation to the intermediate buffer store at one point along its path to facilitate transfer of a selected document temporarily stored therein to the conveyor. The outlet of the conveyor is positioned in operative relation to the remote carrousel buffer store to facilitate transfer to the remote buffer of a document exiting the conveyor subsequent to processing at one or more of the stations locating along its path.

In operation, a document selected and partially ejected from its minicartridge by the document selector, whereat the retrieved cartridge containing the selected minicartridge and desired document is located, is transferred by the selected document removal transport which is aligned with the selected minicartridge to the document storage location of the associated intermediate carrousel which is also aligned with the selected document removal transport. The intermediate buffer is then translated to position it proximate the inlet of the document conveyor and the intermediate buffer carrousel rotationally indexed to align the storage location thereof containing the desired document with the conveyor inlet. The desired document is transferred to the conveyor by a suitably located document transport, and the document processed as it travels along the conveyor path from its inlet to outlet. When the document reaches the outlet, it is transferred to an empty storage location of the remote buffer aligned therewith by a suitably located document transport. The remote buffer carrousel is then rotationally indexed to align the compartment thereof containing the desired document with a suitably positioned document transport for subsequent transfer of the document to the intermediate carrousel associated with the document selector. Once the document is transferred to the intermediate buffer carrousel, the carrousel is rotationally indexed to position the compartment thereof containing the document in alignment with the selected document removal transport aligned with the selected minicartridge for return of the document to its minicartridge.

In a preferred form of the invention, the minicartridges, which are structurally identical, each include a pair of spaced vertical side walls, an open front wall, a rear wall, a bottom retainer which spans a very limited portion of the bottom edges of the side walls, and an upper support member from which the minicartridge is releasably supported by the cartridge. The upper support member has at least one horizontally extending ledge which overlies a corresponding ledge of the cartridge extending in the opposite direction for supportingly suspending the minicartridge from the cartridge. The upper support member is movable between a normal position in which the cartridge and minicartridge ledges are engaged to suspend the minicartridge from the cartridge and a release position in which the minicartridge ledge is displaced rearwardly of the cartridge ledge, releasing the minicartridge from support by the cartridge. Bias means between the upper support member and an extension of the side walls biases the upper support member to its normal position. The upper portion of the rear wall is rigidly connected to the rear portion of the upper support member.

In operation, documents having a code-notched region along their bottom edge are placed in the minicartridges in face-to-face relation with their code-notched sorting edges lowermost and the code-notched region thereof clear of the bottom retainer which spans the bottom edges of the minicartridge side walls for vertically supporting the documents. The minicartridges are then placed in the cartridge at addressable locations thereof with their support ledges overlying the cartridge support ledge. The cartridges, in turn, are positioned at addressable locations in the mass document store.

To retrieve a desired document, a suitable cartridge retriever moves to the addressable location where the cartridge containing the desired document is located and transfers the cartridge to the remotely located document selector. When the retrieved cartridge is deposited at the document selector, all minicartridges thereof initially seat atop a horizontal platen containing document selecting elements which cooperate with the notched sorting edges of the documents to horizontally displace the desired document through the front wall of its associated minicartridge. With all minicartridges resting on the platen, a minicartridge selector, which is preferably indexed to a position opposite the minicartridge containing the desired document while the cartridge is being retrieved and deposited at the document selector, is activated, pushing the upper support element of the minicartridge containing the desired document rearwardly relative to both the remaining portions of the selected minicartridge and the cartridge support ledge, disengaging the support ledge of the selected minicartridge from the cartridge support ledge. With the support ledge of the selected minicartridge so positioned, the cartridge retriever elevates the retrieved cartridge slightly, raising the unselected minicartridges to disengage the sorting edges of the documents therein with respect to the selecting elements of the platen. At this point, only the documents in the selected minicartridge remain in operative document selecting relation to the sorting elements of the document selector.

The sorting elements of the document selector are now suitably activated and the desired document of the selected minicartridge displaced forwardly through the open front wall thereof to a position where its leading edge enters the nip of the selected document removal transport which travels in unison with the minicartridge selector and hence is also in alignment with the selected minicartridge. The selected document is removed by the transport and transferred into a storage compartment of the intermediate carrousel buffer aligned therewith which, like the selected document removal transport, also moves in unison with the minicartridge selector.

After the selected minicartridge has been released from the cartridge and the cartridge elevated to operatively disengage the sorting edges of the undesired documents in the unselected minicartridges with respect to the document select elements of the platen, but prior to activation of the document select elements to select the desired document from the selected minicartridge, the minicartridge selecting mechanism is deactuated, allowing the upper support member of the selected minicartridge to which the rear wall is rigidly connected to return to its forward position, returning the rear wall to its forward position. This enables the rear wall of the selected minicartridge, during the ensuing document selection operation, to operate as a reference surface against which the rear, or trailing, edges of the documents can be engaged for proper location of the notches in the sorting edges thereof with the appropriate platen selector elements which are disposed transverse to the document sorting edges.

In a preferred form of the invention, the platen of the document selector includes a stationary forward section and a movable rear section. In the course of a document selection operation, the rear movable platen section reciprocates from a central home position rearwardly to a rear position and forwardly to a forward position. When the rear platen moves from its home position to its forward position, the movable rear wall of the selected minicartridge, which has its forward movement limited by the cartridge side walls, remains stationary, providing a stationary reference for the rear or trailing edges of the documents. However, when the movable rear platen reciprocates between its home position and its rear position, which occurs at the end of the document selection operation to advance the selected document into the nip of the document transport for transfer to the intermediate rotary carrousel buffer, the rear wall of the selected minicartridge moves rearwardly with the rear platen, preventing damage to the trailing edges of the unselected documents in the selected minicartridge which move rearwardly with the movable rear platen section.

In accordance with a further aspect of the minicartridge of this invention, the rear wall of each minicartridge is provided with a rearwardly-extending ledge having a length, measured in the direction of rearward movement of the rear wall during the document selection process, which exceeds the extent of rearward movement of the rear wall. In this way, the ledges of unselected minicartridges located on either side of a selected minicartridge provide a guiding barrier for the rear wall of the selected minicartridge, precluding undesirable lateral displacement of the rear wall when in its rear position which, if permitted to occur, could prevent the rear wall from fully returning to its forward position when the rear platen section returns from its rear position to its home position at the conclusion of a document selecting operation. Were the rear wall to fail to return to its normal forward position at the conclusion of the document selection operation, the upper support member of the minicartridge from which the support ledge extends, which is integral with the rear wall, would be displaced rearwardly of its normal position, that is, in its release position. With the upper support member of the selected minicartridge in its release position, the selected minicartridge could not be reacquired by the cartridge when return of the cartridge to the mass document store is desired.

In accordance with a further aspect of the invention, the rear wall of each minicartridge is provided with a rearwardly-extending lower ledge. When the integral upper support member and rear wall are urged rearwardly by the minicartridge selector to release the selected minicartridge from the cartridge, the rear ledge enters an appropriately located slot in the stationary rear wall of the document selector. Engagement of the minicartridge rear wall ledge in the selector rear wall slot holds the rear portion of the selected minicartridge against the platen and against upward movement when the cartridge elevates slightly subsequent to release of the selected minicartridge to disengage the sorting edges of the undesired documents in the unselected minicartridges from the selecting elements of the document selector platen.

To hold down the forward portion of the selected minicartridge while the cartridge elevates slightly to disengage the selector elements and the sorting edges of the undesired documents in the unselected minicartridges, a forwardly-extending horizontal ledge is provided at a point slightly below the point where the minicartridge selector engages the upper support member of the minicartridge to move it rearwardly from its normal position to its release position. The forwardly-extending ledge, should the selected minicartridge attempt to move upwardly with the unselected minicartridges due to frictional forces therebetween, abuts the minicartridge selecting element located slightly above it, precluding appreciable undesirable upward movement of the forward portion of the selected minicartridge relative to the platen.

To limit movement of the upper support member of the minicartridge relative to the side walls solely to the forward/reverse direction, the side walls of the minicartridge are provided with upper marginal sections which are disposed on either side of a substantial portion of the upper support member. The upper marginal extensions of the minicartridge side walls effectively provide a forward/rearward channel along which the upper support member slides in a forward and rearward direction.

To limit undesirable forward movement of the rear wall relative to the side walls, the width of the rear wall exceeds the spacing between the side walls. With the side wall spacing and rear wall width so dimensioned, the rear wall abuts the vertical rear edges of the side walls when the upper support member of the minicartridge is in its normal position, precluding forward movement of the rear wall forwardly of the position it occupies when the upper support member is in its normal position. In this way, proper positioning of the minicartridge rear wall, which operates as a locating surface for the trailing edges of the documents during a document selecting operation, is assured.

Finally, and pursuant to a still further and equally important aspect of the invention, one or more document transports are located at different points along the path of the intermediate buffer as it addresses different minicartridges of a retrieved cartridge at the selector. Documents removed from selected minicartridges can be input to one or more of the document processing stations, via the intermediate buffer, for processing thereat, and thereafter returned to their respective minicartridges via the intermediate buffer. In this way, documents can be processed directly by a selected document processor, without need for passing them through a document conveyor sequentially past plural document processors, many of which may not be needed for processing the document.

These and other features, advantages, and objectives of the invention will become more readily apparent from a detailed description thereof taken in conjunction with the drawings in which:

FIG. 1A is a front perspective view of the document retrieval system of this invention showing the general relationship of a document selector which selects a desired coded edge-notched document from an addressed minicartridge of a cartridge containing plural minicartridges located thereat; a mass document store consisting of plural selectively retrievable cartridges normally stored at different addressable crypts with each cartridge containing plural minicartridges; and a selected document removal/return transport and intermediate buffer store which indexes relative to the document selector to address a particular minicartridge of a cartridge positioned at the document selector.

FIG. 1B is a front elevational view of a portion of the document retrieval apparatus of this invention showing the cartridge retriever, with a retrieved cartridge suspended from it, located above the card selector.

FIG. 2 is a cross sectional view of the document selector and the selected document removal/return transport and intermediate buffer store taken along lines 2—2 of FIG. 1B.

FIG. 3 is a side view in cross-section of the cartridge retriever, document selector, and retrieved cartridge showing the cartridge at the document selector, with all minicartridges thereof resting on the platen of the document selector, prior to release of the desired minicartridge.

FIG. 4 is a side view in cross-section of the cartridge retriever, retrieved cartridge, and document selector showing a selected minicartridge in its released position relative to the cartridge, the selected minicartridge and unselected minicartridges all resting on the platen of the document selector.

FIG. 5 is a side view in cross-section of the cartridge retriever, document selector, and retrieved cartridge showing unselected minicartridges spaced above the platen, and the selected minicartridge in the position in which it is placed for selection from the undesired minicartridges.

FIG. 5A is a side view in cross-section of the cartridge retriever, document selector, and retrieved cartridge showing the selected minicartridge released from the cartridge and in operative position relative to the document selecting platen, with the unselected minicartridges spaced above and out of operative relation with the platen.

FIG. 6 is a perspective view of a minicartridge and the associated portion of the cartridge engageable therewith, and the portion of the cartridge retriever which engages the cartridge.

FIG. 7 is a cross-sectional view taken along line 7—7 of FIG. 2 showing the stationary front platen, document select blades, movable rear platen actuator, and document select blade actuators.

FIG. 8 is a cross-sectional view taken along line 8—8 of FIG. 2 showing the movable rear platen and the stationary horizontal guide rails on which the rear platen translates between its forward and rear positions.

FIG. 9 is a cross-sectional view taken along line 9—9 of FIG. 8 showing the manner in which the movable rear platen is secured for limited sliding movement to the underlying horizontal stationary guide rails.

FIG. 10 is a top plan view of the selected document removal/return transport and intermediate buffer store showing the minicartridge releasing finger thereof in an advanced position releasing a selected minicartridge from a retrieved cartridge at the document selector as seen along lines 10—10 of FIG. 2.

FIG. 11 is a cross-sectional view along line 11—11 of FIG. 10 showing a document gripping device of the type found in each document bin of the intermediate buffer store and its associated actuating mechanism which facilitates initial transfer of a document from a document bin of the intermediate buffer store to its associated minicartridge.

FIG. 12 is a cross-sectional view along line 12—12 of FIG. 10 showing a document gripping device of a bin and its associated actuating mechanism for facilitating transport of a document from a bin of the intermediate buffer store to a remote buffer store.

FIG. 13 is a cross-sectional view taken along line 13—13 of FIG. 2 showing the chain drive for longitudinally indexing the selected document removal/return transport and intermediate buffer store to a selected minicartridge of a cartridge located at the selector.

FIG. 14 is a cross-section of a portion of the document selector platen showing the actuators for reciprocating the document select blades in a vertical direction as seen if viewed from the front.

FIG. 15 is a top plan view showing the overall relationship of a retrieved cartridge at the document selector apparatus, the selected document removal/return transport and intermediate buffer store addressed to a particular minicartridge of the retrieved cartridge, a remote buffer store, plural document processing stations located along the path of the intermediate buffer store to which selected documents can be directly input/output for processing via the intermediate buffer store, and a closed loop conveyor for transporting selected documents from the intermediate buffer store to the remote buffer store via a path containing one or more input/output devices for processing the retrieved document.

FIG. 16 is a front elevational view of a cartridge with all minicartridges removed therefrom.

FIG. 17 is a cross-sectional view taken along line 17—17 of FIG. 16 showing the righthand end of the cartridge.

FIG. 18 is a cross-sectional view taken along line 18—18 of FIG. 16 showing a minicartridge separator panel.

FIG. 19 is a schematic side elevational view of the movable and fixed platens of the document selector showing in operative relation thereto an uncoded document and several coded documents.

The document retrieval apparatus of this invention, as more particularly seen in FIGS. 1A and 1B, includes a mass document store 10 located within a cabinet 11 provided with a front access opening 11'. The mass document store 10 includes a plurality of addressable crypts C-1, C-2, . . . C-n arranged vertically one above the other in adjacent columns 12-1, 12-2, . . . 12-n. Normally stored in each one of the crypts of the crypt columns 12 is a cartridge 16, one of which is shown in the uppermost crypt C-1 of column 12-1 in FIG. 1A. Each cartridge contains a plurality of minicartridges MC-1, MC-2, . . . MC-n. Located in each of the minicartridges is a plurality of coded edge-notched documents, preferably cards of the type shown in FIG. 19 to be described in more detail hereafter, although other types of documents can be utilized. Each cartridge 16 is removably supported in its respective crypt C-1, C-2, . . . C-n by a pair of generally horizontal, spaced-apart, confronting, cartridge support rails 18 and 20, with respect to which the upper portion of the cartridge slides to facilitate insertion and removal of the cartridge with respect to its crypt.

A cartridge retriever 22 is also provided which is selectively indexable horizontally along the Z axis to align itself with individual crypt columns 12-1, 12-2, . . . 12-n and selectively indexable vertically along the Y axis in alignment with selected ones of the crypts C-1, C-2, . . . C-n of a selected crypt column. The cartridge retriever 22 is provided to retrieve and return selected cartridges to and from their associated crypts. In addition to the cartridge retriever 22 being selectively positionable in alignment with a particular vertical crypt column and in alignment with a particular crypt of a selected column, the cartridge retriever 22 also includes means (not shown) for engaging a cartridge aligned therewith and transferring it along the X axis from its associated crypt onto the cartridge retriever as well as returning a cartridge on the cartridge retriever to its associated crypt. The horizontal and vertical drive means (not shown) of the cartridge retriever 22 is also operable to deliver a retrieved cartridge to a card selector 26, to be described in more detail hereafter, as well as return a cartridge from the card selector to its associated crypt.

The array of addressable crypts C-1, C-2, . . . C-n, as well as the cartridge retriever 22 for transporting retrieved cartridges 16 between the card selector 26 and its respectively associated addressable crypt, forms no part of this invention, and accordingly, is not described in further detail herein. A crypt array and cartridge retriever suitable for utilization in the automatic document retrieval apparatus of this invention is described in U.S. Pat. No. 3,786,916 assigned to O.K. Partnership in the name of Richard C. O'Brien. The entire disclosure of U.S. Pat. No. 3,786,916 is expressly incorporated herein by reference.

The card selector 26, in a preferred form of the invention, is located adjacent the forwardmost crypt column 12 at a point below the lowermost crypt therein. The card selector includes a planar, horizontally disposed platen 28 consisting of a stationary front platen 30 and a movable rear platen 32, to be described in detail hereafter. In operation, the cartridge retriever 22 deposits a retrieved cartridge, such as cartridge 16', atop the platen 28 whereupon a selected minicartridge thereof MC-1, MC-2, . . . is released and the bottom thereof maintained in contact with the upper surface of the platen to facilitate selection of a desired card from the selected minicartridge by operation of the card select blades of the card selector, all in a manner to be described hereafter in more detail. Additionally, and prior to selection of a desired card from the selected minicartridge by the document select blades of the card selector 26, the cartridge retriever 22 moves upwardly a slight distance to raise the bottom of the unselected minicartridges upwardly out of operative engagement with the card select blades of the card selector 26 to prevent selection of a card from one or more of the unselected minicartridges in the retrieved cartridge 16' located at the card selector. The selection of a card from the selected minicartridge of the retrieved cartridge located at the card selector 26 by the card select blades of the platen 28 is operative to displace forwardly, that is, along the Z axis in the direction of arrow 33, the desired card with respect to the undesired cards of the selected minicartridge.

A selected card removal/return transport and intermediate buffer store 34 is provided to facilitate (a) removal of a card selected by the card select blades of the platen 28 from the selected minicartridge of the retrieved cartridge at the card selector 26, (b) buffer storage of the selected card, and (c) return of a card to its associated minicartridge for storage therein. The selected card removal/return transport and intermediate buffer store 34 includes a minicartridge releasing assembly 38 for selectively releasing a particular one of the minicartridges from a retrieved cartridge located at the card selector 26. The selected card removal/return transport and intermediate buffer store 34 also includes a card buffer store, preferably in the form of a rotary carrousel 36 having a plurality of radially arranged card storage bins 36-1, 36-2, . . . 36-n which are indexable in an azimuthal direction about a vertical carrousel axis 35. A selected card removal/return transport 40 is also included in the selected card removal/return transport and intermediate buffer store 34. The card transport 40 operates to transfer a card selected from a particular minicartridge of the cartridge at the card selector 26 to a particular card storage bin of the carrousel 36, as well as to return a card from a particular bin of the carrousel to a selected minicartridge.

The selected card removal/return transport and intermediate buffer store 34 is horizontally indexable bidirectionally along the X axis in the direction of double headed arrow 42 to position the minicartridge releasing assembly 38 opposite any one of the minicartridges MC-1, MC-2, . . . MC-n of the retrieved cartridge located at the card selector 26. This facilitates release of a selected minicartridge from the selected cartridge at the card selector 26 for subsequent selection of a card therefrom by the operation of the document select blades of the platen 28, and transport of the selected card from its minicartridge to a bin of carrousel 36 by card transport 40. It also facilitates return of a card in a bin of the carrousel 36 to a selected minicartridge via the card transport 40.

Reference is now directed to FIG. 15 where it can be seen that the system also includes a remote document buffer store 37, preferably a rotary carrousel with circumferentially arrayed bins to store documents in vertical radial orientation. A closed loop document conveyor 41 is also provided for transporting a selected card along a specified path for selective cooperation with various input/output stations 45A, 45B, 45C, . . . 45n operatively associated with the conveyor along its path, such as, document duplicators, document viewers, document updaters, a nonautomatic manual document insertion/removal station, etc. Finally, plural automatic document processing stations 43A, 43B, . . . 43n are located along the path of, and associated with, the intermediate buffer store 34 to facilitate document removal to a collection box or the like and/or manual insertion of a document into the intermediate buffer carrousel 36.

The particular configuration of the edge-notched card, the coding scheme therefor, as well as the specific method and apparatus utilized to select a given coded edge-notched card from among a plurality of such cards in a selected minicartridge, is not critical. It is only essential that the coded cards be edge-notched in some suitable fashion permitting one such card to be selected from among a plurality of such cards in a selected minicartridge. Similarly, the particular structure and operation of the card selector 26 is not critical, it only being necessary that it be capable of selecting a desired coded edge-notched card in a selected minicartridge from a plurality of such cards and advancing the selected card forwardly, that is, along the Z axis in the direction of arrow 33, relative to the remaining unselected cards of the selected minicartridge. The amount by which the selected card of the selected minicartridge is advanced in the direction of arrow 33 is not critical, although it must be sufficient to facilitate gripping by the card transport assembly 40 for removal of the selected card from the selected minicartridge and transport thereof to the carrousel buffer store 36.

A preferred codeable edge-notched card and card selector is shown in FIG. 19. Both the card and the card selector shown in FIG. 19 are described in detail in co-pending application of Paul Neumeier assigned to O.K. Partnership, Ser. No. 125,975, filed Feb. 29, 1980, the entire disclosure of which is expressly incorporated herein by reference. Since a detailed description of the preferred card and card selector is disclosed in the identified co-pending application, only a brief description of the preferred card and selector is provided herein.

More specifically, and with reference to FIG. 19, an uncoded card 50 is provided having a leading edge 50-3 and a trailing edge 50-1 between which is located along the lower portion thereof a sorting edge. The sorting edge includes (a) an acquisition tooth A of a specified width $W_a$ bounded by the leading edge of the card 50-3 and an acquisition slot $S_a$, (b) a return tooth R of width $W_r$ bounded by the trailing edge 50-1 of the card and a notch 54 of a width at least equal to 2W, (c) a complementary code region 55 of N equally spaced removable complementary code teeth $T_1, T_2, \ldots$ each of width W, and N equally spaced complementary slots $S_1, S_2, \ldots$, each located forwardly of its respectively associated complementary code tooth, and (d) a primary code region 56 of N equally spaced removable primary code teeth $T_1, T_2, \ldots$ each of width W, and N equally spaced primary slots $S_1, S_2, \ldots$, each located rearwardly of its respectively associated primary code tooth, with the rearmost complementary tooth $T_{10}$ and the forwardmost primary slot $S_1$ being spaced apart a distance at least equal to 2W.

The cards are encodeable in an "M digit out of N digit" code format, where preferably N=10 and M=3, by removing complementary code teeth, and removing primary code teeth, only at the complementary and primary code tooth locations corresponding to the M digits of the particular card code. For example, card 50A which is encoded with the digits 1-3-5 has complementary teeth $T_1$, $T_3$, and $T_5$ removed, and only primary code teeth $T_1$, $T_3$, and $T_5$ remaining. Similarly, card 50B which is encoded with the digits 1-3-7 has complementary code teeth $T_1$, $T_2$, and $T_7$ removed, and only primary code teeth $T_1$, $T_3$, and $T_7$ remaining. Similarly, card 50C which is encoded with the digits 2-4-6 has complementary code teeth $T_2$, $T_4$, and $T_6$ removed, and only primary code teeth $T_2$, $T_4$, and $T_6$ remaining.

The platen 28 of the card selecting apparatus of this invention includes a stationary horizontally disposed front platen section 30 and a movable horizontally disposed rear platen section 32 which is shiftable from a home position shown in solid lines forwardly to a position 32' and rearwardly to a position 32''. The front, or complementary, platen 30 contains, in a system operating in an M out of N format, N complementary blades $C_a$, $C_b$, ... $C_n$. In a system such as shown in the preferred embodiment utilizing a "3 out of 10" code format, there are 10 complementary blades $C_a$, $C_b$, ... $C_j$. The complementary blades $C_a$, $C_b$, ... $C_j$ are disposed such that they underlie the blade slots $S_1$, ... $S_{10}$ of the complementary code region 55 of a card in the home position. When a card has been shifted to the partially selected position I during the card selection process in a manner to become more apparent hereafter, the slots $S_1$ ... $S_{10}$ of the complementary code region 55 are displaced leftwardly the width W of one tooth T relative to the complementary blades $C_a$ ... $C_j$. Then a card is in fully selected position II complementary code region slots $S_1$ ... $S_{10}$ are displaced leftwardly the width of two teeth relative to the complementary blades $C_a$ ... $C_j$. The function of the complementary blades $C_a$ ... $C_j$ is to prevent leftward movement of cards which are not coded to correspond to the desired card, that is, to restrain leftward movement of undesired cards which do not contain notches or removed teeth in the complementary code region at those digit positions corresponding to the digits of the desired card undergoing selection.

The front platen 30 also contains acquisition blades $A_1$ and $A_2$. The acquisition blade $A_2$ when elevated into the acquisition slot $S_a$ of the desired card in position II holds such card against rightward movement when undesired cards in position I are being returned to the home position by rightward movement of the return blade $R_1$ at the conclusion of the last digit selection step. The acquisition blade $A_1$ holds a selected card in position I, while the movable platen 32 moves rightwardly with all blades thereof in its retracted position, which occurs between the first and second digit selection steps.

The movable rear, or primary, platen 32 contains N primary selection blades in an "M out of N" code system. If, as in the preferred embodiment, N equals 10, there are 10 primary blades $P_a$ ... $P_j$. The movable primary platen 32 is shiftable leftwardly from a home position (solid lines in FIG. 19) in which blades $P_a$ ... $P_j$ underlie blade slots $S_1$ ... $S_{10}$ of the primary code region 56 of a card in the home position with its edge 50-1 against the forward, inner surface of a reference plate 98 forming the rear wall of the minicartridge MC to be described in detail hereafter, to a position 32' displaced leftwardly of the home position the width W of one tooth. In addition to shifting between the home position and the position 32' displaced leftwardly from the home position the width of one tooth, the movable primary platen 32 also shifts from the home position rightwardly to position 32'' a predetermined distance X for reasons to become more apparent hereafter.

The movable primary platen 32 also contains return blades $R_1$ and $R_2$. Return blade $R_2$ is displaced rightwardly from the rightmost primary blade $P_j$ by the width of one tooth, while the return blade $R_1$ is located rightwardly of the rightmost primary blade $P_j$ by a distance equal to the width of two teeth. When the primary platen 32 is in its leftmost position 32', the blade $R_1$ is positioned under the slot $S_r$ to the left of the return tooth R of cards in the partially selected position I, and is operative, when the movable platen is thereafter shifted rightwardly the width of one tooth to the home position (solid lines) to return undesired cards to the home position from position I, which occurs after each and every digit selection operation subsequent to the second digit selection operation. The return blade $R_2$, when the movable platen 32 is in its leftmost position 32', underlies the slot $S_r$ to the left of the return tooth R of the desired cards in fully selected position II, and functions to return such desired cards in position II to position I when the movable platen shifts from its left position 32' to the home position, which occurs following all digit selection operations except the first and last.

The movable platen 32 is also movable, as noted previously, between the home position and position 32'' rightwardly a distance X of the home position. In a manner to be described hereafter, when the primary platen 32 is displaced rightwardly following selection of the desired card from the home position by a distance X while holding the desired card stationary with acquisition blade $A_2$, the resulting separation between the desired card and the undesired cards, initially a distance of 2W, is extended to a distance of 2W+X. Thereafter, and when the movable platen is returned to its home position with the primary blade located behind the return tooth of the desired card in an elevated position, the entire deck of cards in the selected minicartridge is shifted leftwardly a distance X by the spring-biased locating plate 98 and/or the elevated primary blade. This effectively moves the selected card in fully selected position II, which is now displaced from the undesired cards by a distance of 2W+X, leftwardly from position II to a position a distance X to the left of position II and returns the undesired cards to the home position.

Referring to FIGS. 5A and 19, the locating plate 98 is mounted to move with the platen 32 during movement of platen 32 between the home position (solid line) and a position 98'' displaced rightwardly a distance X from the home position. Tension springs 64 between (a) pins 65-7 fixed to a top wall 65 of the minicartridge which is integral with plate 98, as described in detail hereafter, and (b) relatively stationary panels 67, also forming part of the minicartridge, to be described, enable the plate 98 to follow or track movement of the movable platen 32 over range X between the home position and extended rear position 32''. Plate 98 is prevented from moving leftwardly of home position when rear platen 32 moves to position 32' by reason of the rear edges of the minicartridge side walls, to be described, which abut plate 98 when the plate is in the position shown in FIG. 5A.

A card selection operation will now be described in which a desired card 50A encoded with the digits 1-3-5 is selected from among a group of undesired cards including undesired cards 50B and 50C encoded with the digits 1-3-7 and 2-4-6. At the start of a card selection operation all the cards contained in the selected minicartridge MC of the retrieved cartridge at the selector 26 are urged rearwardly (rightwardly as viewed in FIG. 19) such that the rearmost vertical edges 50-1 thereof are seated against locating plate 98. Additionally, the movable primary platen 32 is in its home position shown in solid lines in FIG. 19. Acquisition bar $A_1$ is located immediately forward of the leading edge 50-3 of all the cards, that is, immediately forward of the acquisition tooth A of all the cards. Acquisition blade $A_2$ is spaced a distance of one tooth width to the left, that is, forwardly, of the leading edge 50-3 of the cards. Additionally, complementary blades $C_a \ldots C_j$ underlie complementary slots $S_1 \ldots S_{10}$, respectively, of complementary code region 55. Primary blades $P_a \ldots P_j$ underlie primary slots $S_1 \ldots S_{10}$ of primary code region 56. Return blade $R_1$ underlies slot $S_r$ immediately to the left of return tooth R of the cards. Return blade $R_2$ underlies the midpoint 58 of the removed card region 54. The leading edge 50-3 of all the cards are displaced rightwardly a distance X+2W of the nip 40' of selected card removal transport device 40. The foregoing relationship of the cards with respect to the various blades of the card selector 26 and the selected card removal transport device 40 is shown clearly in FIG. 19.

Following placement of all the cards in the home position, the primary and complementary blades underlying the slots S of the first digit of the encoded card desired are elevated. In the illustration given in which the desired card 50A is encoded with the digits 1-3-5, complementary blade $C_a$ underlying slot $S_1$ associated with digit 1 of the complementary code region 55 is elevated, as is primary blade $P_a$ which underlies slot $S_1$ of the primary code region 56 associated with the digit 1. With these blades elevated, it will be noted that the desired card 1-3-5 has its code tooth $T_1$ of the complementary region 55 removed, which will permit this card to move forwardly (leftwardly in FIG. 19) one tooth width relative to cards which do not have tooth $T_1$ of the complementary code region removed. Additionally, note that the desired card 1-3-5 does not have code tooth $T_1$ of the primary region 56 removed. As a consequence, the elevated primary blade $P_a$ and slot $S_1$ of the primary region 12 can urge the desired card 1-3-5 forwardly (leftwardly) when the primary platen 32 is shifted forwardly, to the left, to the position 32'.

Also note that an undesired card which does not contain the digit 1, such as card 50C coded with 2-4-6, will not be shifted forwardly (leftwardly) by the elevated primary blade $P_a$ when the platen 32 moves forwardly (leftwardly) from home to position 32' by reason of the fact that its primary code tooth $T_1$ has been removed. Also note that undesired card 50C coded with 2-4-6 is positively prevented from moving forwardly (leftwardly) when the platen 32' with its elevated blade $P_a$ shifts to position 32' by reason of the fact that complementary code tooth $T_1$ of card 50C coded with 2-4-6 has not been removed and is disposed rearwardly, that is, to the right, of elevated complementary blade $C_a$.

Finally, note that undesired card 50B coded with 1-3-7, since it is encoded with the digit 1, does have its complementary code tooth $T_1$ removed and its primary code tooth $T_1$ in place. Accordingly, and to this extent, undesired card 50B coded with 1-3-7 and desired card 50A coded with 1-3-5 are the same, and accordingly the undesired card 50B coded with 1-3-7 will be partially selected, that is, shifted forwardly (leftwardly) the width of one tooth to the partially selected position I, along with the desired card 1-3-5, when the primary platen 32 with blade $P_a$ elevated is shifted forwardly (leftwardly) from home to position 32'.

With the foregoing in mind, the primary platen 32 with blade $P_a$ elevated is shifted from home to position 32' a distance W. This advances a distance equal to the width W of one code tooth all cards encoded with the digit 1, including the desired card 1-3-5 and the undesired card 1-3-7, located such cards in position I, that is, the partially selected position. All undesired cards not containing a digit 1, such as undesired card 2-4-6, are positively restrained in the home position against movement by elevated complementary blade $C_a$ engaged in slot $S_1$ of the complementary code region 55 of the undesired cards not containing the digit 1. No cards are in the fully selected position II displaced forwardly a distance 2W from home.

With the desired and undesired cards in the positions just described, the acquisition blade $A_1$ is elevated into the acquisition slot $S_a$ of all cards containing the digit 1 which are advanced to position I, that is, the partially selected position, during the first digit selection step, namely, card 1-3-5 and card 1-3-7. These partially selected cards containing the digit 1, card 1-3-5 and card 1-3-7, are now positively held in the partially selected position I by engagement of their selectively associated acquisition slots $S_a$ by the elevated acquisition bar $A_1$. The undesired card 2-4-6 which does not contain the digit 1, and which remained in the home position, has its leading edge 50-3 rearwardly (rightwardly) of the elevated acquisition bar $A_1$. In addition to elevating the acquisition bar $A_1$ to positively "acquire", that is, to positively hold against movement, the desired card 1-3-5 and undesired card 1-3-7, each of which contain the digit 1, the primary blade $P_a$ and complementary blade $C_a$, which were elevated previously to effect the first digit selection operation for the digit 1, are now returned to their normal unelevated position. With the cards 1-3-5 and 1-3-7 held against movement by the elevated acquisition bar $A_1$ and the blades of the primary platen 32 in their lowered normal position, the primary platen is returned from the forward position 32' to the home position. At this point the first digit selection step is complete and the selection operation for the next step is initiated.

Specifically, the second digit selection step, which in this case is the digit 3, is initiated by elevating the complementary blade $C_b$ underlying the slot $S_3$ of the complementary code region associated with the code digit 3 of the desired partially selected card in position I, and elevating the primary blade $P_b$ underlying slot $S_3$ associated with the primary code digit 3 of the desired card in partially selected position I. With complementary blade $C_b$ elevated, cards encoded with the digit 3 have their complementary code tooth $T_3$ removed and as such are not positively held against forward, or leftward, selection movement by elevated complement blade $C_b$. Similarly, desired cards encoded with the digit 3 have their primary code tooth $T_3$ in place forward, leftwardly, of the elevated primary blade $P_b$ which engages slot $S_3$ of the partially selected cards located in partially selected position I, allowing these cards to move from position I to position II when the primary platen shifts from home position to position 32'. At this point the undesired card 2-4-6 which was not moved to position I at the conclusion of the first digit selection operation for the digit 1, but which remained in the home position, has its primary code tooth $T_2$, which is unremoved, located immediately forward, or leftward, of the elevated primary blade $P_b$, and its complementary code tooth $T_2$, which is located immediately rearwardly, or rightwardly, of elevated complementary blade $C_b$, removed. As such, when the primary platen 32 with its blade $P_b$ elevated, shifts from the home position to position 32', undesired card 2-4-6 will be shifted one tooth width leftwardly from the home position to partially selected position I. Of course, when the primary platen 32 shifts from the home position to position 32', the desired card 1-3-5 which was in partially selected position I shifts to fully selected position II as does undesired card 1-3-7 which was also in partially selected position I and, like desired card 1-3-5, contains digits 1 and 3. Thus, at the conclusion of the leftward shifting motion of the platen 32 in the second digit selection step, for digit 3, the desired card 1-3-5 and the undesired card 1-3-7 are both in the fully selected position II since each contains digits 1 and 3. The undesired card 2-4-6 not containing both a digit 2 and a digit 1 is in the partially selected position I.

Complementary blade $C_b$ and primary blade $P_b$ are now lowered and return blades $R_1$ and $R_2$ are elevated. Elevated return blade $R_2$ is located in slot $S_r$ immediately forwardly (leftwardly) of return tooth R of cards in fully selected position II containing the digits 1 and 3, such as desired card 1-3-5 and undesired card 1-3-7. As such, when the movable platen 32 is returned from the forward position 32' to its home position, those cards in the fully selected position II containing both the digit 1 and the digit 3 will be returned to the partially selected position I. Also, the undesired card containing neither the digit 1 nor the digit 3, such as undesired card 2-4-6 which is in the partially selected position I, has elevated return bar $R_1$ located in slot $S_r$ immediately forward (leftward) of return tooth R. As a consequence, when the platen 32 is shifted from position 32' to the home position, undesired card 2-4-6 will be shifted rightwardly from position I to the home position. To conclude the second digit selection step, the movable platen 32 is shifted from position 32' to its home position with return bars $R_1$ and $R_2$ elevated. This places all cards not having both the digits 1 and 3, such as undesired card 2-4-6, in the home position and shifts from the fully selected position II to the partially selected position I all cards having both the digits selected to this point in the selection process, namely, both digits 1 and 3. At this point there are no cards in the fully selected position II.

The third digit selection step is initiated by elevating complement blade $C_d$ which underlies digit 5 complement code slot $S_5$ of the desired card 1-3-5 located in partially selected position I and elevating the primary blade $P_d$ underlying digit 5 primary slot $S_5$ of the desired card 1-3-5 located in partially selected position I. With these blades elevated, complement code tooth $T_5$ of the desired card 1-3-5 is removed which will permit the desired card 1-3-5 to move leftwardly from the partially selected position I to the fully selected position II. Also, the desired card 1-3-5 has primary code tooth $T_5$, located immediately leftwardly of elevated blade $P_d$, unremoved, which will enable desired card 1-3-5 to be moved leftwardly when the movable platen 32 shifts from the home position to position 32' with its blade $P_d$ elevated.

Additionally, at this point undesired card 1-3-7 has its complement code tooth $T_5$ in place immediately rightwardly of elevated complement blade $C_d$, thereby preventing movement of card 1-3-7 when the primary platen 32, with blade $P_d$ elevated, shifts leftwardly from home position to position 32'. Also, undesired card 1-3-7 has no tooth immediately forwardly (leftwardly) of elevated blade $P_d$ corresponding to the digit 5. As such, the undesired card 1-3-7 is not positively urged leftwardly when the platen 32 shifts from the home position to position 32' with blade $P_d$ elevated.

Further, the undesired card 2-4-6 has its complement code tooth $T_4$ removed. Since undesired card 2-4-6 in the home position with complement code tooth $T_4$ removed and primary tooth $T_4$ not removed, undesired card 2-4-6 will shift forwardly when the platen 32 shifts from the home position to position 32' and elevated primary blade $P_d$ urges primary tooth $T_4$ of undesired card 2-4-6 leftwardly.

When the platen 32 with blade $P_d$ elevated shifts to position 32', the desired card 1-3-5 moves from the partially selected position I to the fully selected position II; the undesired card 2-4-6 moves from the home position to partially selected position I; and the undesired card 1-3-7 remains in partially selected position I. Thus, only the desired card containing digits 1, 3, and 5, namely, card 50A, is in the fully selected position II; all other cards are either in the partially selected position I, such as card 1-3-7 and card 2-4-6, or the home position. The desired card 1-3-5 is at this point advanced one tooth width from the undesired cards, such as card 1-3-7 and card 2-4-6.

To advance the desired card 1-3-5 the width of two teeth relative to the undesired cards, the acquisition blade $A_2$, which underlies the acquisition slot $S_a$ of the desired card 1-3-5 located in the fully selected position II, is elevated. Since only the desired card 1-3-5 is in the fully selected position II with its acquisition slot $S_a$ overlying acquisition blade $A_2$, only the desired card 1-3-5 is acquired by the elevated acquisition bar $A_2$. The undesired cards, such as 1-3-7 and 2-4-6, which are in position I, have their leading edges 50-3 located rearwardly (rightwardly) of the elevated acquisition blade $A_2$. In addition to elevating the acquisition blade $A_2$, the return blade $R_1$ is elevated. Elevated return blade $R_1$ is rearwardly (rightwardly) relative to return tooth R of the desired card 1-3-5 in fully selected position II, while elevated return blade $R_1$ is located forwardly (leftwardly) of return tooth R of the undesired cards, such as cards 1-3-7 and 2-4-6, which are located in partially selected position I. As such, these undesired cards, which as noted previously are not acquired by elevated acquisition blade $A_2$, are returned to the home position when the platen 32 shifts rearwardly from position 32' to its home position with the return bar $R_1$ in its elevated condition.

At the conclusion of the third digit selection step, the desired card 1-3-5 is in the fully selected position II, and the undesired cards, such as cards 1-3-7 and 2-4-6, are in the home position. As a consequence, the desired card 1-3-5 is displaced forwardly of the undesired cards by a distance 2W equal to the width of two code teeth. At this point the desired card 1-3-5 is in the fully selected position II, no cards are in the partially selected position I, and all undesired cards are in the home position.

If the desired card has more than three code digits, the steps followed for the second code digit selection step are repeated for the third and all subsequent digit selection steps except the last digit selection step. The steps of the last digit selection step are the same as for the third digit selection step described.

As noted previously, the selected card removal device 40 located such that its nip 40' is displaced a distance X from the leading edge of the desired card 50A coded with the digits 1-3-5 when such is located in the fully selected position II. To facilitate removal by the device 40 of the selected card 50A from the remaining undesired cards 50B and 50C in the deck of the selected minicartridge of the retrieved cartridge in the selector 26, the desired card 1-3-5 is first further separated a distance X from the undesired cards to provide a total separation of 2W+X by holding the desired card against movement and moving the undesired cards rearwardly a distance X from home, and thereafter advancing all cards leftwardly a distance X to place the desired card at the nip 40' of device 40 for removal and return the undesired cards to home position.

To facilitate further separation by a distance X of the desired and undesired cards from the position wherein the separation is 2W to provide a total separation of 2W+X, the platen 32 is moved a distance X rearwardly (rightwardly) from the home position with the acquisition blade $A_2$ and return blade $R_1$ elevated. The plate 98 moves with the platen 32 from position 98 to position 98". Acquisition blade $A_2$ holds desired card 50A against movement in the fully selected position II a distance 2W to the left, or forwardly, of home. Elevated return blade $R_1$ shifts all undesired cards to a position X rightwardly of home. The combination of the action of blades $A_2$ and $R_1$ is to further separate the desired and undesired cards a distance X to provide a total separation of 2W+X.

To advance the desired card 50A from the fully selected position II to the nip 40' of the card removal device 40 for removal thereby and return the undesired cards to the home position, acquisition blade $A_2$ is lowered to release the desired card 50A, and primary blade $P_h$ located behind the return tooth R of the desired card 50A is elevated to push the desired card forwardly (leftwardly) a distance X when platen 32 returns forwardly (leftwardly) from its rearmost, rightmost, position 32' to its home position. Return blade $R_1$ is also preferably lowered, although it need not be. With the blades positioned as noted, the movable platen 32 is returned forwardly (leftwardly) from position 32" to the home position. As this occurs, the undesired cards are returned to the home position by the plate 98 of the minicartridge MC which moves with the platen 32 under the action of the springs 64 from position 98" to solid line position 98. Additionally, the desired card 50A is advanced from the fully selected position II a distance X to the nip 40' of the card removal device 40 where it is removed from the cards in the selected minicartridge MC.

With the primary platen 32 and the undesired cards in the home position, and the desired card 1-3-5 removed by the device 40, the primary blade $P_h$ is lowered to its normal position, readying the card selector 26 for another card selection operation and/or for the return of a card by the transport 40 to the selected minicartridge MC of the retrieved cartridge at the card selector 26.

As shown in FIG. 7, the stationary platen 30 is mounted at its opposite sides on stationary, parallel, vertical, rearwardly extending support walls 30a and 30b which along their lower portions are mounted on a stationary horizontal support plate 30c. Extending rearwardly between and anchored to the stationary platen 30 and the rear selector wall 88 are a pair of stationary, horizontal, parallel guide rails 30-1 and 30-2. The guide rails 30-1 and 30-2 are located at their forward ends in suitably provided slots formed in the bottom surface 30d of the stationary platen 30. The guide rails 30-1 and 30-2 are disposed in the same horizontal plane perpendicular to the direction of the document select blades $C_a, \ldots, P_a, \ldots, A_1, A_2, R_1,$ and $R_2$.

As shown in FIG. 8, the movable platen 32 is mounted for movement in a horizontal plane with its upper surface 32a in the same horizontal plane as the upper surface 30e of the stationary platen 30. To facilitate mounting and guiding the movable platen 32 for sliding movement between its home position and its forward position 32' and rearward position 32" (FIG. 19), the lower surface 32b of the movable platen 32 is provided with horizontal, parallel, rearwardly extending slots which slideably receive rearwardly extending guide rails 30-1 and 30-2 which extend rearwardly underneath the movable platen 32 between stationary front platen 30 and rear selector wall 88. Suitable bearing supports 30f are provided between the lower surface of the sides of the movable platen 32 and the upper edges of the supports 30a and 30b underlying the movable platen to support the load of the movable platen 32.

To maintain the reardwardly extending slots formed in the lower surface 32b of the movable platen 32 in engagement with the stationary, rearwardly extending, horizontal, spaced, parallel guide rails 30-1 and 30-2, the guide rails are each provided with a longitudinal slot 32c, as shown in FIG. 9. A threaded fastener 32d having its upper end anchored in the lower surface 32b of the movable platen 32 projects downwardly through the slot. A washer 32e located between the upper portion of the head of the fastener 32d is in sliding contact with the lower portion of the stationary guide rails 30-1 and 30-2 on either side of the slot. Thus, relative movement in a vertical direction between the movable platen 32 and the stationary guide rails 30-1 and 30-2 is prevented by the slot 32c in each guide rail and its associated fastener 32d and washer 32e.

To reciprocate the movable platen 32 through the various sequence of motions, discussed previously in connection with FIGS. 5 and 19, to select a desired card from a deck of similar cards of a selected minicartridge, between its home position and its forward position 32' and rearward position 32", a rotary cam 70 is provided which is mounted for rotation about a vertical axis 72 on a shaft 73 which seats in a stationary bearing block 74 mounted to the horizontal plate 30c. The lower extremity 75 of the shaft 73 secures a sprocket 76 driven by a motor-driven chain 78. The cam 70 is provided with a slot 79 in its upper surface in which is positioned a cam follower roll 80 rotatably mounted on a vertical shaft 82 which depends from a bracket 84 secured to the rear surface of the movable platen 32. The configuration of the cam slot 79 is such that when the motor-driven chain 78 drives the cam 70 through one revolution via sprocket 76 and shaft 73, the cam follower roll 80 is repeatedly reciprocated forwardly and rearwardly of its home position, as desired, to impart to the movable platen 32 the necessary sequence of motions between the home position and forward position 32' and rearward position 32" to effect selection of a desired card and displacement of it a distance X+2W from its home position for removal by the card transport 40 from its associated minicartridge.

To facilitate selective elevation of the complementary code blades $C_a, C_b, \ldots$ and the primary code blades $P_a, P_b \ldots$, as well as the acquisition blades $A_1$ and $A_2$ and the return blades $R_1$ and $R_2$, each of the blades is provided with a pair of slots 90 and 91 (FIG. 7), one slot of which 90 is shown in FIG. 14. Each of the slots 90, 91 has a lower horizontal portion, an upper horizontal portion, and an inclined portion interconnecting the upper and lower horizontal portions. A stationary horizontal cam guide rod 92 passes transversely through the slots 90 of all of the card selector blades. A similar stationary horizontal guide rod passes transversely through all of the slots 91 of the card selector blades.

When a blade, such as blade 89, is in its lowermost position with its upper edge disengaged from the notched card sort edge, the stationary, horizontal, transverse guide cam rod 92 seats in the upper portion of the slot 90. The raise the blade 89 containing slot 90 into engagement with the notched card sort edge, the blade is shifted rightwardly as viewed in FIG. 14 in the course of which the angled portion of the slot rides on the stationary cam rod 92, eventually seating itself in the lower portion of the slot 90, which occurs when the blade has reached the fully elevated position. To lower the elevated blade 89, the elevated blade is shifted leftwardly.

To facilitate shifting the blade 89 leftwardly and rightwardly to its lowered and raised conditions, respectively, a vertically disposed lever 93, the upper end of which engages a notch 94 of the blade 89, is provided, as shown in FIG. 14. To raise blade 89 a solenoid 96 mounted to a stationary bracket 97 depending from the bottom 30d of the stationary platen 30 is energized. This causes the solenoid armature 96a, which is pinned to the lever 93 at 99, to shift rightwardly as viewed in FIG. 14. The lever 93 then pivots clockwise about a stationary horizontal pin 95 to raise blade 89. A spring 100 normally urges the solenoid armature 96a of solenoid 96 to the left, in turn normally urging the upper end of the lever 93 to the left, to normally maintain the blade 89 in its lowermost condition when the solenoid 96 is de-energized.

The sort blade 89' (FIG. 14) disposed adjacent the blade 89 has its slot 90' disposed such that leftward movement (as viewed in FIG. 14) of the blade 89' moves the blade 89' to its elevated condition. Leftward movement of the blade 89' is produced by a lever 93' mounted for pivotal movement about the horizontal support 95 which is pivoted by a solenoid 96' mounted to the bracket 97 which has its armature 96a' pinned to the lever 93' at 99'. When the solenoid 96' is energized, moving its armature rightwardly as viewed in FIG. 14, the lever 93' pivots counterclockwise about horizontal mount 95 shifting the blade 89' to the left, elevating the blade 89' to its uppermost position. When the solenoid 96' is de-energized, the spring 100' surrounding the armature 96a' restores the lever 93' rightwardly which then returns the blade to its lowermost position with its upper edge flush with the upper surface of the platen.

The alternating arrangement of the slots 90 and 90' of the adjacent blades 89 and 89' is merely to facilitate convenient mounting of the solenoid actuators 96 and 96'. Solenoids 96" and 96''' operate the levers associated with two subsequent adjacent blades (not shown). The solenoids 96" and 96''' are mounted to a stationary bracket 97' such that they extend in a forwardly (leftwardly as viewed in FIG. 14) direction in contrast to the rearward (rightward) direction of solenoids 96 and 96'. The location of the solenoids 96, 96', 96", and 96''' in two horizontal tiers, each of which extend in two different directions (rightwardly and leftwardly as viewed in FIG. 14), is merely to facilitate convenient packaging of a plurality of solenoids which by reason of the close spacing between the sort blades which they operate must necessarily be closely spaced.

The platen 28 of the card selector 26 is oriented such that the complementary sorting blades $C_a$, $C_b$ ... of complementary sort blade group 55 and the primary sorting blades $P_a$, $P_b$ ... of the primary sorting blade group 56 are disposed in a horizontal plane with their respective longitudinal axes parallel to the X axis 42, that is, the primary and complementary sorting blades are oriented such that they extend from left to right as viewed in FIG. 1A. The acquisition blades $A_1$ and $A_2$, as well as return blades $R_1$ and $R_2$, are oriented identically to the primary and complementary sort blades. The movement of the individual blades into and out of engagement with the code-notched edge of a card in a minicartridge at the card selector 26 is in a vertical direction. The movement of the rear platen 32 from its home position forwardly to the position 32' is along the Z axis in the direction of arrow 33, while movement of the platen 32 rearwardly to its rearmost position 32" is in the direction 33'. The minicartridges of a retrieved cartridge located at the selector 26 are disposed in side-by-side relation, with the open fronts thereof, through which a selected card advances forwardly in the Z direction as shown by arrow 33, lying in the X-Y plane. The individual cards 50 in a minicartridge operatively associated with the platen 28 of the card selector 26 are oriented such that they lie in a vertical Y-Z plane transverse to the direction of the primary and complementary sorting blades. Additionally, the cards located on the platen 28 of the card selector 26 are oriented such that the leading edges 50-3 thereof are forwardmost, that is, extending in the direction of arrow 33, while the trailing edges 50-1 thereof are rearmost, that is, extending in the direction of arrow 33'. With the sorting blades, movable platen movement, and cards oriented as described, a card selected from a minicartridge located at the card selector 26 is advanced from the remaining cards of the minicartridge along the Z axis in the direction 33 a distance of X+2W, as viewed in FIG. 1A.

The minicartridges MC-1, MC-2 . . . are identical. One such minicartridge is shown in perspective in FIG. 6. With reference to FIG. 6, the minicartridge is seen to include a left vertical planar side wall 59 and a right vertical planar side wall 60 each of which are generally rectangular. Integral with and spanning the lower horizontal edges 61 of the minicartridge side walls 59 and 60 are flat horizontal bars 62 and 63 which collectively constitute a portion of the bottom wall of the minicartridge. The bars 62 and 63 lie in a horizontal plane slightly below the horizontal plane defined by the cartridge side wall lower edges 61, for reasons which will become more apparent hereafter. The minicartridge also includes an upper wall 65 and a rear wall 98 which, in a preferred form, are integral.

The integral upper and rear walls 65 and 98 move relative to the side walls 59 and 60 and the bottom bars 62 and 63, with the relative movement being in the Z directions 33, 33', as viewed in FIG. 6. The upper wall 65 of the minicartridge is captured or restrained for sliding movement only in the Z direction relative to the side walls 59 and 60 and the bottom bars 62 and 63. Movement of the upper wall 65 in the X direction 42 relative to the side walls 59 and 60 is prevented by the upper rear wall portions 59-1 and 60-1 of the side walls 59 and 60 which slideably engage opposite sides 65-1 and 65-2 of the upper wall 65. Downward vertical movement of the upper wall 65 in the Y direction is prevented by the upper forward edges 59-2 and 60-2 of the side walls 59 and 60 which underlie the forward portion 65-3 of the upper wall 65. The distance $D_1$ between the outer surfaces of the side walls 59 and 60 is less than the width $D_3$ of the forward portion 65-3 of the upper wall 65. Upward vertical movement of the upper wall 65 in the Y direction relative to the side walls 59 and 60 is prevented by horizontally extending sections 59-3 and 60-3 extending from the upper edges of side wall sections 59-1 and 60-1 which slideably engage the upper horizontal surface 65-4 of the upper wall 65. The width $D_4$ of the rear portion 65-4 of the upper wall 65 is slightly less than the spacing between the inner surfaces of the side walls 59 and 60 to facilitate sliding engagement between the side walls 65-1 and 65-2 of the upper wall 65 and the inner surfaces of side wall sections 59-1 and 60-1. Rearward movement parallel to the Z axis in the direction of arrow 33' of the upper wall 65 relative to the side walls 59 and 60 is limited by abutment of a vertical shoulder 65-5 which extends upwardly from the rear portion of section 65-3 of the upper wall 65 and the forward edges of horizontal sections 59-3 and 60-3.

The width $D_2$ of the rear wall 98 is slightly larger than the distance $D_1$ between the outer surfaces of the side walls 59 and 60. This not only prevents the rear wall 98 from moving between the rear portions of the side walls 59 and 60, but also serves to assure that a card contained within the minicartridge will not inadvertently slip out of the minicartridge past the rear wall 98 in the direction of arrow 33'. The rear wall 98 is normally urged into contact with the rear vertical edges 59-5, 60-5 of the side walls 59 and 60 by a pair of tension springs 64.

To further stabilize relative movement between the side walls 59 and 60 and the upper wall 65, a pair of pins 68 are provided which extend upwardly from the rear portion 65-3 of the upper wall 65 through slots 69 in horizontal panels 59-3 and 60-3.

In addition to the horizontal bars 62 and 63 extending across the lower edge 61 of the side panels 59 and 60, the bottom wall of the minicartridge also includes a forwardly extending horizontal ledge 103 formed integral with the lower portion of the rear wall 98. The ledge 103 as well as the bars 62 and 63 are located in the same horizontal plane and collectively support the cards 50 in the minicartridge at three spaced points along their lower sorting edges.

The locating plate 98 against which the rear edges 50-3 of the cards abut in the course of the card selection operation, discussed in connection with FIG. 9, constitutes the inner surface of the rear wall 98. Extending rearwardly from the lower portion of the rear wall 98 is a horizontal ledge 104. When a minicartridge is released from the cartridge located at the card selector, the ledge 104 moves rearwardly in a manner to be described and engages a horizontal slot 88-1 formed in the stationary rear wall 88 of the selector. Engagement of the ledge 104 with the slot 88-1 holds the minicartridge against upward vertical motion, thereby maintaining the lower sorting edges of the selected minicartridge in operative contact with the upper surface of the stationary and movable platens 30 and 32. In this way, proper cooperation between the lower sorting edges of the cards of the selected minicartridge and the card select blades is assured.

Extending rearwardly from the mid-portion of the rear wall 98 is a horizontal ledge 106. The length of the ledge 106 measured along the Z axis exceeds the movememnt of the rear wall 98 rearwardly in the direction of arrow 33' relative to the side walls 59 and 60, which relative movement occurs when the movable platen 32 moves rearwardly a distance X from the home position to its position 32" (compare solid line position with phantom line position in FIG. 5A). By virtue of having the ledge 106 so dimensioned relative to the movement of the rear wall 98 in the course of a card selection operation, the rear wall 98 of the selected minicartridge throughout its movement in a card selection operation will always be constrained against lateral movement in the direction of the X axis by the ledges 106 extending rearwardly from the rear walls 98 of the two unselected minicartridges located on either side of the selected minicartridge.

Extending upwardly from the forward edge of the forward portion 65-3 of the upper wall 65 is integral vertical wall 108. The forward upper surface of the wall 108 cooperates with a vertically depending portion 110 of the pusher finger 111 of the minicartridge release assembly 38 to facilitate rearward motion in the direction of arrow 33' as an incident to selection of the minicartridge of a cartridge located on the card selector 26. Extending forwardly from the vertical wall 108 is a horizontal ledge 112. The upper surface of the ledge 112 cooperates with the lower surface 110a of the depending leg 110 of the minicartridge selector pusher finger 111 for the purpose of preventing upward vertical movement of a selected minicartridge relative to the platen 28. The lower surface of depending leg 110 is inclined upwardly and rearwardly to (a) insure that the lower surface thereof will ride atop ledge 112 as the leg advances rearwardly to release a selected minicartridge, and (b) cam downwardly the ledge 112 during engagement therewith.

The lower rear corners of the side walls 59 and 60 are removed to accommodate the forwardly protruding lower portion of the combined locating plate and rear wall 98.

The forward portion of the side wall 60 is provided with horizontally extending cuts or slots 115 and 116 to permit the intervening side wall material 117 to act as a spring when bowed inwardly in its mid-portion, to thereby urge the cards in the minicartridge away from the inner surface of wall 60 toward the wall 59. This functions to provide a space between the right-most card of the minicartridge and the inner surface of the wall 60 into which the trailing edge 50-3 of a card can be inserted when a card is being returned to the minicartridge by the card transport 40.

The upper wall 65 of the minicartridge is provided with forwardly extending ledges 120 and 121. The ledges 120 and 121 facilitate suspension of the minicartridge on rearwardly extending ledges 123 and 124 of the cartridge 16. By virtue of the fact that the minicartridge ledges 120 and 121 extend forwardly and the cartridge ledges 123 and 124 extend rearwardly, a selected minicartridge can be released from suspension by the cartridge by rearward movement of the upper wall 65 by the minicartridge selecting pusher finger 111 relative to the cartridge ledges 123 and 124.

The cartridge 16, as shown in FIGS. 16, 17 and 18, includes an elongated horizontal plate 130 having depending front and rear walls 131 and 132 from which extend in a rearwardly direction the ledges 123 and 124. Extending upwardly from the front and rear portions of the panel 130 are longitudinal parallel wall portions 135 and 136 having forwardly and rearwardly extending ledges 137 and 138, respectively. Preferably, the elements 123, 124, 130, 131, 132, 135, 136, 137 and 138 are all integrally formed such as from an extrusion. As noted, the ledges 123 and 124 engage the minicartridge ledges 120 and 121 to support a minicartridge. The cartridge ledges 137 and 138 seat on rearwardly and forwardly extending ledges 140 and 141 of the cartridge retriever 22. The inwardly extending cartridge retriever ledges 140 and 141 slidably support the outwardly extending cartridge ledges 137 and 138 to facilitate sliding transfer of a cartridge between a position supported by the cartridge retriever 22 and a position supported by the inwardly extending ledges or rails 18 and 20 of a crypt.

The cartridge 16 also includes a plurality of parallel vertical end wall and divider panels 142 which are identical and are secured to the horizontal panel 130 by suitable fasteners 147. The panels 142 separate the minicartridges of a cartridge into four groups, with preferably five minicartridges per group. The vertical dimension of the panels 142 is such that the lower horizontal edges thereof are spaced slightly above the lower edges 61 of the minicartridge side walls 59 and 60 of a minicartridge supported on cartridge ledges 123, 124. In this way, the panels 142 do not interfere with the select blades of the selector 26 when a retrieved cartridge is positioned thereat.

Also included in the cartridge 16 are a pair of vertical disposed end bars 148 and 149 disposed outwardly of the endmost 142a panel and adjacent the front edges thereof. Rigidly connected to the upper portions of the vertically disposed bars 148 and 149 is a longitudinal retainer plate 150 consisting of a horizontal portion 151 and front and rear integral depending portions 152 and 153 which engage the forward and rear edges, respectively, of the upper end of the vertical bars 148 and 149. The vertical bars 148 and 149 are mounted for limited vertical sliding motion with respect to end plates 142a via pairs of spaced vertical pins 155a, 155b and 156a, 156b extending laterally outwardly from the end panels 142a. The pins 155a and 155b extend rightwardly from end panel 142a through a slot 157 formed in the bar 149. Pins 156a and 156b extend leftwardly from the end plate 142a through a slot 159 formed in the bar 148. Left and right stop pins 158a, 158b are fixed to bars 148, 149, respectively, and project considerably beyond the plates 142a.

When a cartridge 16 supported by the cartridge retriever 22 is being lowered onto the card selector 26, stationary abutments 160 and 161 (FIG. 1B) limit the downward movement of the bars 148, 149 such that continued downward movement of the cartridge results in relative upward movement of the retainer bar 150 relative to the cartridge ledges 123 and 124 on which the minicartridges are supported. As a consequence of the upward movement of the retainer bar 150 relative to the minicartridge supporting ledges 123 and 124, the depending lip 153 of the retainer bar moves upwardly relative to the lip 108 of the minicartridges which have their ledges 120 and 121 supported by ledges 123 and 124. Upward movement of the depending lip 153 of the retainer bar 150 relative to the minicartridge lip 108 effectively unlocks the minicartridge with respect to the cartridge. As a consequence, when the cartridge 16 and its associated minicartridges are seated on the platen 28 of the card selector 26, retainer bar lip 153 is disengaged from the lips 108 of the minicartridges, permitting the depending leg 110 of the minicartridge releasing pusher 111 to move a selected cartridge rearwardly, thereby releasing it from support by the cartridge. The vertically shiftable retainer bar 150 operates to prevent minicartridges from becoming disengaged from the ledges 123 and 124 of the cartridge 16 at all times, except when a retrieved cartridge is seated atop the card selector 26 and the retainer bar 150 has been elevated by abutment of laterally-extending pins 158a and 158b with stationary abutments 160 and 161, respectively.

The depending panel station 152 of the retainer bar 150, when the retainer bar 150 is in its lowered position, such as during transport of a cartridge between the crypt and the card selector 26 as well as during storage in the crypt, functions to block the upper open portion of the front wall of the minicartridges associated with a particular cartridge. As a consequence, cards located within the minicartridges are precluded, when the retainer bar 150 is in its lowered position, from inadvertently leaving the minicartridges via the front walls which, except for the retainer bar panel section 152, are open.

With reference to FIGS. 2, 3, 4, 5 and 5A, the relationship of the cartridge, a selected minicartridge, an unselected minicartridge, and the platen 28 are now described. More specifically, FIG. 2 shows the cartridge 16 with its associated minicartridges MC supported by the cartridge retriever 22 at a point spaced above the platen 28. The minicartridge ledges 120 and 121 of all the minicartridges are engaged with the minicartridge supporting ledges 123 and 124 of the cartridge 16. The minicartridges are restrained against rearward movement with respect to the cartridge 16 by the depending lip 153 of the retainer bar 150 which, in the position shown in FIG. 2, is in its lowered position behind the minicartridge lips 108. The upper portions of the front walls of the minicartridges are blocked by the depending panels 152 of the retainer bar 150 which, as indicated, is in its lowered position relative to the cartridge 16.

The cartridge retriever is positioned in the Z direction such that during final downward travel in the course of depositing the minicartridges atop the platen 28, the rear edge of the minicartridge ledge 104 will clear the angled front surface 88-2 of the rear selector wall 88 and position the rear portion of the ledge 104 atop the forwardly extending ledge 88-3 of the rear selector wall 88. The positioning of the cartridge retriever 22 in the Z direction is also such that during the final stages of downward movement of the cartridge retriever, the bars 62 and 63 and the ledge 103 of the minicartridges which constitute the bottom of the minicartridge will seat in transverse slots 162, 163 and notch 164, respectively, formed in the upper surface of the stationary and movable platens 30 and 32.

With the cartridge retriever 22 positioned as described, during the final downward movement of the cartridge retriever the horizontal pins 158a and 158b extending from end bars 148, 149 abut the stops 160 and 161 of the cartridge selector 26. This elevates the retainer bar 150 relative to the minicartridges to disengage retainer lip 153 from the lips 108 of the minicartridges, as well as elevates the retainer panel 152 clear of the open wall of the minicartridges. Final downward positioning motion of the cartridge retriever 22 locates the minicartridge bottom bars 62 and 63 in the transverse slots 162 and 163, the ledge 103 in the transverse notch 164, and the rear portion of the minicartridge ledge 104 atop the forward portion ledge 88-3 of the rear selector wall 88.

At this point the assembly 34 has been indexed along the X axis to a point such that pusher finger 111 of the minicartridge release assembly 38 is opposite the minicartridge containing the card which it is desired to retrieve. With the pusher finger 111 of the minicartridge release assembly 38 so positioned, the pusher finger is moved rearwardly along the Z axis in the direction of arrow 33' from the position shown in FIG. 3 to the position shown in FIG. 4. The integral upper wall 65 and rear wall 98 of the selected minicartridge move rearwardly from the position shown in FIG. 3 to the position shown in FIG. 4 under the action of the rearwardly-moving minicartridge release pusher finger 111 disengages ledges 120 and 121 of the selected minicartridge from cartridge ledges 123 and 124. Additionally, the minicartridge ledge 104 enters slot 88-1 of the selector rear wall 88. The side walls 59 and 60 of the selected minicartridge remain in their original position with bottom bars 62 and 63 engaged in platen slots 162 and 163. The integral sidewalls 59 and 60 and bottom retainers 62 and 63 do not move rearwardly with integral upper wall 65 and rear wall 98 due to the fact that the stationary vertical surface 132a of cartridge wall element 132 abuts the rear vertical edges 67a, 67a of vertical cartridge wall extensions 67, 67.

With the selected minicartridge MC containing the desired card now released from engagement with the cartridge 16, and with the pusher bar 111 still in its rearward position shown in FIGS. 4 and 5, the cartridge retriever 22 is raised vertically upwardly a slight amount, for example, ⅜ inch. This limited upward movement of the cartridge retriever 22 elevates the bottom bars 62 and 63 and the ledge 103 of the undesired minicartridges, which constitute the bottom wall thereof, which in turn elevates the sorting edges of the cards in the undesired minicartridges which are supported thereby, clear of the select blades when raised to their upper positions in the course of selecting the desired card from the selected minicartridge. The selected minicartridge, which is not raised by the cartridge retriever, remains in its lowered position with the sorting edges of the cards therein operatively engaged with the card select bars of platen 28.

When the cartridge retriever 22 has raised all the undesired minicartridges upward sufficiently relative to the platen to avoid any mechanical interference between the sorting edges of the undesired cards in the unselected minicartridges and the sorting bars of the platen, that is, to the position shown in FIG. 5, the minicartridge selecting pusher finger 111 is retracted forwardly in the direction of arrow 33 along the Z axis to the position shown in FIG. 5A. As the minicartridge selecting pusher finger 111 moves as indicated, the springs 64 of the selected minicartridge return the integral upper wall 65 and rear wall 98 of the selected minicartridge to their forwardmost position shown in solid lines in FIG. 5A. It should be noted that the upper rear corner of vertical panel 67 has maintained engagement with the vertical forward surface of ledge 124 even though the ledge 124 has been elevated above its normal minicartridge carrying position. This engagement between panel 67 and ledge 124 insures that rearward movement of wall 98 will not be imparted into a rearward movement of side walls 59, 60. That is to say, the side walls 59, 60 will remain fixed relative to the X movement of wall 98 during a selection sequence and the rear wall 98 will be returned to home position by the force of springs 64. By reason of the fact that the cartridge retriever 22 was elevated slightly from the position it occupied when it deposited the selected minicartridge on the platen 28, the minicartridge supporting ledges 123 and 124 of the cartridge 16 are located above the ledges 120 and 121 of the selected minicartridge, thereby preventing any mechanical interference therebetween as the springs 64 return the upper minicartridge wall 65 to its forward position shown in solid lines in FIG. 5A.

At this point the selected minicartridge containing the desired card is in operative relation with respect to the platen 28 to facilitate selection of the desired card and advancement of it a distance X+2W in the direction of arrow 33 relative to the front vertical edges of the minicartridge side walls 59 and 60 which define the open front wall of the minicartridge, as previously described in connection with FIG. 19. As noted previously, since the retainer bar 150 is in its elevated position by reason of engagement of the stationary stops 160 and 161 with the pins 158a and 158b of the cartridge divider end bars 148 and 149, the retainer panel section 152 is elevated above the upper portion of the open front wall of the selected minicartridge, allowing the leading edge 50-1 of the selected card to project through the open front wall of the minicartridge a distance X+2W for removal by the selected card removal device 40, to be described in more detail hereafter.

As previously described, the desired card is selected by coordinated movement of the primary and complementary sorting blades 56 and 55, the acquisition blades $A_1$ and $A_2$, and the return blades $R_1$ and $R_2$, in combination with movement of the platen 32 between its home position and its forward position 32' and rearward position 32". Movement of the sort bars is accomplished by energization of the solenoids 96, 96' ... as discussed in connection with FIG. 14, while movement of the platen 32 is effected by rotating the cam 70 as described in detail previously in connection with FIG. 5A. At the end of the card selection operation, the desired card in the selected minicartridge has its leading edge 50-1 extending a distance X+2W forwardly in the direction of arrow 33 relative to the forward vertical edges of the selected minicartridge side walls 59 and 60 which define the open front wall of the minicartridge.

The selected card removal/return transport and intermediate buffer store 34, consisting of the carrousel buffer 36, card transport 40, and minicartridge releasing finger assembly 38, will now be described in connection with FIGS. 1A, 1B, 2, 10, 11, 12, and 15. The assembly 34, which mounts the carrousel buffer 36, minicartridge releasing assembly 38, and card transport 40, consists of upper and lower horizontal, spaced, parallel plates 180 and 182 which are in generally superimposed relation. The upper and lower plates 180 and 182 are maintained in spaced-apart relation by a set of four interconnecting vertical columns 183 located one at each of the four corners of the plates. The lower plate 182 is mounted for bidirectional traversing movement in the X direction relative to the minicartridges of a cartridge 16 located at the selector 26. To facilitate traversing movement of the lower plate 182 and hence of the entire assembly 34, the rear edge 182a of the bottom plate 182 is provided with a notch in its lower surface 182b which slideably engages the upper horizontal surface of a longitudinal guide rail 186 disposed parallel to the X axis below and forwardly of the upper forward edge of the stationary platen 30. The rear vertical edge of the plate 182 slideably engages the front vertical wall of the fixed platen 30. The rear portion 182a of the plate 182 is maintained in contact with the guide rail 186 by means of a guide roll 188 mounted on a horizontal shaft 189 which extends rearwardly from a vertical bracket 190 secured at its upper end to the lower surface 182b of the plate 182 at the rear portion 182a thereof.

The plate 182 is also supported for sliding movement on a horizontal guide rail 191 which extends parallel to the X axis below the plate 182. A guide lock 193 which slideably engages the horizontal guide rail 191 is mounted to the lower surface of the lower plate 182 via a mounting bracket 195. The guide rod 191 is mounted by a bracket 197 which is secured to the upper surface of a horizontal plate 198.

The location of the plate 198 relative to the plate 30c of the selector 26 is fixed against relative movement by a locator plate 200 which has anchored to it upwardly projecting locating pins 201 and 202 which pass through suitably provided openings in the selector base plate 30c and the plate 198 which mounts the guide rail 197. The locator plate 200 is mounted in the desired relative position to a frame plate 204 by suitable fasteners 206 to prevent relative movement therebetween. Thus mounted, the locator plate and associated pins 201, 202 secure the plates 30C and 198 against any relative movement in the X and Z directions. The selector plate 30c is positioned in the proper planar attitude by adjustable feet 207, 208 and secured by suitable fasteners, not shown, to preclude vertical movement in the Y direction. Adjustable feet 210 and 211 properly orient the plate 198 with respect to the plate 30c and suitable fasteners, not shown, secure the plate 198 against movement relative to the plate 200. By virtue of the foregoing arrangement of plates, locating pins, fasteners, guide rails, and guide surfaces, the base plate 182 of the assembly 34 is restricted to translating only in the X-Z plane parallel to the X axis to facilitate selective addressing of a selected minicartridge containing the desired card by the card transport 40 and minicartridge releasing finger assembly 38.

To drive the plate 182 a chain 214 is provided. The chain 214 connects to the plate 182 via a pin 215 which extends upwardly from an L-shaped bracket 216 secured to the lower surface of the plate 182, as shown in FIG. 13. The chain 214 trains over a pair of spaced sprockets 214a and 214b rotatably mounted on shafts disposed along axes parallel to the X axis. One of the chain sprocket shafts is driven by a bidirectional motor 218 (FIG. 1A). When the motor 218 is energized, the chain 214 is driven to translate the plate 182 in the desired direction parallel to the X axis.

To facilitate locating the plate 182 at selected positions corresponding to alignment of the card transport 40 and the minicartridge releasing finger assembly 38 opposite a desired minicartridge MC of a cartridge located on the card selector 26, a vertical plate 220, which extends horizontally parallel to the X axis the length of the guide roll 191, is provided. The plate 220 is stationarily mounted to the plate 198 by a bracket 222. The upper edge of the plate 220 is provided with vertically disposed slots 220a at locations along the X axis corresponding to the locations of the minicartridges of a cartridge located at the card selector 26. A photo-optic slot sensor 223 consisting of a light source and light sensor positioned on opposite sides of the upper slotted edge of the plate 220 is fixedly mounted to the bottom surface of the plate 182 by the bracket 195. As the plate 182 traverses in the X direction, the photo-optic sensor 223 provides an electrical signal each time it traverses a slot in the plate 220. The occurrence of the electrical signal is coincident in time with the registration of the minicartridge releasing finger assembly 38 and the card transport 40 with a minicartridge of a cartridge located at the card selector 26. By counting the signals produced by the photo-optic sensor 223 it is possible, using conventional digital positioning techniques, to selectively address any minicartridge at the selector 26 with the minicartridge releasing finger assembly 38 and the card transport 40.

The minicartridge release assembly 38 includes the pusher finger 111 as shown in FIGS. 2 and 10. The pusher finger 111 is generally elongated and seats in a suitably configured longitudinal slot disposed parallel to the Z direction in the upper surface of the upper plate 180. The pusher finger 111 is normally biased forwardly in the direction of arrow 33 along the Z axis by a tension spring 230 which is connected between a fixed pin projecting upwardly from the upper surface of the plate 180 and a pin projecting upwardly from the forward end of the pusher finger 111.

To advance the pusher finger 111 to the minicartridge releasing position, shown for example in FIG. 5 and FIG. 10, a solenoid 234 secured to the upper surface of the plate 180 is energized. Energization of the solenoid 234 retracts its horizontally disposed armature to the position shown in FIG. 10. Movement of the solenoid armature to the position shown in FIG. 10 pivots a horizontal lever 236 counterclockwise about a pivot 237, urging the other end of the lever 238 in the rearward direction 33' to the position shown in FIG. 10. The opposite ends of the lever 236 are provided with suitable longitudinal slots which cooperate in a conventional manner with pins fixed to the armature 235 and the reciprocating pusher finger 111, respectively. When the solenoid 234 is de-energized, the pusher finger 111 is spring biased by spring 230 in the rearward or retracted direction 33.

As discussed in detail previously, when the pusher finger 111 is urged rearwardly to the position shown in FIG. 10, the upper wall 65 of the selected minicartridge in its path is urged rearwardly, disengaging the selected minicartridge from the cartridge such that when the cartridge retriever 22 thereafter moves upwardly a limited amount the selected minicartridge alone remains in operative engagement with the platen 28 of the card selector 26. This facilitates selection of the desired card by the card selector blades and advancement of the selected card in the forward direction 33 parallel to the X axis a distance $X+2W$ through the open front wall of the selected minicartridge for subsequent removal by the card transport 40 in a manner to be described hereafter.

The card transport 40 is operative in two modes. In a first, or card remove mode, a card which has been selected by the card selector 26 from the minicartridge which has been released by the pusher finger 111 is totally removed from the minicartridge and transported to the bin of the carrousel 36 aligned with the card transport 40. In the second, or card return mode, a card in the bin of the carrousel 36 aligned with the card transport 40 is transferred from the bin to a selected minicartridge to which the card transport 40 and the minicartridge releasing assembly 38 are addressed.

The card transport 40, as shown in FIGS. 2 and 10, includes upper and lower pairs of rear transport rolls 240a, 240b and 241a, 241b, respectively. Upper and lower rolls 240a and 241a are mounted for rotation with a vertical shaft 243 which has its lower end suitably journaled in the plate 182. The upper end of the shaft 243 passes through a suitable bearing in the upper plate 180. A pulley 244 is secured to the extreme upper end of the shaft 243. The upper and lower card transport rolls 240b and 241b are mounted on a vertical shaft 246 disposed parallel to the shaft 243. The shaft 246 passes through slots in the upper and lower plates 180 and 182. The shaft 246 is biased toward the shaft 243 by compression springs 248 and 249 located between the upper and lower ends of the shaft 246 and stationary brackets secured to the plates 180 and 182. Resilient biasing of the shaft 246 toward the shaft 243 urges the rolls 240b and 241b on shaft 246 toward rolls 240a and 241a mounted on shaft 243.

An upper pair of front transport rolls 240a' and 240b' and a lower pair of front rolls 241a' and 241b' are mounted and spring biased into engagement in a manner identical to that of the forward transport rolls 240a', 240b and 241a, 241b. A pulley 244' is secured to the upper end of the shaft 243' in much the same manner that the pulley 244 is secured to the shaft 243. Upper and lower rolls 240a' and 240b' are mounted on shaft 243'. Similarly, the shaft 246' on which the upper and lower rolls 240b' and 241b' are mounted is spring biased by springs 248', 249'. A motor 252 mounted to the lower surface of the upper plate 180 has its output shaft 252' connected to a pulley 256. A drive belt 257 trains over pulleys 244, 244' and 256 imparts bidirectional driving motion to the driven rolls 240a, 241a of the rear set and 240a' and 241a' of the front set. Depending upon the direction of rotation of the motor shaft 252', a document engaged between the spring biased left rolls 240b, 241b and 240b', 241b' and the right rolls 240a, 241a and 240a', 241a' will be driven either forwardly in the direction of arrow 33 or rearwardly in the direction of arrow 33'.

When the card selector 26 selects a card from the selected minicartridge, the leading edge of the card is advanced forwardly a distance X+2W through the open front of the minicartridge. The location of the nip 40' defined by upper cooperating rear rolls 240a, 240b and lower cooperating rear rolls 241a, 241b relative to the front wall of a selected minicartridge is such that the leading edge 50-1 of a selected card displaced forwardly in the direction of arrow 33 a distance X+2W relative to the unselected cards of the selected minicartridge will be advanced into the nip 40' of the rear rolls 240a, 240b and 241a, 241b. With the leading edge of a selected card from the selected minicartridge automatically advanced into the nip 40' of the rear rolls 240a, 240b and 241a, 241b as the result of the card selection operation effected by platens 30 and 32 and their associated card select blades, the selected card is automatically transported by the card transport 40 into 36-1, 36-2, . . . 36-n of the carrousel 36 aligned therewith. The radial dimension of the bins of the carrousel 36 exceeds the length of the card, that is, the distance between the leading and trailing edges of the card 50-1 and 50-3, such that when a selected card is transported by the transport 40 in the direction of arrow 33 from the selected minicartridge to the aligned bin of the carrousel 30, the trailing edge 50-3 of the selected card once in the aligned bin of the carrousel will be displaced slightly forwardly in the direction of arrow 33 relative to the nip established by the forward set of transport rolls 240a', 240b' and 241a', 241b'. Thus, once a selected card has been transported by the transport 40 into the aligned carrousel bin of the carrousel 36, the card is free and clear of the forward set of card transport rolls 240a', 240b' and 241a', 241b'. Thus, the carrousel is free to index rotationally about its vertical axis 35 without mechanically interfering with the forward set of transport rolls of the card transport 40. Additionally, the selected card which has been transported to the bin of the carrousel 36 aligned with the transport 40, even if the carrousel does not index rotationally about its axis 35, will not be damaged if the transport 40 remains energized.

The carrousel 36, as previously noted, includes a plurality of radially disposed bins 36-1, 36-2, . . . 36-n (FIG. 10). Each of the bins 36-1, 36-2, . . . 36-n of the carrousel 36 typically is designed to store a single card. The bins, which are identically constructed, each includes the lower surface of an upper disc 272 and a radially disposed slot 274 formed in the upper surface of a lower disc 276. The vertical distance between the bottom surface of the bin-defining lower slot 274 and the lower surface of the upper bin-defining disc 272 is slightly greater than the vertical dimension of a card, thereby allowing a card to be supported by fingers of a gripper 316, to be described, in vertical disposition when in the bin with lower edge in 274 and yet slide freely in and out of the radial bin. The radial dimension of the slot of each bin is slightly in excess of the length of a card, that is, the distance between the leading and trailing edges 50-1 and 50-3 of a card. This insures that when a card is located in a bin 36-1, 36-2, . . . , it can advance radially inwardly into the bin sufficiently to avoid mechanical interference between the trailing edge 50-3 of the card, which is radially outboard, and the rear card transport rolls 240a', 240b' and 241a', 241b'.

Radially inward motion of a card in the bins 36-1, 36-2, . . . 36-n is limited by abutment of the leading edge of the card with the periphery of vertically aligned upper and lower hubs 300 and 302 disposed symmetrically about shaft axis 35. Hubs 300 and 302 preferably are formed integral with the slotted disc 276 which, with its associated slots 274, define the radially disposed, circularly arranged bins 36-1, 36-2, . . . of the carrousel 36.

The upper and lower discs 272 and 276 are mounted in vertically spaced, parallel, horizontal relation on a vertical shaft 280 which is suitably journaled in the upper and lower plates 180 and 182 for movement about vertical axis 282. The lower end of the shaft 280 projects downwardly through the lower plate 182 where it connects to a gear 284 driven from a motor 286 via a gear 288 mounted to the motor shaft 289. Secured to the lower end of the shaft 280 between the plate 182 and the gear 284 is a disc 290 provided with peripheral slots which are circumferentially spaced to correspond to the circumferential spacing of the radial bins established by radial slot pairs 270, 274 in the carrousel discs 272 and 276. Associated with the peripheral slots formed in the disc 290 which rotates with the carrousel is a stationary photo-optic sensor 292 which extends downwardly from the bottom surface of the plate 182. The photo-sensor 292 includes a cooperating light source and light transducer mounted above and below, respectively, the disc 290. When the carrousel discs 270 and 274 are rotated by the motor 286, the slots in the disc 290 will arrive at the photo-sensor 292 coincident with the arrival of the bins 36-1, 36-2, . . . of the carrousel in alignment with the card transport 40. As successive bins 36-1, 36-2, . . . 36-n successively pass the card transport 40, corresponding slots of the disc 290 successively pass the photo-optic sensor 292, providing an electric signal in timed coincidence with the alignment of the various card bins with the card transport 40. The signals produced by the photo-sensor 292 can be utilized to control the angular positioning motion of the carrousel. For example, by counting the signals provided by the photo-sensor 292 it is possible, using conventional digital positioning techniques, to angularly index the carrousel to locate any bin relative to the card transport 40.

The lower surface of the bottom slot 274 formed in disc 276 is horizontally aligned with the lower surface of a slot 294 formed in the upper surface of the plate 182. The slot 294 is radially disposed in the plate 182 relative to the axis 35 of the carrousel such that it receives the lower edge of a card passing between a bin aligned with the card transport 40 and a minicartridge aligned with the pusher 111 for the purpose of guiding the card through the card transport. Disposed above the slot 294 and in vertical alignment therewith is a slot 296 formed in a guide plate 298. The upper edge of a card passing through the card transport 40 is slidably engaged by the slot 296 to guide the upper edge of the card through the card transport.

As noted previously, the slots 274 defining each of the bins 36-1, 36-2, . . . have a radial dimension sufficient to insure that when a card is in the bin with its leading edge 50-1 abutting the peripheries of hubs 300 and 302, the trailing edge 50-3 of the card will be radially inwardly disposed sufficiently to avoid mechanical interference with the card transport 40. This permits the carrousel to rotate about its axis 35 without cards stored in the various bins thereof mechanically interfering with the card transport, particularly the forward set of transport rolls 240b', 241b', 240a', 241a'. To facilitate removal of a card stored in a bin by the card transport 40, it is necessary to advance outwardly the radially outboard edge of the card in the bin, which is the trailing edge 50-3 of the card, into engagement with the nip of card transport rollers 240a', 241a', and 240b', 241b'. Once the radially outboard end of the card in the bin is engaged with the nip as described, the card transport 40 will transfer the card from the bin along guide slots 294 and 296 into the minicartridge aligned with the card transport assuming, of course, the motor 252 is rotating in the appropriate direction.

To initially engage the outboard vertical edge of a card stored in a bin of the carrousel 36 with the nip of the card transport rolls defined by rolls 240a', 241a' and 240b', 241b', a radially outwardly movable card gripping device 310 is provided in each bin 36-1, 36-2, . . . The card gripping devices 310, which are identical, each includes a radially disposed bar 312 slidably engaged in a radial slot 314 formed in the upper surface of carrousel disc 272. Extending downwardly from the radially outboard end of the bar 312 is a bifurcated card-gripping element 316 which consists of oppositely disposed fingers 316a and 316b configured to be positioned on opposite sides of a card located in a carrousel bin. These fingers will maintain the card in a vertical attitude while it is within the bins 36-1, 36-2 . . . 36-n.

The card-gripping device 310 is normally biased radially inwardly to the solid line position shown in FIG. 11 by a tension spring 318 which is secured between a pin 320 which projects upwardly from the upper surface of the bar 312 and a pin 322 which extends upwardly from the carrousel disc 272 through a longitudinal slot 324 formed in the bar 312. With the card-gripping device 310 in its normal solid line position, when a card is transported by the card transport 40 from the minicartridge to a bin, the leading edge of the card enters the slot between the depending card-gripping fingers 316a and 316b and moves therethrough until the leading edge of the card abuts the periphery of the hubs 300 and 302 at which point its trailing edge, which is radially outboard, is clear of the card transport.

To facilitate transfer of a card, such as a card 50' shown in phantom in FIG. 11, from a carrousel bin to its minicartridge via the card transport 40, it is necessary to radially outwardly move the card-gripping fingers 316a and 316b, which frictionally grip therebetween the card stored in the bin, from their solid line position to the phantom line position as shown in FIG. 11. When the card-gripping fingers 316a and 316b move from the solid line position to the phantom line position, the card 50' in the bin which is gripped frictionally between the fingers 316a and 318b is advanced radially outwardly such that the radially outboard vertical edge of the card 50' enters the nip formed by the upper card transport rolls 240a', 240b' and the lower card transport rolls 241a', 241b'. Assuming the card transport rolls are driven in the proper direction by the motor 252, the card will be transferred via the card transport 40 from the bin to the minicartridge aligned with the card transport.

To shift the card gripper 310 from the solid line position to the phantom line position, as viewed in FIG. 11, a solenoid-operated card gripper actuator 330 is provided. The assembly 330 includes a stationary solenoid 332 mounted to the upper surface of the upper plate 180. The solenoid 332 has an armature which is normally biased radially outwardly by the spring 318 of gripper assembly 310 to the solid line position shown in FIG. 10. Associated with the solenoid armature is a pivotal link 336 mounted for rotation about a fixed pivotal axis by a pin 338 which extends upwardly from the upper surface of the plate 180. The opposite ends of the link 336 are slotted to engage pins fixed to the solenoid armature and a radially shiftable bar 344 which guides in a radial slot 346 formed in the upper surface of the stationary plate 180. The bar 344 has extending downwardly from its radially inward end a pin 348 which passes through a radial slot 350 formed in the plate 180. The pin 348 at its lower end seats in a slot 354 formed in the radially inward end of the bar 312 of the card gripper 310.

When the solenoid 332 is energized and its armature retracted therein, the link 336 pivots about pin 338 in a counterclockwise direction as viewed in FIG. 10 to advance the bar 344 radially outwardly. This in turn advances the pin 348 (FIG. 11) radially outwardly, to advance the bar 312 of the card gripper 310 radially outwardly, to advance radially outwardly the radially outboard edge of the card 50' located in the bin with the nip of the transport rolls 240a', 240b' and 241a', 241b' for transport of the card to the minicartridge aligned therewith. When the solenoid 332 is deenergized, the spring 318 retracts the card gripper 310 radially inwardly which via pin 348 returns the bar 344 to its radially inward position. As the carrousel discs 270 and 276 are rotated about axis 35 by the carrousel motor 286, the slots 354 of the card grippers 310 associated with each bin successively receive the lower end of the pin 348. As a consequence, and regardless of the particular bin 36-1, 36-2, . . . aligned with the card transport 40, the pin 348 of the actuator 330 will be engaged with the slot 354 of the card gripper 310 of the bin aligned with the card transport such that when the solenoid 332 is energized the card gripper 310 will be advanced from its solid line position radially outwardly to its phantom line position to introduce the card frictionally gripped between the fingers 316a and 316b thereof into the nip formed by the card transport rolls 240a', 240b' and 241a', 241b'.

As viewed in FIG. 15, the system is also seen to include a remote buffer store 37 in the form of a carrousel substantially identical to the carrousel 36 of the selected card removal/return transport and intermediate buffer store 34. The remote buffer store 37 includes a pair of vertically spaced, parallel, horizontally disposed upper and lower carrousel discs 37a and 37b, which like the carrousel discs 272 and 276 of the carrousel 36, are provided with plural radially-disposed slots for defining radial bins 37-1, 37-2, . . . 36-n for storing cards therein. Associated with the remote carrousel buffer 37 is a card transport 37c which consists of a nip defined by an upper pair of cooperating rolls and a lower pair of cooperating rolls, with the pair of upper rolls overlying the lower rolls. The card transport 37c is bidirectionally driven by a motor (not shown).

Associated with each bin 37-1, 37-2, . . . of the remote carrousel 37 is a card gripper device similar to the card grippers 310 of each bin of the carrousel 36. Also associated with the remote carrousel 37 is a card gripper actuator 37d mounted on an upper plate 37e. Actuator 37d cooperates on a selective basis with the card gripper devices of each bin 37-1, 37-2, . . . to advance the radially outboard edge of a card in a bin of carrousel 37 aligned with the card transport 37c in a radially outwardly direction such that the outboard edge of the card is gripped by the transport 37c and advanced radially outwardly into the bin of the carrousel 36 aligned with the card transport 37c.

The location of the card transport 37c is such that the radially outboard edge of a card in a bin 37-1, 37-2, . . . of the carrousel 37 does not mechanically interfere with the card transport 37c as the carrousel discs 37a and 37b rotate about their vertical rotational axis. The card transport 37c also does not mechanically interfere with the radially outboard edge of a card stored in a bin 36-1, 36-2, . . . of the carrousel 36.

To transport a card from a bin in the carrousel 37 aligned with the card transport 37c to a bin of the carrousel 36 aligned with the card transport 37c, a card-gripping actuator assembly 380, to be described in connection with FIG. 12, is actuated to move a pair of vertical card-gripping fingers associated with the bin of carrousel 36 aligned with transport 37c from the solid line position to the phantom line position. This advances the outboard end of the card in the bin of the carrousel 36 aligned with card transport 37c into the nip of the card transport 37c whereupon the card is transferred from the bin of the carrousel 36 to the bin of the carrousel 37. As the card enters the bin of the carrousel 37 aligned with the card transport 37c, it passes through the vertical card-gripping fingers of the card gripper associated with that bin. The momentum of the card in the radially inwardly direction relating to the bin of carrousel 37 aligned with transport 37c produced by the card transport 37c is sufficient to drive the card radially inwardly into the associated bin of the remote carrousel 37 sufficiently such that the outboard edge of the card is driven clear of the card transport 37c. In this way mechanical interference between the radially outboard end of a card driven into a bin of the carrousel 37 by the card transport 37c will not mechanically interfere with the card transport 37c as the carrousel 37 rotates about its vertical axis.

The card gripper 310' which introduces the outboard edge of a card in a bin of the carrousel 36 aligned with the card transport 37c into the nip of the card transport 37c to facilitate transfer of the card from the bin in carrousel 36 into the bin of the carrousel 37 aligned with the card transport 37c is structurally identical to the card gripper assembly 310 described in connection with FIG. 11. The card gripper actuator 382 which actuates the card gripper fingers 316' from the solid line position to the phantom to the phantom line position, as shown in FIG. 12, of bins 36-1, 36-2, . . . aligned with the card transport 37c, is quite similar to the actuator assembly 330 discussed in connection with FIG. 11 and FIG. 10. Specifically, the card-gripping actuating assembly 382 includes a solenoid 384 having a normally extended armature in the position shown in FIG. 10. A link 388 pivoted about a vertical pin 390 extending upwardly from the plate 180 is driven in a counterclockwise direction by a pin in the outboard end of the solenoid armature when the solenoid 384 is energized. Counterclockwise motion of the link 380 about the pin 390 imparts radially outward motion via a pin 394 to a bar 396 which slides in a groove 398 formed in the upper surface of the plate 180. Radial outward movement of the bar 396 in response to energization of the solenoid 384 imparts, via a downwardly-depending pin 400 secured to the radial outboard end of the bar 396, radial outward motion to the bar 312' of gripper 310'. The lower end of the pin 400 seats in a slot 354' formed in the gripper bar 312'. As the carrousel discs 272 and 276 rotate about their vertical axis 35, the slots 354' of different ones of the gripper finger assemblies 310' receive the lower end of the pin 400.

Since the gripper device 310' of FIG. 12 associated with bin of carrousel 36 aligned with the card transport 37c is identical to the gripper device 310 shown in FIG. 11 (and is in fact that same gripper device when the carrousel is rotated to the proper angular position) associated with the card transport 40, it is not further described herein. Primed reference numerals in FIG. 12 represent elements of the card gripper 310' identical to elements of the card gripper 310 bearing reference numerals which are unprimed.

To prevent the bar 396 of card gripper actuator 382 from becoming disengaged with its associated radial slot 398 in the upper carrousel plate 180, a pin 404 passes through a slot 406 in bar 396. The pin 404 is provided with an enlarged head 408 which rides along the upper surface of the bar 396 to restrict vertical movement of the bar. A similar pin 343 having an enlarged head 345 passes through a slot 347 in the bar 344 of card gripper actuator 330 to inhibit vertical movement of the bar 344 in an upward direction, thereby maintaining the bar 344 engaged in its associated slot 346, as shown in FIG. 11.

The remote carrousel 37, like the carrousel 36, is selectively angularly indexable to present different bins thereof in alignment with the card transport 37c to facilitate insertion and removal of cards from the selected bin so aligned. In this way a card can be transferred between any bin of carrousel 36 and any bin of carrousel 37 providing the bins of the respective carrousels are in alignment with the card transport 37c and the carrousel 36 has translated to its rightward limit of travel, as viewed in FIG. 15, to position the intermediate carrousel 36 proximate the transport 37c associated with remote carrousel 37.

Also associated with the carrousels 36 and 37 is an elongated closed loop card conveyor 41. The conveyor 41 includes a card input transport 41a and a card output transport 41b. The card transport 41a facilitates transfer of a card from a bin of the carrousel 36 aligned therewith to the closed loop conveyor 41. The card transport 41b facilitates transfer of a card from the closed loop conveyor 41 to a bin aligned therewith of the remote carrousel 37. The closed loop conveyor 41 can take any suitable form, such as a pair of cooperating endless belts between which a card is transported from the inlet end 41c of the closed loop conveyor 41 associated with transport 41a, through a conveyor path 41f of predetermined selective length, to the outlet end 41d of the closed loop conveyor associated with the card transport 41b. Conveyors 41 satisfactory for purposes herein are commercially available from The Novak Co., Inc., Plainfield, N.J. The conveyor path 41f of the closed loop conveyor 41 may pass through a variety of input-/output ports whereat a card in the closed loop conveyor could be stopped for processing, such as, card viewing camera which transmits information on the card to remote cathode ray tube viewing screens, card duplication stations, card information updating stations, and the like.

To prevent interchange of the leading and trailing edges of a card selected from a minicartridge aligned with card transport 40 upon return of that card to its associated minicartridge following routing of the card through the closed loop path 41f of conveyor 41 for processing, the closed loop conveyor 41 is uni-directional. Thus, to route a card from a minicartridge aligned with card transport 40 through the closed loop conveyor 41 along path 41f for processing and thereafter return it to its minicartridge aligned with the card transport 40, the following card movement would take place in the sequence provided below:

(1) Selection of the desired card from its minicartridge aligned with transport 40 by the platen 28 and insertion of the leading edge of the card into the nip of card transport 40.

(2) Transfer of the selected card from its minicartridge into the bin of the carrousel 36 aligned with card transport 40.

(3) Translation of carrousel 36 rightwardly (FIG. 15) to a point proximate conveyor 41, if necessary, and rotation of the carrousel 36 to align the bin holding the selected card with the card transport 41a.

(4) Actuation of the card gripper actuator assembly 425 associated with card transport 41a to advance the card from the bin of the carrousel 36 aligned with the card transport 41a into the nip of the card transport 41a.

(5) Transfer of the card by the transport 41a into the inlet end 41c of the closed loop conveyor 41.

(6) Transfer of the card through the conveyor path 41f established by the closed loop conveyor 41 from the inlet end 41c thereof to the outlet end 41d thereof.

(7) Insertion of the card into the nip of transport 41b at the outlet end 41d of the conveyor 41 by the closed loop conveyor.

(8) Transfer of the card by the transport 41b from the outlet end 41d of the closed loop conveyor into the bin of the remote carrousel 37 aligned with the card transport 41b.

(9) Rotation of the bin containing the card in the carrousel 37 to a point aligned with the card transport 37c.

(10) Operation of the card gripper actuator 37d associated with the card transport 37c of the remote carrousel 37 to advance the card into the nip of the card transport 37c.

(11) Transport of the card by the transport 37c from the bin of the carrousel 37 aligned therewith into the bin of the carrousel 36 aligned with the card transport 37c.

(12) Rotation of the bin of carrousel 36 containing the desired card into alignment with the card transport 40.

(13) Actuation of the card gripper actuator 330 associated with the transport 40 to advance the outboard end of the card into the nip of the card transport 40.

(14) Transfer of the card by the transport 40 into the minicartridge aligned therewith.

If desired, at a point diametrically opposed to the card transport point 40, a card transport 440 and an associated card gripper actuator 442 may be provided. The card transport 440 and associated card gripper actuator 442, when the card transport 440 is driven in the appropriate direction, would function to eject a card from carrousel bin 36-1, 36-2, . . . aligned with the card transport 440 to any desirable associated input/output station 43A. The input/output station 43A associated with the card transport 440 could be a manual, nonautomatic station whereat the cards are delivered for manual utilization by an operator. Alternatively, the station 43A associated with the card transport 440 could be a card-viewing camera which transmits information on the card to a remote viewing station. Return of a card to a bin 36-1, 36-2, . . . of the carrousel 36 aligned with the card transport 440 is accomplished by introducing the card into the nip of the card transport 440. Assuming the card transport 440 is rotating in the appropriate direction, it transfers the card into the carrousel bin aligned therewith. The structure and operation of the card transport 440 and card gripper actuator 442 is identical to that of transport 41a and actuator 425.

If desired, other card processing stations 43B, 43C, . . . 43n could be located along the path of travel of carrousel 36 in line with station 43A. By locating stations 43A, 43B, . . . 43n along the path of carrousel 36 cards can be input/output relative to processing stations directly via carrousel 36 from their respective minicartridges, rather than indirectly via conveyor 41 and remote buffer 37 operating in association with buffer 36. To facilitate transfer of a card between buffer carrousel 36 and the stations 45A, 45B, . . . 45n, carrousel 36 must be translated along the X axis to a point where its associated transport 440 is proximate the station to which it is desired to effect a card transfer.

The control circuitry for indexing the carrousels 36 and 37, energizing in the desired direction the various card transports 40, 37c, 41a and 440, actuating the various card-ejecting assemblies 330, 382, 425 and 442, energizing the minicartridge releasing solenoid 234 and indexing the card transport 40 and minicartridge releasing assembly 38 to the desired minicartridge could be accomplished utilizing a suitably programmed microcomputer or minicomputer. Such a minicomputer or microcomputer could also control the operation of the cartridge retriever 22 and the acquisition, return, primary sort and complementary sort blades of the card selector 26 as well as the movement of the movable platen 32. It could also be accomplished semi-automatically under manual control with a keyboard having suitable control keys for each of the solenoids, motors and the like.

Assuming a particular card is desired for processing by one of the input/output stations associated with the closed loop conveyor, the cartridge retriever 22 is positioned opposite the crypt C-1, C-2, . . . containing the cartridge having the minicartridge in which the desired card is stored. With the cartridge retriever 22 so positioned, the cartridge containing the minicartridge having the desired card is transferred from its crypt to the cartridge retriever 22. The cartridge retriever 22 then transports and delivers the retrieved cartridge to the card selector 26. While the retrieved cartridge is being transported from its crypt to the card selector 26 by the cartridge retriever 22, the selected card removal/return transport and intermediate buffer store 34 is indexed to position the minicartridge releasing finger assembly 38 and the card transport 40 opposite the location which will be occupied by the minicartridge of the retrieved cartridge containing the desired card. As an incident to depositing the retrieved cartridge on the platen 28 of the card selector 26, all the minicartridges are released. This occurs as the minicartridge retaining bar 150 moves upwardly relative to the retrieved cartridge as the cartridge descends downwardly onto the platen 28 and the horizontally-extending pins 158a, 158b of the minicartridge retaining bar 150 abut the stationary stops 160, 161.

With the minicartridge retainer bar 150 in its raised position, the retrieved cartridge sitting atop the platen 28, the minicartridge releasing finger assembly 38 and card transport 40 aligned with the minicartridge containing the desired card, the minicartridge releasing finger assembly is activated to advance the finger 111 thereof rearwardly to release the desired minicartridge from the cartridge. Release of the desired minicartridge by the actuated release finger 111 slides the top 65 and rear wall 98 of the selected minicartridge rearwardly overcoming the bias of tension springs 64 of the selected minicartridge. Rearward movement of the rear wall 98 of the selected minicartridge engages the lower ledge 104 thereof with the horizontal slot 88-1 of the stationary rear wall 88 of the selector 26, locking the rear of the minicartridge in the desired vertical position relative to the platen 28. The upper forward portion of the selected minicartridges is blocked against upward vertical movement by engagement of the pusher finger 11 with the ledge 112 of the upper wall 65 of the selected minicartridge. The cartridge retriever 22 is now elevated slightly to clear the retrieved cartridge relative to the selected and released minicartridge. The minicartridge release assembly 38 is now de-energized, allowing the finger 111 to retract forwardly and the upper wall 65 and rear wall 98 of the selected minicartridge to return under the action of the springs 64 to their normal position shown in solid lines in FIG. 5.

Card selection now takes place by actuating, in the desired sequence, the primary and complementary sort blades $P_a$, $P_b$, . . . and $C_a$, $C_b$, . . . , the acquisition bars $A_1$ and $A_2$, the return bars $R_1$ and $R_2$, and the stationary and movable platens 30 and 32. This results in selection of the desired card relative to the remaining cards in the selected minicartridge. With the desired card selected, the leading edge 50-1 thereof extends a distance $X+2W$ forwardly out of the open front wall of the selected minicartridge, which is now unblocked by elevation of the panel 152 of the minicartridge retaining bar 150 upwardly relative to the selected minicartridge. With the leading edge 50-1 of the selected card so projecting, the selected card is inserted into the nip of the rolls 240a, 241a and 240b, 241b of the card transport 40. With the card transport 40 energized in the appropriate direction, the selected card is passed through the card transport 40 into the aligned bin of the carrousel 36. As the selected card passes into the bin of the carrousel 36 from the card transport 40, it is frictionally gripped by the fingers 316a and 316b of the card gripper 310 (FIG. 11) of the bin.

The carrousel 36 is now translated along the X axis to position it proximate conveyor 41, and in particular card transport 41a associated with the inlet end 41c of the conveyor 41. Carrousel 36 is also rotated to align the bin containing the desired card opposite the card transport 41a at the inlet end 41c of the closed loop conveyor 41. To save time, translation and rotation of carrousel 36 occur simultaneously. With the bin of the carrousel 36 containing the desired card so aligned, the card gripper actuator 425 associated with card transport 41a at the inlet end 41c of the closed loop conveyor 41 is activated to advance the outboard end of the desired card into the nip of the card transport rolls 41a whereupon the card is inserted into the inlet end 41c of the closed loop conveyor for transport by the closed loop conveyor to the desired input/output station along path 41f where the card is appropriately processed.

After processing of the card at the input/output station located along the path 41f of the closed loop conveyor 41, the conveyor 41 is again energized to transport the card to the outlet end 41d thereof where it enters the card transport 41b for insertion into an empty bin of the remote carrousel 37 aligned therewith. As the card enters the empty bin of the remote carrousel 37 aligned with the card transport 41b associated with the outlet 41d of the closed loop conveyor 41, the card is frictionally gripped by the fingers of the card gripper device associated with that bin.

The remote carrousel 37 then rotates to place the bin containing the desired card opposite the card transport 37c. The card gripper actuator 37d associated with card transport 37c is then actuated to advance the radially outboard end of the card in the bin of the carrousel 37 aligned with the card transport 37c into the nip of the card transport 37c. The card is transported by the card transport 37c into the empty bin of the carrousel 36 aligned with the card transport 37c. The carrousel 36 is rotationally indexed to position the bin containing the card opposite the card transport 40. The card gripper actuator 330 is then energized to insert the outboard edge of the card into the nip of the card transport rolls 240a', 240b' and 241a', 241b' whereupon the card is transferred from the bin of the carrousel 36 aligned with the card transport 40 into the minicartridge aligned therewith.

To return the cartridge at the selector to its crypt following a card selection operation, the minicartridge release assembly 38 is energized to advance the pusher finger 111 thereof rearwardly to move the top 65 and rear wall 98 of the selected minicartridge rearwardly to the phantom line position shown in FIG. 5. With the upper and rear walls 65 and 98 so positioned, the cartridge retriever 22 can be lowered slightly to locate the minicartridge support ledges 123 and 124 of the cartridge 16' below the ledges 120 and 121 of the upper wall 65 of the previously selected minicartridge into which the card was inserted. The minicartridge release assembly 38 is now de-energized, allowing the upper wall 65 and rear wall 98 of the previously selected minicartridge to return under the action of springs 64 to the solid line position shown in FIG. 5 in which the minicartridge ledges 120 and 121 are supported on the cartridge ledges 123 and 124. The cartridge retriever can move upwardly to return the cartridge 161 to its crypt in the course of which the retainer bar 150 descends relative to the minicartridges to partially block the front walls thereof with panel 152 and lock the minicartridges against rearward movement relative to the cartridge ledges 123 and 124 with lip 153. Alternatively, and instead of returning the cartridge to its crypt, the card transport 40 and minicartridge release assembly 38 can be indexed to another minicartridge and the entire minicartridge selecting and releasing, card selecting, card transporting and card processing procedure repeated.

As is apparent from the foregoing description of the preferred embodiment, when it is desired to select a card from a particular minicartridge of a cartridge located at the document selector and remove the selected document for transfer by the transport 40 to the buffer carrousel 36 for subsequent transfer to and processing by one or more of the stations 43A, 43B, . . . 43n and/or by one of the stations 45A, 45B, . . . 45n located along conveyor 41, it is necessary to select a minicartridge from the cartridge at the document selector utilizing the minicartridge selector 38 and in particular the associated cartridge-engaging pusher finger 111. However, to return a card to a minicartridge of a cartridge located in the mass document store 10, it is only necessary to retrieve and position the cartridge containing the minicartridge to which the card is to be returned at the card selector 26 with the bottom of the minicartridge resting atop the platen 30, 32; it is not necessary to select the minicartridge utilizing the minicartridge pusher finger 111.

For example, assume it is desired to place ten different cards manually inserted into station 41C located along conveyor path 41f of conveyor 41 into ten different minicartridges of a particular cartridge. To accomplish this, the ten cards manually inserted into station 41C are transported via the conveyor 41 and transport 41b to ten different empty bins of the carrousel 37. The carrousel 37 is then rotationally indexed to sequentially align the ten different cards therein with the card transport 37c for sequential transfer to ten empty bins of the carrousel 36 which are sequentially aligned with the transport 37c while the carrousel 36 is in its rightmost position as viewed in FIG. 15. While the ten new cards are being transferred from the manual document insertion/removal station 41C into empty bins of the carrousel 36 via carrousel 37, the cartridge containing the minicartridges into which the new cards are to be inserted is retrieved from the mass document store 10 and deposited at the document selector 26 by retriever 22 such that the bottom retainers 62, 63 of all the minicartridges of the retrieved cartridge are engaged in transverse slots 162 and 163 of the platen 30. With the minicartridges of the retrieved cartridge so positioned, and without activating the minicartridge selector to select and release any one or more minicartridges, the carrousel 36 and transport 40 are sequentially aligned with the desired, but unselected and unreleased, minicartridges of the retrieved cartridge, and the new cards in the bins of the carrousel 36 sequentially transferred to the desired minicartridges. Significantly, transfer of new cards to different minicartridges of a cartridge at the document selector 26 can occur without raising and lowering the cartridge incidental to releasing and reacquiring minicartridges, respectively.

Of course, and as noted previously, if a minicartridge of a cartridge at the selector 26 has already been selected and released, a card can be returned to it via transport 40 without reacquiring the minicartridge with the cartridge. The important point is that a card can be inserted into a minicartridge at the selector without selecting and releasing the minicartridge from the cartridge, providing the cartridge is in its lower position to seat the minicartridges thereof on the platen 28.

When transferring a card to a bin of one of the carrousel buffer storage devices 36 or 37, should the momentum imparted to the card by the associated card transport be insufficient to reliably insure full insertion of the card into the carrousel bin, such that its radially inward edge abuts the upper and lower locating hubs 300, 302 of the carrousel, the card gripper 310 and associated card gripper actuator 330 can jointly be utilized to positively drive the card inwardly against the locating hubs. More specifically, and with illustrative reference to insertion of a card into a storage bin of carrousel 36 via the card transport 40, to insure full insertion of a card into the bin the solenoid 332 of card gripper actuator 330 can be activated, shifting card gripper 310 to its outward position, prior to insertion of the card into the carrousel bin via the card transport. With card gripper 310 in its radially outboard position prior to insertion of a card into the bin of carrousel 36 by the associated transport 40 aligned therewith, when the card is inserted into the bin by the transport 40 it will slide through the slot formed by the fingers 316, 316 of the card gripper and advance radially inwardly under the action of the card transport.

When the radially outboard edge of the card being inserted is driven inwardly clear of the nip formed by the card transport rolls 240a', 240b', and 241a', and 241b', the solenoid 332 of the gripper actuator 330 is de-energized, causing the gripper 310 which has its fingers frictionally engaging the inserted card to move radially inwardly. Radially inward movement of the card gripper 310 with the inserted card frictionally gripped between fingers 316, 316 thereof is effective to positively drive the card inwardly. If the inward vertical edge of the card abuts the locating hubs 300 and 302 prior to the point when the gripper 310 has reached its innermost limit of travel upon de-energization of the solenoid 332, the gripper fingers 316, 316 of the card gripper will merely slide relative to the card which is now stationary by reason of abutment of its inner vertical edge against the carrousel hubs 300 and 302.

Thus, the card gripper 310 and associated actuator 330 can be utilized to insure complete insertion of a card into the bin of carrousel 36 if the momentum of the card imparted to it by the transport 40 is considered insufficient to reliably insure complete and full insertion of the card into the carrousel bin. Of course, the card gripper actuators 382, 425, and 442 associated with card transports 33c, 41a, and 440 can be utilized to insure complete insertion of cards into bins of carrousel 36 aligned with card transports 37c, 41a, and 440. Similarly, card gripper actuator 37d can be utilized to insure full insertion of a card into the bin of carrousel 37 aligned with card transport 37c.

For the purpose of minimizing average cycle time of a card retrieval/processing operation, it is preferable to align the minicartridge selector 38 at the location of the desired minicartridge MC-1, MC-2, . . . while the retrieved cartridge 16' is being transferred from its crypt C-1, C-2, . . . to the card selector 26. Additionally, and while the minicartridge selector 38 is being located in operative relation to the desired minicartridge, the rotary carrousel 36 can be rotationally indexed to align an empty bin 36-1, 36-2, . . . thereof with the card transport 40. Thus, when the cartridge 16' containing the minicartridge having the desired card is positioned at the document selector 26, the desired minicartridge can be immediately selected and the desired card transferred to an aligned empty bin of the carrousel 36. Similarly, to minimize cycle time it is preferable to rotate the carrousel 36 as necessary while the carrousel is being translated along the X axis to a selected position in alignment with one of the document processing stations 43A, 43B, . . . 43n, the conveyor 41, or the remote carrousel 37. Similarly, when a card is being returned from any one or more of the foregoing stations 43, conveyor 41, or remote carrousel 37 to its respective minicartridge, the rotary carrousel 36 can be rotationally indexed to align the bin containing the desired card with the transport 40 as the carrousel 36 is being translated along the X direction to align the minicartridge selector 38 with the desired minicartridge. Similarly, rotary indexing of carrousel 37 can occur while the carrousel 36 is translating along the X axis and/or itself undergoing rotary indexing movement.

While the preferred embodiment of the invention has been described in connection with a system in which a plurality of crypts each containing different cartridges are provided in conjunction with a remote document selector and cartridge retriever for transferring cartridges between the document selector and the remotely located crypts, it is contemplated that many of the principles of this invention can be utilized without a mass document store containing plural crypts/cartridges and a cartridge retriever. For example, the document selector 26 and a single cartridge could be advantageously utilized in certain applications in conjunction with the intermediate and remote buffer carrousels 36 and 37, the document conveyor 41, and the card processing stations 43A, 43B, . . . 43n.

What is claimed is:

1. Apparatus for retrieving stored documents comprising:
    a plurality of cartridges each containing plural minicartridges, each said minicartridge of a given cartridge being stored in said cartridge at a different predetermined selectively addressable minicartridge location, each of said minicartridges containing first and second open walls, said minicartridges each containing randomly stored documents encoded along at least one sorting edge thereof and disposed in said minicartridge in face-to-face relationship with their sorting edges in alignment adjacent said first open wall and a second one of their edges in alignment adjacent said second open wall, said minicartridges of a cartridge being arranged with said first minicartridge walls thereof disposed to collectively define a first cartridge surface and said second minicartridge walls thereof disposed to collectively define a second cartridge surface,
    a plurality of separate addressable stationary cartridge storage crypts, each crypt normally storing a different cartridge,
    a document selector located remote from said crypts, said document selector having document selecting elements disposed to define a sorting surface substantially coextensive with said first cartridge surface of a retrieved cartridge for facilitating selection movement of only a desired document of a selected minicartridge of said retrieved cartridge operatively engaged with said document selecting elements, said selection movement being in a direction to displace said second edge of said desired document of said selected minicartridge through said second wall thereof relative to the second edges of the undesired documents in said selected minicartridge,
    minicartridge selecting means selectively engageable with said selected minicartridge containing said desired document located in said retrieved cartridge, when said retrieved cartridge is located at said document selector for engaging in operative document selecting relation with said document selecting elements the sorting edges of only the documents of said selected minicartridge,
    selected document removal means selectively positionable relative to said second wall of said selected minicartridge containing said desired document for removing from said selected minicartridge said displaced selected document extending through said second wall thereof,
    a cartridge retriever movable between said remote document selector and a selected crypt for transferring a cartridge containing a desired document between its associated storage crypt and said document selector.

2. The apparatus of claim 1 wherein said cartridges each include means for releasably supportingly engaging their respectively associated minicartridges, and wherein said minicartridge selecting means includes means for selectively releasing a minicartridge containing a desired card from its associated cartridge located at said document selector to operatively engage said document selecting elements thereof with the sorting edges of documents contained only in said selected and released minicartridge, and wherein said cartridge retriever is positionable relative to said document selector at a first location whereat unselected and unreleased minicartridges not containing said desired document have the sorting edges of the documents contained therein displaced from, and disengaged relative to, said document selecting elements when said desired document in said selected and released minicartridge is being selected by said document selecting elements in operative document selecting relation with the sorting edge thereof.

3. The apparatus of claim 2 wherein said selecting elements are disposed to provide said sorting surface of said document selector in a generally horizontal plane configured to be substantially coextensive with said first cartridge surface, wherein said cartridge retriever positions a retrieved cartridge at said document selector with said first cartridge surface overlying said document selector sorting surface, and wherein a released minicartridge is positioned with its first wall lowermost and proximate said sorting surface of said document selector to expose the sorting edges of documents therein in operative selecting relation with said selecting elements, and wherein said first location of said cartridge retriever positions the first wall of the unreleased and unselected minicartridges supported in a retrieved cartridge above said document selector sorting surface to position the sorting edges of documents in said unreleased and unselected minicartridges in disengaged relation to underlying sorting elements of said document selector to prevent said operative document selecting relation from existing therebetween.

4. The apparatus of claim 1 wherein said sorting edges have a code notch region, wherein said selecting elements are elongated blades horizontally disposed transversely to said documents of a selected minicartridge at said document selector, said document selector including means for elevating and horizontally shifting selected blades into said code notch region of cards of a selected minicartridge at said document selector to displace said second edge of said desired document of said selected minicartridge through said second wall thereof relative to the second edges of the undesired documents in said selected minicartridge.

5. The apparatus of claim 4 wherein said minicartridges each include spaced side walls between which documents therein are disposed generally parallel thereto, a rear wall, and at least one bottom retainer spanning said side walls along the lower margin thereof to vertically support said documents in said minicartridge, said bottom retainer being clear of said code notch region of documents in said minicartridge, and wherein said document selector includes a horizontal platen having slots within which said blades are mounted for vertical movement, said minicartridge bottom retainer of a selected and released minicartridge seating on said platen when said blades are elevated and horizontally shifted to displace said second edge of said desired document through said second wall of said selected minicartridge relative to said second edges of undesired documents therein.

6. The apparatus of claim 5 wherein said minicartridges each have an upper support member mounted for movement relative to said side walls and bottom retainer between a normal support position supportably engaged by said cartridge and a release position displaced from said normal support position in a direction parallel to said sorting edges in which said minicartridge is released from said cartridge, minicartridge bias means acting on said support member for biasing it to said normal position, and wherein said minicartridge selecting means moves said upper support member to said release position to release said minicartridge from support by said cartridge.

7. The apparatus of claim 6 wherein said minicartridge selecting means maintains said upper support member of said selected minicartridge in said release position while said cartridge retriever moves said retrieved cartridge upwardly from a minicartridge selecting position whereat said bottom retainers of all minicartridges in a retrieved cartridge seat on said platen, to a first location whereat said bottom retainer of said selected minicartridge remains seated on said platen and the bottom retainers of unselected minicartridges rise above said platen to position the sort edges of documents therein out of operative document selection relation with said select blades of said document selector.

8. The apparatus of claim 7 wherein said cartridge and upper support member of said minicartridges includes cooperating horizontal ledges extending in opposite directions, said cartridge ledge supportingly underlying said minicartridge ledge when said upper support is in its normal position prior to selection and release thereof from said cartridge by said minicartridge selecting means, said cartridge having a retainer member movably mounted thereto for vertical shifting motion relative to said cartridge ledge between an upper unlocking position and a lower locking position, said retainer member having a minicartridge-engaging portion engageable with all minicartridges in a cartridge when said retainer member is in its lower locking position to lock said minicartridge ledges thereof against horizontal releasing motion relative to said cartridge ledge, said minicartridge-releasing portion being disengageable from said minicartridges in a cartridge when said retainer member is in its upper unlocking position, said retainer member having a document blocking portion blocking at least a portion of said second wall of minicartridges supported by said cartridge when said retainer member is in its lower locking position to prevent removal of a document from minicartridges supported by said cartridge, said document blocking portion being clear of said second wall of released minicartridges unsupported by said cartridge when said retainer member is in its unlocking position, and means to move said retainer member to its unlocking position prior to selection and release of a minicartridge from a retrieved cartridge.

9. The apparatus of claim 8 wherein said retainer member moving means includes stationary abutments disposed in the path of said retainer member as said retrieved cartridge moves vertically downwardly to position on said platen the bottom retainers of minicartridges supported by said downwardly moving retrieved cartridge, said abutments moving said retainer member to its unlock position as said retrieved cartridge moves downwardly.

10. The apparatus of claim 9 wherein said upper minicartridge support member of each minicartridge includes an upwardly extending vertical lip, said lip being located to engage and disengage said minicartridge-engaging portion of said retainer member when said retainer member is in its lower locking and upper unlocking positions to lock and unlock said minicartridge ledges against horizontal movement relative to said cartridge ledge, said minicartridge selecting means abutting said lip when said retainer member is in its upper unlocking position to displace said upper minicartridge support member of a selected minicartridge relative to the side walls thereof to disengage said selected minicartridge ledge from said cartridge ledge to thereby release said selected minicartridge from said cartridge.

11. The apparatus of claim 10 further including a horizontal lip extending outwardly from said vertical lip below the point where said minicartridge selecting means abuts said vertical lip to inhibit upward movement of said selected minicartridge when said cartridge retriever moves upwardly following release of said selected minicartridge.

12. The apparatus of claim 5 wherein said minicartridge rear wall moves with said upper support relative to said side walls and bottom retainer, said rear wall includes an outwardly extending ledge engageable with a horizontal slot in said card selector when said upper support is moved to its release position to maintain said selected minicartridge atop said platen following release thereof when said cartridge retriever moves to said first location to prevent the sorting edges of documents in unselected minicartridges from being in operative document selecting relation with said selecting elements of said document selector.

13. The apparatus of claim 6 wherein said rear minicartridge wall moves with said upper support relative to said side walls and bottom retainer, said rear wall having an inwardly facing locating surface for the trailing edge of documents therein, said platen including a rear section movable in a direction parallel to the sort edges of documents in operative document selecting relation therewith between a home position underlying the rear section of the sorting edge of documents in said selected minicartridge and a rear position displaced rearwardly from said home position, at least one select blade mounted in said rear platen engageable with said rear section of said sorting edge of documents in said selected minicartridge for moving undesired documents in said selected minicartridge rearwardly relative to a desired document to further separate said desired and undesired documents, said rear wall moving rearwardly with said rear platen section from its normal support position to prevent damage to said documents when said rear platen section moves from its home position to its rear position to move said one select blade rearwardly to further separate undesired documents from said desired document, said rear wall being returned to its normal position by said bias means when said rear platen section returns to said home position.

14. The apparatus of claim 13 wherein said rear platen section reciprocates between said home position and a forward position forwardly of said home position in the process of selecting a desired document from undesired documents in said selected minicartridge and displacing the desired document forwardly relative to said undesired documents, and further including means to limit forward movement of said rear wall beyond the position thereof occupied when said rear platen section is at its home position, thereby maintaining said trailing edge locating surface at a fixed reference position during said document selection process as said rear platen section reciprocates between its home and forward positions.

15. The apparatus of claim 13 wherein said rear wall of each minicartridge includes a first ledge extending rearwardly in a horizontal direction a distance exceeding the distance said rear wall is moved by said rear platen section when said rear platen section moves between its home position and its rear position, said rear wall ledges of unselected minicartridges located on either side of a selected minicartridge establishing guide barriers for the rear wall of the selected minicartridge to prevent the selected minicartridge rear wall, when in its rear position, from inadvertent movement perpendicularly to said minicartridge side walls to a position behind the rear walls of said adjacent minicartridges and thereby preventing the rear wall of said selected minicartridge from fully returning to its normal position as said rear platen section returns from its rear position to its home position.

16. The apparatus of claim 14 wherein said forward movement limiting means includes a rear edge of at least one of said minicartridge side walls which is disposed to abut said inwardly facing locating surface when said rear wall is in its normal support position.

17. The apparatus of claim 5 wherein one of said side walls of each minicartridge includes means projecting from the inside surface thereof toward the other side wall of each said minicartridge to establish a space between documents in said minicartridge and said inside surface of said one side wall into which a document can be inserted for convenient return to said minicartridge.

18. Apparatus for retrieving stored documents comprising:
a cartridge containing plural minicartridges, each said minicartridge being stored in said cartridge at a different predetermined selectively addressable minicartridge location, each of said minicartridges containing first and second open walls, said minicartridges each containing randomly stored documents encoded along at least one sorting edge thereof and disposed in said minicartridge in face-to-face relationship with their sorting edges in alignment adjacent said first open wall and a second one of their edges in alignment adjacent said second open wall, said minicartridges being arranged with said first minicartridge walls thereof disposed to collectively define a first cartridge surface and said second minicartridge walls thereof disposed to collectively define a second cartridge surface, a document selector having document selecting elements disposed to define a sorting surface substantially coextensive with said first cartridge surface of a cartridge for facilitating selection movement of only a desired document of a selected minicartridge of said cartridge operatively engaged with said document selecting elements, said selection movement being in a direction to displace said second edge of said desired document of said selected minicartridge through said second wall thereof relative to the second edges of the undesired documents in said selected minicartridge, minicartridge selecting means selectively engageable with selected minicartridge containing said desired document located in said cartridge, when said cartridge is located at said document selector, for engaging in operative document selecting relation with said document selecting elements the sorting edges of only the documents of said selected minicartridge, and selected document removal means selectively positionable relative to said second wall of said selected minicartridge containing said desired document for removing from said selected minicartridge said displaced selected document extending through said second wall thereof.

19. The apparatus of claim 18 wherein said cartridge include means for releasably supportingly engaging said minicartridges, and wherein said minicartridge selecting means includes means for selectively releasing a minicartridge containing a desired card from said cartridge located at said document selector to operatively engage said document selecting elements thereof with the sorting edges of documents contained only in said selected and released minicartridge, and cartridge positioning means positionable relative to said document selector at a first location whereat unselected and unreleased minicartridges not containing said desired document have the sorting edges of the documents contained therein displaced from, and disengaged relative to, said document selecting elements when said desired document in said selected and released minicartridge is being selected by said document selecting elements in operative document selecting relation with the sorting edges thereof.

20. The apparatus of claim 19 wherein said selecting elements are disposed to provide said sorting surface of said document selector in a generally horizontal plane configured to be substantially coextensive with said first cartridge surface, wherein said cartridge positioning means positions said cartridge at said document selector with said first cartridge surface overlying said document selector sorting surface, and wherein a released minicartridge is positioned with its first wall lowermost and proximate said sorting surface of said document selector to expose the sorting edges of documents therein in operative selecting relation with said selecting elements, and wherein said first location of said cartridge positioning means positions the first wall of the unreleased and unselected minicartridges supported in said cartridge above said document selector sorting surface to position the sorting edges of documents in said unreleased and unselected minicartridges in disengaged relation to underlying sorting elements of said document selector to prevent said operative document selecting relation from existing therebetween.

21. The apparatus of claim 18 wherein said sorting edges have a code notch region, wherein said selecting elements are elongated blades horizontally disposed transversely to said documents of a selected minicartridge at said document selector, said document selector including means for elevating and horizontally shifting selected blades into said code notch region of cards of a selected minicartridge at said document selector to displace said second edge of said desired document of said selected minicartridge through said second wall thereof relative to the second edges of the undesired documents in said selected minicartridge.

22. The apparatus of claim 21 wherein said minicartridges each include spaced side walls between which documents therein are disposed generally parallel thereto, a rear wall, and at least one bottom retainer spanning said side walls along the lower margin thereof to vertically support said documents in said minicartridge, said bottom retainer being clear of said code notch region of documents in said minicartridge, and wherein said document selector includes a horizontal platen having slots within which said blades are mounted for vertical movement, said minicartridge bottom retainer of a selected and released minicartridge seating on said platen when said blades are elevated and horizontally shifted to displace said second edge of said desired document through said second wall of said selected minicartridge relative to said second edges of undesired documents therein.

23. The apparatus of claim 22 wherein said minicartridges each have an upper support member mounted for movement relative to said side walls and bottom retainer between a normal support position supportably engaged by said cartridge positioning means and a release position displaced from said normal support position in a direction parallel to said sorting edges in which said minicartridge is released from said cartridge, minicartridge bias means acting on said support member for biasing it to said normal position, and wherein said minicartridge selecting means moves said upper support member to said release position to release said minicartridge from support by said cartridge.

24. The apparatus of claim 23 wherein said minicartridge selecting means maintains said upper support member of said selected minicartridge in said release position while said cartridge positioning means moves said retrieved cartridge upwardly from a minicartridge selecting position whereat said bottom retainers of all minicartridges in said cartridge seat on said platen, to a first location whereat said bottom retainer of said selected minicartridge remains seated on said platen and the bottom retainers of unselected minicartridges rise above said platen to position the sort edges of documents therein out of operative document selection relation with said select blades of said document selector.

25. The apparatus of claim 24 wherein said cartridge and upper support member of said minicartridges include cooperating horizontal ledges extending in opposite directions, said cartridge ledge supportingly underlying said minicartridge ledge when said upper support is in its normal position prior to selection and release thereof from said cartridge by said minicartridge selecting means, said cartridge having a retainer member movably mounted thereto for vertical shifting motion relative to said cartridge ledge between an upper unlocking position and a lower locking position, said retainer member having a minicartridge-engaging portion engageable with all minicartridges in a cartridge when said retainer member is in its lower locking position to lock said minicartridge ledges thereof against horizontal releasing motion relative to said cartridge ledge, said minicartridge-releasing portion being disengageable from said minicartridges in a cartridge when said retainer member is in its upper unlocking position, said retainer member having a document blocking portion blocking at least a portion of said second wall of minicartridges supported by said cartridge when said retainer member is in its lower locking position to prevent removal of a document from minicartridges supported by said cartridge, said document blocking portion being clear of said second wall of released minicartridges unsupported by said cartridge when said retainer member is in its unlocking position, and means to move said retainer member to its unlocking position prior to selection and release of a minicartridge from a retrieved cartridge.

26. The apparatus of claim 25 wherein said retainer member moving means include stationary abutments disposed in the path of said retainer member as said cartridge is moved vertically downwardly to position on said platen the bottom retainers of minicartridges supported by said downwardly moving cartridge, said abutments moving said retainer member to its unlock position as said cartridge moves downwardly.

27. The apparatus of claim 26 wherein said upper minicartridge support member of each minicartridge includes an upwardly extending vertical lip, said lip being located to engage and disengage said minicartridge-engaging portion of said retainer member when said retainer member is in its lower locking and upper unlocking positions to lock and unlock said minicartridge ledges against horizontal movement relative to said cartridge ledge, said minicartridge selecting means abutting said lip when said retainer member is in its upper unlocking position to displace said upper minicartridge support member of a selected minicartridge relative to the side walls thereof to disengage said selected minicartridge ledge from said cartridge ledge to thereby release said selected minicartridge from said cartridge.

28. The apparatus of claim 27 further including a horizontal lip extending outwardly from said vertical lip below the point where said minicartridge selecting means abuts said vertical lip to inhibit upward movement of said selected minicartridge when said cartridge positioning means moves upwardly following release of said selected minicartridge.

29. The apparatus of claim 22 wherein said minicartridge rear wall moves with said upper support relative to said side walls and bottom retainer, said rear wall includes an outwardly extending ledge engageable with a horizontal slot in said card selector when said upper support is moved to its release position to maintain said selected minicartridge atop said platen following release thereof when said cartridge positioning means moves to said first location to prevent the sorting edges of documents in unselected minicartridges from being in operative document selecting relation with said selecting elements of said document selector.

30. The apparatus of claim 23 wherein said rear minicartridge wall moves with said upper support relative to said side walls and bottom retainer, said rear wall having an inwardly facing locating surface for the trailing edge of documents therein, said platen including a rear section movable in a direction parallel to the sort edges of documents in operative document selecting relation therewith between a home position underlying the rear section of the sorting edge of documents in said selected minicartridge and a rear position displaced rearwardly from said home position, at least one select blade mounted in said rear platen engageable with said rear section of said sorting edge of documents in said selected minicartridge for moving undesired documents in said selected minicartridge rearwardly relative to a desired document to further separate said desired and undesired documents, said rear wall moving rearwardly with said rear platen section from its normal support position to prevent damage to said documents when said rear platen section moves from its home position to its rear position to move said one select blade rearwardly to further separate undesired documents from said desired document, said rear wall being returned to its normal position by said bias means when said rear platen section returns to said home position.

31. The apparatus of claim 30 wherein said rear platen section reciprocates between said home position and a forward position forwardly of said home position in the process of selecting a desired document from undesired documents in said selected minicartridge and displacing the desired document forwardly relative to said undesired documents, and further including means to limit forward movement of said rear wall beyond the position thereof occupied when said rear platen section is at its home position, thereby maintaining said trailing edge locating surface at a fixed reference position during said document selection process as said rear platen section reciprocates between its home and forward positions.

32. The apparatus of claim 30 wherein said rear wall of each minicartridge includes a first ledge extending rearwardly in a horizontal direction a distance exceeding the distance said rear wall is moved by said rear platen section when said rear platen section moves between its home position and its rear position, said rear wall ledges of unselected minicartridges located on either side of a selected minicartridge establishing guide barriers for the rear wall of the selected minicartridge to prevent the selected minicartridge rear wall, when in its rear position, from inadvertent movement perpendicularly to said minicartridge side walls to a position behind the rear walls of said adjacent minicartridges and thereby preventing the rear wall of said selected minicartridge from fully returning to its normal position as said rear platen section returns from its rear position to its home position.

33. The apparatus of claim 31 wherein said forward movement limiting means includes a rear edge of at least one of said minicartridge side walls which is disposed to abut said inwardly facing locating surface when said rear wall is in its normal support position.

34. The apparatus of claim 22 wherein one of said side walls of each minicartridge includes means projecting from the inside surface thereof toward the other side wall of each said minicartridge to establish a space between documents in said minicartridge and said inside surface of said one side wall into which a document can be inserted for convenient return to said minicartridge.

35. The apparatus of claim 1 or 18 further including:
an intermediate document buffer store having plural document storage locations therein,
a selected document removal transport engageable with the leading edge of a selected document projecting through said second wall of a selected minicartridge for removing said selected document from said selected minicartridge and transferring it to a document storage location of said buffer aligned therewith,
means mounting said selected document removal transport for movement along a transport path adjacent said second cartridge surface of a cartridge at said selector to align said transport with said second wall of said selected minicartridge, to facilitate removal of a selected document therefrom by said transport,
means mounting said intermediate document buffer store for movement along a buffer store path adjacent and parallel to said transport path of said selected document removal transport to facilitate transfer to a document storage location of said intermediate buffer store of a document removed by said transport from a selected minicartridge aligned therewith, and
means for aligning different ones of said document storage locations of said intermediate buffer store with said selected document removal transport to permit buffer storage of a selected document of a selected minicartridge in different ones of said document storage locations of said intermediate buffer store.

36. The apparatus of claim 35 wherein said intermediate document buffer store includes a first rotatably mounted carrousel in which said document storage locations are circularly arranged, and
wherein said means for aligning different ones of said document storage locations of said first carrousel with said selected document removal transport includes means for rotatably indexing said carrousel to sequentially locate different ones of said circularly arrayed document storage locations relative to said transport.

37. The apparatus of claim 35 wherein said transport mounting means and said document buffer store mounting means include a support member to which said transport and buffer store are secured, a longitudinal guide disposed parallel to said paths, said guide being engageable with said support member for guiding said buffer store and transport for movement in unison along their respective buffer store and transport paths successively past different minicartridges for successive alignment therewith, and drive means engageable with said support member for driving said transport and buffer store in unison for alignment with a selected minicartridge.

38. The apparatus of claim 36 further including a support member on which said first carrousel is rotatably mounted and on which said transport is mounted, a longitudinal guide disposed parallel to said paths, said guide being engageable with said support member for guiding said first carrousel and transport for movement in unison along their respective carrousel and transport paths successively past different minicartridges for successive alignment therewith, and drive means engageable with said support member for driving said transport and carrousel in unison for alignment with a selected minicartridge 39. The apparatus of claim 38 wherein said minicartridge selecting means is mounted on said support member for movement in unison with said first carrousel and transport, thereby automatically positioning said transport in alignment with a minicartridge selected by said selecting means.

40. The apparatus of claim 36 wherein said first carrousel includes upper and lower discs having confronting vertically aligned arrays of circularly arranged radial document guides, vertically aligned guides of said upper and lower discs guidingly cooperating with the upper and lower edges of a document to define a document storage location.

41. The apparatus of claim 40 wherein said document guides are radial slots in said upper and lower discs for guidingly receiving the upper and lower edges of a document.

42. The apparatus of claim 41 wherein said upper and lower discs have downwardly and upwardly extending circular abutment members, respectively, for limiting radially inward motion of documents in said document storage locations.

43. The apparatus of claim 36 wherein each document storage location of said first carrousel includes a movable document gripping assembly extending into said document storage location for gripping a document located therein, and means for actuating said assembly to eject from said storage location a document located therein and introduce the radially outward edge thereof into said transport to return said document from said storage location to the selected minicartridge aligned therewith.

44. The apparatus of claim 43 wherein said document gripping assembly includes a pair of opposed fingers defining a slot into which the leading edge of a selected document enters to be frictionally gripped therebetween when said selected document is transferred into said carrousel storage location by said transport, and wherein said assembly actuating means includes means to reciprocate said fingers between a radially inward position for frictionally gripping a document transferred into said carrousel storage location and a radially outward position for ejecting a frictionally gripped document and introducing the radially outward edge thereof into said transport for return thereof to said selected minicartridge.

45. The apparatus of claim 36 wherein said carrousel includes upper and lower discs having confronting vertically aligned arrays of circularly arranged radial document guides, vertically aligned guides of said upper and lower discs guidingly cooperating with the upper and lower edges of a document to define a document storage location, wherein each document storage location of said carrousel includes a movable document gripping assembly extending into said document storage location for gripping a document located therein, each said gripping assembly including a radially disposed element mounted for sliding motion in a radial slot in one of said discs, said radially disposed element having a transverse slot therein, said slots of radially disposed elements of different storage locations collectively defining a circular slot having a center along the rotary axis of said carrousel, and means for actuating said gripping assembly to eject from said storage location a document located therein and introduce the radially outward edge thereof into said transport to return said document from said storage location to the selected minicartridge aligned therewith, said actuating means includes a first reciprocating element mounted for reciprocating movement in a first fixed radial path aligned with said selected document removal transport, said first reciprocating element having a slot-engaging portion cooperating with said circular slot for successively engaging different transverse slots of different radially disposed elements as said carrousel rotates about its axis, said first reciprocating element when moved radially outwardly along said first fixed radial path aligned with said selected document removal transport being operative to drive radially outwardly the radially disposed element associated with the carrousel storage location aligned with said selected document removal transport to eject therefrom the document stored therein.

46. The apparatus of claim 38 further including a second document transport disposed at a fixed location proximate said carrousel at some point along said carrousel path, document utilization means operatively associated with said second transport for receiving documents from said second transport, and means to index a predetermined empty carrousel storage location to said selected document removal transport for receipt of a selected document from a minicartridge aligned therewith, and thereafter index said carrousel to align said predetermined storage location with said second transport for transfer of said document in said predetermined storage location to said utilization means by said second transport.

47. The apparatus of claim 45 further including a second document transport disposed at a fixed location proximate said carrousel at some point along said carrousel path, document uitlization means operatively associated with said second transport for receiving documents from said second transport, and means to index a predetermined empty carrousel storage location to said selected document removal transport for receipt of a selected document from a minicartridge aligned therewith, and thereafter index said carrousel to align said predetermined storage location with said second transport for transfer of said document in said predetermined storage location to said utilization means by said second transport, said apparatus further including a second reciprocating element mounted for reciprocating movement in a second fixed radial path aligned with said second transport, said second reciprocating element having a slot-engaging portion cooperating with said circular slot for successively engaging different transverse slots of different radially disposed elements as said carrousel rotates about its axis, said second reciprocating element when moved radially outwardly along said second fixed radial path aligned with said second transport being operative to drive radially outwardly the radially disposed element associated with said predetermined carrousel storage location aligned with said second transport to eject therefrom the document stored therein.

48. The apparatus of claim 46 wherein said document utilization means includes a second rotatably mounted carrousel containing circularly arranged document storage locations, said second transport being operative to transfer a document between aligned document storage locations of said carrousels.

49. The apparatus of claim 48 further including a third document transport disposed at a second fixed location proximate said intermediate buffer store carrousel when at said point along said carrousel path, a fourth document transport located proximate said second carrousel, a document conveyor having a document conveying path disposed between an inlet and an outlet, said conveyor located to position its inlet proximate said third transport and said outlet proximate said fourth transport, said third transport facilitating transfer of a document from a document storage location of said intermediate buffer store carrousel when at said point along its path to said inlet of said conveyor, said fourth transport facilitating transfer of a document from said conveyor outlet to an aligned document storage location of said second carrousel, whereby a selected document from said selected minicartridge can be routed through said document conveying path and returned to said selected minicartridge without reversal of its leading and trailing edges by routing said selected document from said selected minicartridge successively through said intermediate buffer store carrousel, said conveyor, said second carrousel, and said intermediate buffer store carrousel via said selected document removal transport, third transport, fourth transport, second transport, and selected document removal transport.

50. The apparatus of claim 49 further including at least one document processing station located along said conveyor path for processing documents conveyed therepast.

51. The apparatus of claim 50 wherein said conveyor path is a path of fixed length and fixed location relative to said second carrousel.

52. The apparatus of claim 48 wherein said second carrousel is mounted to rotate about a stationary axis.

53. The apparatus of claim 46 wherein said document utilization means includes a second document buffer store containing plural document storage locations selectively movable in alignment with said second transport for transfer of selected documents between aligned document storage locations of said first carrousel and said second document buffer store via said second document transport.

54. The apparatus of claim 35 further including a second document transport disposed at a fixed location proximate said intermediate buffer store at some point along said intermediate buffer store path, a second document buffer store having plural document storage locations therein, means for indexing different ones of said document storage locations of said second buffer store in alignment with said second transport for receiving documents from said second transport, and wherein said aligning means aligns a predetermined empty intermediate buffer store document storage location with said selected document removal transport for receipt of a selected document from a minicartridge aligned therewith, and thereafter aligns said predetermined storage location with said second transport for transfer of said document in said predetermined storage location of said first buffer store to a document storage location of said second buffer store via said second transport.

55. The apparatus of claim 54 further including a third document transport disposed at a second fixed location proximate said first intermediate buffer store when at said point along said buffer store path, a fourth document transport located proximate said second buffer store, a document conveyor having a document conveying path disposed between an inlet and an outlet, said conveyor located to position its inlet proximate said third transport and said outlet proximate said fourth transport, said third transport facilitating transfer of a document from a document storage location of said first intermediate buffer store when at said point along its path to said inlet of said conveyor, said fourth transport facilitating transfer of a document from said conveyor outlet to an aligned document storage location of said second buffer store, whereby a selected document from said selected minicartridge can be routed through said document conveying path and returned to said selected minicartridge without reversal of its leading and trailing edges by routing said selected document from said selected minicartridge successively through said first buffer store, said conveyor, said second buffer store, and said first buffer store via said selected document removal transport, third transport, fourth transport, second transport, and selected document removal transport.

56. The apparatus of claim 38 further including at least one document processing station located along said conveyor path for processing document conveyed therepast.

57. Apparatus for storing rectangular documents having leading and trailing edges between which is located a bottom sorting edge having a code-notched region, said apparatus being useful with a document selector having a stationary front horizontal platen section with vertically shiftable document select blades, a horizontal movable rear platen section with vertically shiftable document select blades, and a rearwardly shiftable pusher selectively positionable along an axis parallel to said document select blades, said apparatus comprising:

a cartridge positionable in said document selector in first and second different vertical locations overlying said selector platen sections,
a plurality of minicartridges releasably supported by said cartridge for storing documents, each minicartridge containing:
(a) a pair of spaced vertical side walls between which stored documents code-notched along their bottom sorting edges are positioned in vertical face-to-face relation with their leading, trailing, and sorting edges aligned,
(b) a first vertical open front wall adjacent to which the leading edges of stored documents are positioned,
(c) a second horizontal open bottom wall adjacent to which the sorting edges of stored documents are positioned,
(d) a vertical rear wall,
(e) at least one bottom retainer spanning said side walls along the lower margin thereof at a position in nonalignment with said code-notched region of documents therein to vertically support said documents in said minicartridge without interfering with document selecting interaction between said select blades and said code-notched region of said vertically supported documents, and
(f) an upper support member mounted for movement relative to said side walls and bottom retainer by said rearwardly shiftable pusher between a normal support position supportably engaged by said cartridge and a release position horizontally displaced from said normal support position in which said minicartridge is released from said cartridge, (g) bias means acting on said support member for biasing it to said normal position, said plurality of minicartridges being stored in said cartridge at a different predetermined selectively addressable minicartridge location, with said open bottom walls thereof collectively defining a first cartridge surface and said open front walls collectively defining a second cartridge surface, a selected one of said minicartridges being released from support by said cartridge, for placing the sorting edges of documents therein in operative sorting relation with said platen sections to facilitate selection movement of a desired document forwardly through said front wall thereof by said platen sections, by moving the upper support member of said selected minicartridge rearwardly to its release position with said pusher, a released minicartridge being returnable to support by said cartridge by positioning said upper support member in its release position under the action of said pusher when said cartridge is in its second upper location, and thereafter returning under the action of said bias means said upper support member to its normal position when said cartridge is in its first lower location, said sorting edges of documents in unreleased minicartridges, when supported by said cartridge in said second upper location above said released minicartridge, being in nonoperative sorting relation with said platen sections to preclude selection movement of a document thereby.

58. The apparatus of claim 57 wherein said cartridge and upper support member of said minicartridges include cooperating horizontal ledges extending in opposite directions, said cartridge ledge supportingly underlying said minicartridge ledge when said upper support is in its normal position prior to selection and release thereof from said cartridge by said pusher, said cartridge having a retainer member movably mounted thereto for vertical shifting motion relative to said cartridge ledge between an upper unlocking position and a lower locking position, said retainer member having a minicartridge-engaging portion engageable with all minicartridges in said cartridge when said retainer member is in its lower locking position to lock said minicartridge ledges thereof against horizontal releasing motion relative to said cartridge ledge, said minicartridge-releasing portion being disengageable from said minicartridges in said cartridge when said retainer member is in its upper unlocking position, said retainer member having a document blocking portion blocking at least a portion of said second wall of minicartridges supported by said cartridge when said retainer member is in its lower locking position to prevent removal of a document from minicartridges supported by said cartridge, said document blocking portion being clear of said second wall of released minicartridges unsupported by said cartridge when said retainer member is in its unlocking position, said retainer member being movable to its unlocking position prior to selection and release of a minicartridge from said cartridge.

59. The apparatus of claim 58 wherein said upper minicartridge support member of each minicartridge includes an upwardly extending vertical lip, said lip being located to engage and disengage said minicartridge-engaging portion of said retainer member when said retainer member is in its lower locking and upper unlocking positions to lock and unlock said minicartridge ledges against horizontal movement relative to said cartridge ledge, said pusher abutting said lip when said retainer member is in its upper unlocking position to horizontally displace said upper minicartridge support member of a selected minicartridge relative to the side walls thereof to disengage said selected minicartridge ledge from said cartridge ledge to thereby release said selected minicartridge from said cartridge.

60. The apparatus of claim 59 further including a horizontal lip extending outwardly from said vertical lip below the point where said pusher abuts said vertical lip to inhibit upward movement of said selected minicartridge when said cartridge moves upwardly from its first lower location to its second upper location following release of said selected minicartridge.

61. The apparatus of claim 57 wherein said minicartridge rear wall moves with said upper support relative to said side walls and bottom retainer, said rear wall includes an outwardly extending ledge engageable with a horizontal slot in said card selector when said upper support is moved to its release position to maintain said selected minicartridge atop said platen sections following release thereof when said cartridge moves from said first lower location to said second upper location to prevent the sorting edges of documents in unselected minicartridges from being in operative document selecting relation with said selecting blades of said document selector.

62. The apparatus of claim 57 wherein said rear wall of each minicartridge includes a first ledge extending rearwardly in a horizontal direction a distance exceeding the distance the rear wall is moved by the rear platen section when said rear platen section moves between a home position and a rear position during the document selection process, said rear wall ledges of unselected minicartridges located on either side of a selected minicartridge establishing guide barriers for the rear wall of the selected minicartridge to prevent the selected minicartridge rear wall, when in its rear position, from inadvertent movement perpendicularly to said minicartridge side walls to a position behind the rear walls of said adjacent minicartridges and thereby preventing the rear wall of said selected minicartridge from fully returning to its normal position as said rear platen section returns from its rear position to its home position.

63. The apparatus of claim 57 further including means to limit forward movement of said rear wall beyond the position thereof occupied when said rear platen section is at its home position, thereby maintaining said trailing edge locating surface at a fixed reference position during the document selection process when the rear platen section reciprocates between its home position and a forward position forward of said home position.

64. The apparatus of claim 63 wherein said forward movement limiting means includes a rear edge of at least one of said minicartridge side walls which is disposed to abut said inwardly facing locating surface when said rear wall is in its normal support position.

65. The apparatus of claim 57 wherein one of said side walls of each minicartridge includes means projecting from the inside surface thereof toward the other side wall of each said minicartridge to establish a space between documents in said minicartridge and said inside surface of said one side wall into which a document can be inserted for convenient return to said minicartridge.

66. The apparatus of claim 57 wherein said rear wall and upper support member are rigidly joined to each other at respective upper and rear sections thereof, said rear section of said upper support member being positioned between and in sliding contact with the upper rear margins of said side walls to effectively guide said rear wall and upper support member for sliding movement relative to said side walls and bottom retainer.

67. The apparatus of claim 57 wherein the upper front margins of said side walls underlie and are in sliding contact relative to the side margins of the front section of said upper support member.

68. The apparatus of claim 57 wherein the distance between the rear vertical edges of said side walls is less than the width of said rear wall to limit forward movement of said rear wall relative to said side walls.

69. The apparatus of claim 57 wherein said rear wall and upper support member are rigidly joined to each other at respective upper and rear sections thereof, said rear section of said upper support member being positioned between and in sliding contact with the upper rear margins of said side walls to effectively guide said rear wall and upper support member for sliding movement relative to said side walls and bottom retainer, wherein the upper front margins of said side walls underlie and are in sliding contact relative to the side margins of the front section of said upper support member, and wherein the distance between the rear vertical edges of said side walls is less than the width of said rear wall to limit forward movement of said rear wall relative to said side walls.

70. A minicartridge for storing rectangular documents having leading and trailing edges between which is located a bottom sorting edge having a code-notched region, plural minicartridges being releasably supported at different addressable locations in a cartridge positionable at a document selector having a stationary front horizontal platen section with vertically shiftable document select blades, a horizontal movable rear platen section with vertically shiftable document select blades, and a rearwardly shiftable pusher selectively positionable along an axis parallel to said document select blades for releasing a selected minicartridge from the cartridge to position only the code-notched region of documents in the selected and released minicartridge in operative document selecting relation with the document selecting blades of the selector, said minicartridge comprising:

a pair of spaced vertical side walls between which stored documents, code-notched along their bottom sorting edges, are positioned in vertical face-to-face relation with their leading, trailing, and sorting edges aligned, a vertical open front wall adjacent to which the leading edges of stored documents are positioned, a horizontal open bottom wall adjacent to which the sorting edges of stored documents are positioned, a vertical rear wall, at least one bottom retainer spanning said side walls along the lower margin thereof at a position in nonalignment with said code-notched region of stored documents to vertically support said documents in said minicartridge without interfering with document selecting interaction between the select blades and the code-notched region of vertically supported documents, an upper support member mounted for movement relative to said side walls and bottom retainer, by said rearwardly shiftable minicartridge selecting pusher, between a normal support position supportably engaged with a minicartridge-engaging element of the cartridge and a release position horizontally displaced from said normal support position in which said minicartridge is released from the minicartridge-engaging element of the cartridge, bias means acting on said support member for biasing it to said normal position, said minicartridge being released from support by the minicartridge-engaging element of the cartridge, for placing the sorting edges of documents therein in operative sorting relation with the platen sections of the document selector to facilitate selection movement of a desired document forwardly through said front wall thereof by the platen sections, by moving the upper support member of said minicartridge rearwardly relative to said side walls to its release position with the pusher, p1 said released minicartridge being returnable to support by the minicartridge-engaging element of a cartridge by positioning said upper support member in its release position under the action of the pusher when the cartridge is in a first upper position with its minicartridge-engaging element displaced from said upper support member, and thereafter returning under the action of said bias means said upper support member to its normal position when the cartridge is in a second lower position with its minicartridge-engaging element disposed to be engaged by said upper support member, the sorting edges of documents in said minicartridge, when said minicartridge is unreleased and supported by the minicartridge-engaging element of a cartridge in its first upper position, being in nonoperative sorting relation with the platen sections of the document selector to preclude selection movement of a document thereby.

71. The minicartridge of claim 70 wherein said upper support member of said minicartridge includes a horizontal ledge extending in an opposite direction to a cooperating horizontal ledge functioning as a minicartridge-supporting element of a cartridge, said minicartridge ledge adapted to overlie and be supported by the minicartridge-supporting ledge of a cartridge.

72. The minicartridge of claim 71 wherein said upper minicartridge support member includes an upwardly extending vertical lip, said lip being located to engage and disengage a minicartridge-engaging portion of a vertically movable retainer member mounted on a cartridge when the retainer member is in its lower locking and upper unlocking positions, respectively, to lock and unlock said minicartridge ledge against horizontal movement relative to the minicartridge-supporting ledge of a cartridge, said pusher abutting said lip when the retainer member is in its upper unlocking position to horizontally displace said upper minicartridge support member relative to the side walls thereof to disengage said minicartridge ledge from said minicartridge-supporting cartridge ledge to thereby release said minicartridge from a cartridge.

73. The minicartridge of claim 72 further including a horizontal lip extending outwardly from said vertical lip below the point where said pusher abuts said vertical lip to inhibit upward movement of said minicartridge when a cartridge moves upwardly from its lower position to its upper position following release of said minicartridge therefrom.

74. The minicartridge of claim 70 wherein said rear wall moves with said upper support member relative to said side walls and bottom retainer, said rear wall includes an outwardly extending ledge engageable with a horizontal slot in the card selector when said upper support member is moved to its release position to maintain said minicartridge atop said platen sections following release thereof when the cartridge moves from its lower position to its upper position.

75. The minicartridge of claim 70 wherein said rear wall includes a first ledge extending rearwardly in a horizontal direction a distance exceeding the distance the rear wall is moved by the rear platen section when said rear platen section moves between a home position and a rear position during the document selection process, the rear wall ledges of unselected minicartridges located on either side of a selected minicartridge establishing guide barriers for the rear wall of the selected minicartridge to prevent the selected minicartridge rear wall, when in its rear position, from inadvertent movement perpendicularly to said minicartridge side walls to a position behind the rear walls of said adjacent minicartridges and thereby preventing the rear wall of said selected minicartridge from fully returning to its normal position as said rear platen section returns from its rear position to its home position.

76. The minicartridge of claim 70 further including means to limit foward movement of said rear wall beyond the position thereof occupied when the rear platen section is at its home position, thereby maintaining said trailing edge locating surface at a fixed reference position during the document selection process when the rear platen section reciprocates between its home position and a forward position forward of the home position.

77. The minicartridge of claim 76 wherein said forward movement limiting means includes a rear edge of at least one of said minicartridge side walls which is disposed to abut said inwardly facing locating surface when said rear wall is in its normal support position.

78. The minicartridge of claim 70 wherein one of said side walls includes means projecting from the inside surface thereof toward the other side wall to establish a space between documents in said minicartridge and said inside surface of said one side wall into which a document can be inserted for convenient return to said minicartridge.

79. The minicartridge of claim 70 wherein said rear wall and upper support member are rigidly joined to each other at respective upper and rear sections thereof, said rear section of said upper support member being positioned between and in sliding contact with the upper rear margins of said side walls to effectively guide said rear wall and upper support member for sliding movement relative to said side walls and bottom retainer.

80. The minicartridge of claim 70 wherein the upper front margins of said side walls underlie and are in sliding contact relative to the side margins of the front section of said upper support member.

81. The minicartridge of claim 70 wherein the distance between the rear vertical edges of said side walls is less than the width of said rear wall to limit forward movement of said rear wall relative to said side walls.

82. The minicartridge of claim 70 wherein said rear wall and upper support member are rigidly joined to each other at respective upper and rear sections thereof, said rear section of said upper support member being positioned between and in sliding contact with the upper rear margins of said side walls to effectively guide said rear wall and upper support member for sliding movement relative to said side walls and bottom retainer, wherein the upper front margins of said side walls underlie and are in sliding contact relative to the side margins of the front section of said upper support member, and wherein the distance between the rear vertical edges of said side walls is less than the width of said rear wall to limit forward movement of said rear wall relative to said side walls.

83. The apparatus of claim 1 wherein said selected document removal transport and minicartridge selecting means are positionable in operative relation to the location of a desired minicartridge while said cartridge retriever moves a retrieved cartridge from its associated crypt to said document selector.

84. The apparatus of claim 36 wherein said selected document removal transport and minicartridge selecting means are positionable in operative relation to the location of a desired minicartridge while said buffer store is indexed rotationally to align a document storage location thereof with said selected document removal transport.

85. The apparatus of claim 36 wherein said cartridge retriever transfers a retrieved cartridge from its associated crypt to said document selector while said document removal transport and minicartridge selecting means are positioned in operative relation to a desired minicartridge and said buffer store is indexed rotationally to align a document storage location thereof with said selected document removal transport.

86. The apparatus of claim 46 wherein said first carrousel indexes rotationally to align a document storage location thereof with said second document transport while said carrousel is being positioned along said carrousel path proximate said second transport.

87. The apparatus of claim 48 wherein said first and second carrousels index rotationally to align a document storage location thereof with said second document transport while said first carrousel is being positioned along said first carrousel path proximate said second transport.

88. The apparatus of claim 49 wherein said first and second carrousels index rotationally to align document storage locations thereof relative to said second and third transports while said first carrousel positions itself along said first carrousel path proximate said second and third transports.

89. The apparatus of claim 38 further including at least one document utilization station located along said carrousel path, means to position said carrousel proximate said document utilization station, and means to transfer a document between said document utilization station and a document storage location of said carrousel aligned therewith.

90. The apparatus of claim 38 further including plural document utilization stations located along said carrousel path, means to selectively position said carrousel proximate said document utilization stations, and means movable with said carrousel along said carrousel path to transfer a document between a selected one of said utilization stations and a document storage location of said carrousel aligned therewith.

* * * * *